(12) United States Patent
Wang et al.

(10) Patent No.: US 10,914,926 B2
(45) Date of Patent: Feb. 9, 2021

(54) OPTICAL IMAGING LENS AND LENS ASSEMBLY

(71) Applicant: Ningbo Sunny Automotive Optech Co., Ltd., Zhejiang (CN)

(72) Inventors: Dongfang Wang, Ningbo (CN); Bo Yao, Ningbo (CN); Qiansen Xie, Ningbo (CN)

(73) Assignee: Ningbo Sunny Automotive Optech Co., Ltd., Zhejiang (CN)

(*) Notice: Subject to any disclaimer, the term of this patent is extended or adjusted under 35 U.S.C. 154(b) by 144 days.

(21) Appl. No.: 15/390,474

(22) Filed: Dec. 24, 2016

(65) Prior Publication Data

US 2017/0184815 A1 Jun. 29, 2017

(30) Foreign Application Priority Data

Dec. 24, 2015 (CN) .......................... 2015 1 1035710

(51) Int. Cl.
*G02B 13/00* (2006.01)
*G02B 9/62* (2006.01)
(Continued)

(52) U.S. Cl.
CPC .......... *G02B 13/006* (2013.01); *G02B 5/005* (2013.01); *G02B 5/20* (2013.01); *G02B 9/62* (2013.01);
(Continued)

(58) Field of Classification Search
CPC ............... G02B 13/006; G02B 13/004; G02B 13/0045; G02B 9/34; G02B 9/62;
(Continued)

(56) References Cited

U.S. PATENT DOCUMENTS 5,477,389 A * 12/1995 Ito .......................... G02B 13/04
359/708
6,384,987 B1 * 5/2002 Sensui ................... G02B 13/04
359/749
(Continued)

FOREIGN PATENT DOCUMENTS

CN 102483514 B 10/2014
JP 2001-066523 A 3/2001
(Continued)

OTHER PUBLICATIONS

Machine translation of JP2001-66523 dowloaded from Espacenet, Apr. 30, 2020 (Year: 2020).*

*Primary Examiner* — Cara E Rakowski
(74) *Attorney, Agent, or Firm* — Sughrue Mion, PLLC

(57) ABSTRACT

A lens assembly for an optical imaging lens is disclosed, which includes a first lens, wherein the first lens has a negative power, a second lens, a third lens, a fourth lens, a fifth lens, and a sixth lens, wherein the sixth lens has a positive power, wherein the second lens and the third lens define a first cemented achromatic lens assembly, and the fourth lens and the fifth lens define a second cemented achromatic lens assembly, wherein the first lens, the first cemented achromatic lens assembly, the second cemented achromatic lens assembly and the sixth lens are orderly arranged along the direction from the object side to the image side.

7 Claims, 33 Drawing Sheets

(51) Int. Cl.
  *G02B 27/00* (2006.01)
  *G02B 5/00* (2006.01)
  *G02B 5/20* (2006.01)

(52) U.S. Cl.
  CPC ..... *G02B 13/0045* (2013.01); *G02B 27/0025* (2013.01)

(58) Field of Classification Search
  CPC ...... G02B 5/005; G02B 5/20; G02B 27/0025; G02B 13/18
  See application file for complete search history.

(56) References Cited

U.S. PATENT DOCUMENTS

| | | | | |
|---|---|---|---|---|
| 7,907,352 | B2 * | 3/2011 | Miyano | G02B 23/243 359/754 |
| 10,156,698 | B2 * | 12/2018 | Chiu | G02B 9/62 |
| 2001/0024332 | A1 * | 9/2001 | Mori | G02B 13/04 359/755 |
| 2005/0018313 | A1 * | 1/2005 | Kuba | G02B 13/002 359/676 |
| 2005/0200977 | A1 * | 9/2005 | Tesar | G02B 9/34 359/754 |
| 2006/0274433 | A1 * | 12/2006 | Kamo | G02B 13/0095 359/793 |
| 2007/0024992 | A1 * | 2/2007 | Kushida | G02B 13/04 359/749 |
| 2012/0056976 | A1 * | 3/2012 | Lee | G02B 13/04 348/36 |
| 2012/0170135 | A1 * | 7/2012 | Oshita | G02B 13/06 359/686 |
| 2014/0146403 | A1 * | 5/2014 | Tsutsumi | G02B 13/04 359/740 |
| 2014/0268367 | A1 * | 9/2014 | Kawamura | G02B 13/04 359/708 |
| 2016/0154230 | A1 * | 6/2016 | Katakura | G02B 23/243 359/690 |

FOREIGN PATENT DOCUMENTS

JP 2009-230040 A 10/2009
JP WO 2015025843 A1 * 2/2015 ........... G02B 23/243

* cited by examiner

OPTICAL IMAGING LENS AND LENS ASSEMBLY

CROSS REFERENCE OF RELATED APPLICATION

This is an application that claims the benefit of priority under 35U.S.C. § 119 to a non-provisional application, Chinese application number CN2015/11035710.9, filed 2016 Dec. 24.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of optical imaging, and more particularly to an optical imaging lens. The invention further relates to a lens assembly for an optical imaging lens.

Description of Related Arts

Optical imaging systems, and in particular refracted optical imaging systems, often require optical imaging lenses for receiving imaging light from the imaging object to image. Optical imaging systems are subject to various aberrations, such as spherical aberration, coma, astigmatism, field curvature, and distortion.

In order to eliminate the above-mentioned various factors affecting imaging, the lens assembly of the conventional optical imaging lens generally includes a plurality of lenses to effectively eliminate various aberrations and improve the image quality. In addition, in order to obtain high quality and low distortion imaging effects, the optical imaging lens also needs an achromatic lens to reduce color aberration. The conventional achromatic lens typically includes two monolithic lenses which have different achromatic properties and are combined together, such as two cemented lenses or double-spaced lenses. However, when the imaging optical system only employs a single achromatic lens to achieve imaging, it is difficult to reduce other factors that affect the image quality, and a single achromatic lens to achieve good imaging need to use a ultra-low dispersion lens (ED lens), for example, a lens made of fluorite. Fluorite is very difficult to process and high in cost, and its production process brings environmental pollution. In addition, fluorite is fragile, which results in the entire optical imaging lens is not suitable for being used in complex and harsh environments.

With the development of science and technology, various technologies involving optical imaging, such as the vehicular optical imaging system used in the automobile industry and the imaging equipment used in the mobile electronic devices such as mobile phones, etc., require the optical imaging lens having a higher imaging quality. The optical imaging systems involved in these fields not only require that their optical imaging lenses obtain a small image distortion, but also require their lens assemblies to have fewer lenses, so as to make the optical imaging systems be miniaturized and have a lower manufacturing cost.

SUMMARY OF THE PRESENT INVENTION

The main object of the present invention is to provide a lens assembly for an optical imaging lens, wherein the optical imaging lens employing the lens assembly has a smaller optical length so that the optical imaging lens is easier to be miniaturized. In other words, the optical imaging lens employing the lens assembly can be more easily miniaturized while achieving higher image quality. Another advantage of the invention is to provide.

Another object of the present invention is to provide a lens assembly for the optical imaging lens, wherein the optical imaging lens employing the lens assembly can obtain higher resolution quality utilizing fewer lenses.

Another object of the present invention is to provide a lens assembly for the optical imaging lens, wherein the lens assembly preferably forms two cemented-type achromatic lenses so that the optical imaging lens employing the lens assembly has a smaller chromatic aberration.

Another object of the present invention is to provide a lens assembly for the optical imaging lens, wherein the aspheric mirror of the lens assembly can be made of plastic material to reduce the manufacturing cost of the optical imaging lens and to reduce the weight of the optical imaging lens.

Another object of the present invention is to provide a lens assembly for the optical imaging lens, wherein each of the lenses of the lens assembly can be made of glass material so that the optical imaging lens employing the lens assembly can clearly and stably image over a large range of temperature.

Another object of the present invention is to provide a lens assembly for the optical imaging lens, wherein the lens assembly can still achieve high image quality when using a large number of spherical lenses. In other words, under the premise of achieving high quality imaging, the lens assembly can still employ a plurality of glass spherical lenses, so that the optical imaging lens employing the lens assembly has better temperature stability so as to avoid the necessity of using aspherical glass lenses and the manufacturing cost of the optical imaging lens being increased.

Another object of the present invention is to provide a lens assembly for the optical imaging lens, wherein the lens assembly preferably has two cemented-type achromatic lens assemblies, so as to reduce the manufacturing process steps of the optical imaging lens employing the lens assembly and enable the optical imaging lens to have a lesser degree of eccentricity.

Another object of the present invention is to provide a lens assembly for the optical imaging lens, wherein the lens assembly defines two cemented-type achromatic lenses, so as to reduce the assembling process steps for the optical imaging lens employing the lens assembly and lower the manufacturing difficulty of the optical imaging lens.

Another object of the present invention is to provide a lens assembly for the optical imaging lens, wherein the optical imaging lens does not require sophisticated components and complicated structure so that the optical imaging lens employing the lens assembly is simple in manufacturing process and low in cost.

Another object of the present invention is to provide an optical imaging lens employing the lens assembly.

Additional advantages and features of the invention will become apparent from the description which follows, and may be realized by means of the instrumentalities and combinations particular point out in the appended claims.

According to the present invention, the foregoing and other objects and advantages are attained by a lens assembly for an optical imaging lens, which comprising:

a first lens, wherein the first lens has a negative power;
a second lens;
a third lens;
a fourth lens;
a fifth lens; and
a sixth lens, wherein the sixth lens has a positive power, wherein the second lens and the third lens define a first cemented achromatic lens assembly, and the fourth lens and the fifth lens define a second cemented achromatic lens assembly, wherein the first lens, the first cemented achromatic lens assembly, the second cemented achromatic lens assembly and the sixth lens are orderly arranged along the direction from the object side to the image side.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
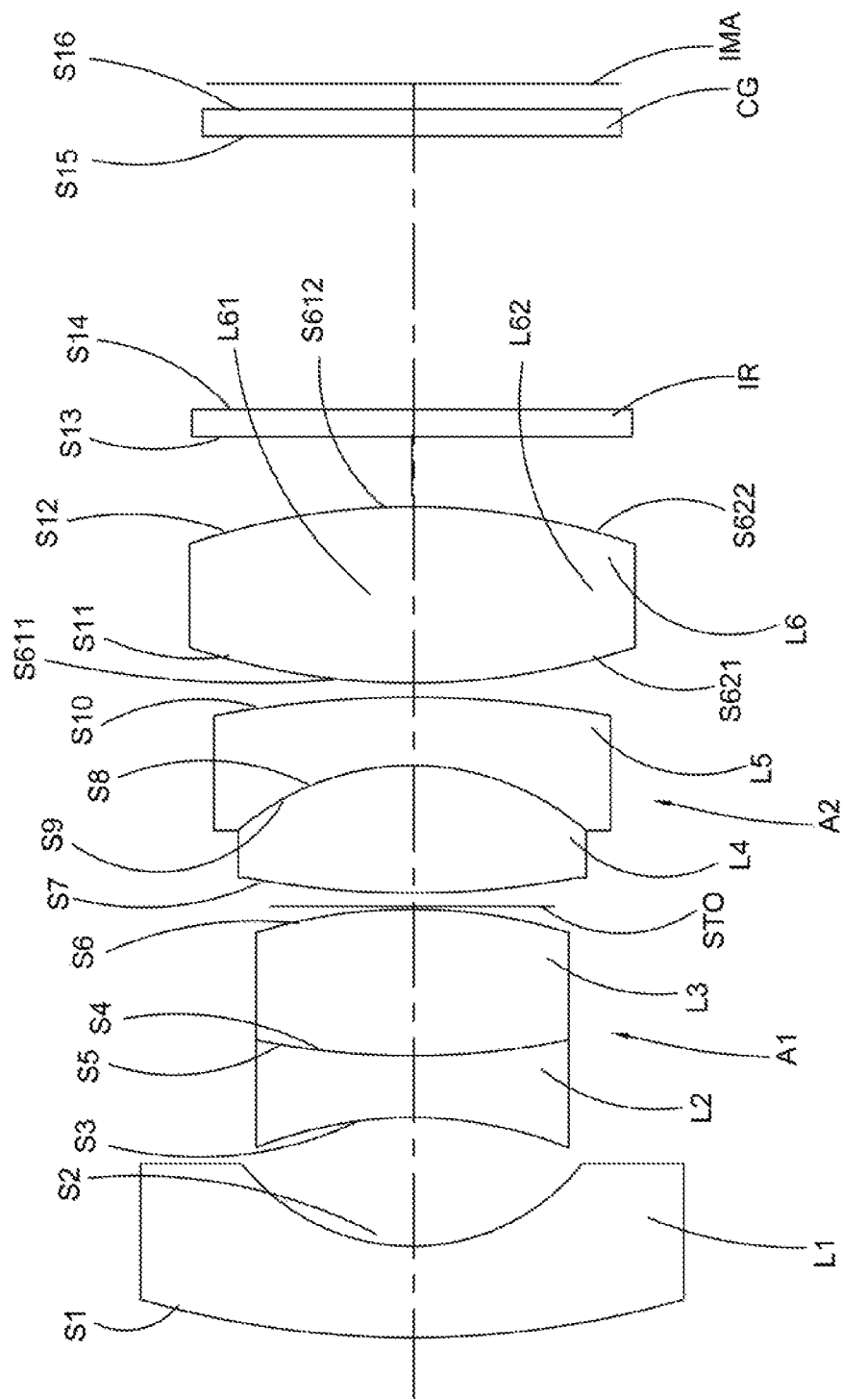
FIG. 1 is a structural schematic diagram of a lens assembly for an optical imaging lens according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 4 of the accompanying drawings of the present invention, a lens assembly for an optical imaging lens according to a first preferred embodiment of the present invention is illustrated, wherein the lens assembly of the optical imaging lens includes at least a first lens L1, a second lens L2, a third lens L3, a fourth lens L4, a fifth lens L5 and a sixth lens L6, wherein the first lens L1 has a negative power, and the sixth lens L6 has a positive power, wherein the second lens L2 and the third lens L3 define a first achromatic lens assembly A1, and the fourth lens L4 and the fifth lens L5 defines a second achromatic lens assembly A2, wherein the first lens L1, the first achromatic lens assembly A1, the second achromatic lens assembly A2 and the sixth lens L6 are orderly arranged along the direction from the object side to the image side.

As shown in FIGS. 1 to 4, the lens assembly according to the first preferred embodiment of the present invention, for the optical imaging lens, which comprises at least a first lens L1, a second lens L2, a third lens L3, a fourth lens L4, a fifth lens L5 and at least one sixth lens L6, wherein the first lens L1 has a negative power, the second lens L2 has a negative power, the third lens L3 has a positive power; the fourth lens L4 has a positive power and the fifth lens L5 has a negative power, wherein the sixth lens L6 is an aspherical lens, wherein the sixth lens L6 comprises a center portion and an edge portion extended outwardly from the center portion, and the center portion of the sixth lens L6 has a positive power. Preferably, the first lens L1, the second lens L2, the third lens L3, the fourth lens L4, the fifth lens L5 and the sixth lens L6 are sequentially arranged along the direction from the object side to the image side, wherein the second lens L2 and the third lens L3 form the first achromatic lens assembly A1, and the fourth lens L4 and the fifth lens L5 form the second achromatic lens assembly A2. Preferably, the first lens L1, the second lens L2, the third lens L3, the fourth lens L4 and/or the fifth lens L5 are aspheric lenses to improve the optical properties of the lens assembly according to the first preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1, the second lens L2, the third lens L3, the fourth lens L4, and/or the fifth lens L5 are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

As shown in FIG. 1, the first lens L1, the second lens L2, the third lens L3, the fourth lens L3, the fourth lens L4, the fifth lens L5 and the sixth lens L6 of the lens assembly according to the first preferred embodiment of the present invention are coaxial with each other, which is used for the optical imaging lens.

As shown in FIG. 1, the lens assembly for the optical imaging lens according to the first preferred embodiment of the present invention further includes a diaphragm STO, wherein the diaphragm STO is provided between the third lens L3 and the fourth lens L4, wherein the optical center of the diaphragm STO is coaxial with the optical centers of the first lens L1, the second lens L2, the third lens L3, the fourth lens L4, the fifth lens L5 and the sixth lens L6. Alternatively, the diaphragm STO is provided between the first lens L1 and the second lens L2. Alternatively, the diaphragm STO may also be provided between the fifth lens L5 and the sixth lens L6. In some embodiments, the diaphragm STO is provided on the first lens L1 or the second lens L2. In still other embodiments, the diaphragm STO is provided on the third lens L3 or the fourth lens L4. In still other embodiments, the diaphragm STO is provided on the fifth lens L5 or the sixth lens L6.

As shown in FIG. 1, the first lens L1 of the lens assembly for the optical imaging lens according to the first preferred embodiment of the present invention has a convex surface S1 and a concave surface S2; the second lens L2 has two concave surfaces S3, S4; the third lens L3 has two convex surfaces S5, S6; the fourth lens L4 has two convex surfaces S7, S8; the fifth lens L5 has a concave surface S9 and a convex surface S10; the center portion L6I of the sixth lens L6 has two convex surfaces S611, S612, and the edge portion L62 of the sixth lens L6 has two convex surfaces S621, S622, wherein the convex surface S1 of the first lens L1 faces the object side, the concave surface S2 of the first lens L1 faces the image side; the two concave surfaces S3, S4 of the second lens L2 face the object side and the image side respectively; the two convex surfaces S5, S6 of the three lenses L3 face the object side and the image side respectively; the two convex surfaces S7, S8 of the fourth lens L4 face the object side and the image side respectively; the concave surface S9 of the fifth lens L5 faces the object side, the convex surface S10 of the fifth lens L5 faces the image side; the convex surfaces S611, S612 of the center portion L6I of the sixth lens L6 face the object side and the image side respectively, the convex surfaces S621, S622 of the edge portion L62 of the sixth lens L6 face the object side and the image side respectively. Preferably, the convex surface S611 of the central portion L6I of the sixth lens L6 and the convex surface S621 of the edge portion L62 of the sixth lens L6 form a convex surface S11 facing the object side, and the convex surface S612 of the center portion L6I of the sixth lens L6 and the convex surface S622 of the edge portion L62 of the sixth lens L6 form a convex surface S12 facing the image side. Therefore, the first lens L1, the second lens L2, the third lens L3, the fourth lens L4, the fifth lens L5 and the sixth lens L6 of the lens assembly for the optical imaging lens according to the first preferred embodiment of the present invention are respectively double-sided lenses. Further, the second lens L2 is a biconcave lens, and the third lens L3 is a biconvex lens and the sixth lens L6 is a biconvex lens.

Alternatively, the first lens L1 of the lens assembly for the optical imaging lens according to the first preferred embodiment of the present invention has a concave surface S1 facing the object side and a concave surface S2 facing the image side. Alternatively, the edge portion L62 of the sixth lens L6 has a negative power. Optionally, the edge portion L62 of the sixth lens L6 has a convex surface S621 facing the object side and a concave surface S622 facing the image side. Therefore, the convex surface S611 of the central portion L6I of the sixth lens L6 and the convex surface S621 of the edge portion L62 of the sixth lens L6 form a convex surface S11 facing the object side.

It is worth mentioning that when the convex surface S1 of the first lens L1 of the lens assembly faces the object side, it is advantageous to make more light enter into the lens assembly as much as possible. At the same time, the convex surface S1 of the first lens L1 faces the object side, which makes the first lens L1 of the lens assembly not easily be contaminated with dirt when the lens assembly is used outdoor, for example, rain is easier to fall on a rainy day. When the first lens L1 facing the object side is a concave surface S2, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 1, the concave S4 of the second lens L2 of the lens assembly for the optical imaging lens according to the first preferred embodiment of the present invention, which faces the image side, and the convex surface S5 of the third lens L3, which faces the object side, are provided to face with each other; the convex surface S8 of the fourth lens L4, which faces the image side, and the concave surface S9 of the fifth lens L5, which faces the object side, are provided to face with each other.

As shown in FIG. 1, the first and second achromatic lens assemblies A1, A2 of the lens assembly for the optical imaging lens according to the first preferred embodiment of the present invention are preferably cemented lenses. In other words, the second lens L2 and the third lens L3 may be glued together to form the first achromatic lens assembly A1; the fourth lens L4 and the fifth lens L5 may be glued together to form the second achromatic lens assembly A2. At this time, since the second lens L2 and the third lens L3 are glued together and the fourth lens L4 and the fifth lens L5 are glued together, so the concave surface S4 of the second lens L2 and the convex surface S5 of the third lens L3; the convex surface S8 of the fourth lens L4 and the concave surface S9 of the fifth lens L5 are glued together. Preferably, both the concave surface S4 of the second lens L2 and the convex surface S5 of the third lens L3 are aspherical. More preferably, the convex surface S8 of the fourth lens L4 and the concave surface S9 of the fifth lens L5 are both aspherical to further reduce the chromatic aberration. Alternatively, the first and second achromatic lens assemblies A1, A2 may respectively be a double-separated achromatic lens assembly. It is appreciated that the second lens L2 and the third lens L3 are separately provided when the first and second achromatic lens assemblies A1, A2 are double-separated type achromatic lens assemblies; the fourth lens L4 and the fifth lens L5 are separately provided, the diaphragm STO may be provided between the second lens L2 and the third lens L3 or between the fourth lens L4 and the fifth lens L5.

As shown in FIG. 1, the second lens L2 and the third lens L3 of the first achromatic lens assembly A1 of the lens assembly for the optical imaging lens according to the first preferred embodiment of the present invention have a negative power and a positive power respectively, wherein the second lens L2 is preferably made of material having a low refractive index and a high Abbe number, and the third lens L3 is preferably made of material having a high refractive index and a low Abbe number, wherein the second lens L2 having a negative power has a lower refractive index, and the third lens L3 having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4 and the fifth lens L5 of the second achromatic lens assembly A2 of the lens assembly for the optical imaging lens according to the first preferred embodiment of the present invention also respectively have a positive power and a negative light power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1 and the first achromatic lens assembly A1 of the lens assembly for the optical imaging lens according to the first preferred embodiment of the present invention is F1, the focal length of the combination of the second achromatic lens assembly A2 and the six lens L6 is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the six lenses L6 and the image plane.

As shown in FIG. 1, furthermore, the lens assembly for the optical imaging system according to the first preferred embodiment of the present invention defines an image plane IMA, and the optical imaging system may further include a color filter IR and a protective glass CG disposed in front of the image plane IMA.

As shown in FIG. 1, the imaging light may enter from the convex surface S1 of the first lens L1 of the lens assembly and pass sequentially through the first lens L1, the second lens L2, the third lens L3, the diaphragm STO, the fourth lens L4, the fifth lens L5, the sixth lens L6, the color filter IR, and the protective plate CG, and then is imaged on the image plane IMA.

As shown in FIG. 1, the sixth lens L6 of the lens assembly for the optical imaging lens according to the first preferred embodiment of the present invention is an aspheric lens. Preferably, the sixth lens L6 is a glass aspherical lens. Optionally, the sixth lens L6 is a plastic aspherical lens. When the sixth lens L6 is made of plastic material, the overall weight and the manufacturing cost of the lens assembly may be reduced. More preferably, the aspherical surface of the sixth lens L6 can satisfy the following formula:

$$Z(h) = \frac{ch^2}{1 + \sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the first preferred embodiment of the present invention is TTL (referred to the distance from the outermost point of the object side of the first lens L1 to the image plane of the lens assembly), and the focal length of the entire lens assembly is F, then TTL/F≤12, as shown in Table 1 and Table 2. Preferably, TTL/F≤7.5, to satisfy the miniaturization requirement of the lens assembly of the present invention.

TABLE 1 parameters of Lens surfaces of a specific example of a lens assembly according to the first preferred embodiment of the present invention:

| Serial number of surface S | Radius of curvature R | Distance between centers of two neighboring lenses d | Refractive index Nd | Abbe number Vd |
|---|---|---|---|---|
| S1 | 14.5306 | 0.8000 | 1.52 | 64.20 |
| S2 | 2.7853 | 2.6038 | | |
| S3 | −4.6849 | 0.5500 | 1.50 | 81.61 |
| S4 | 11.5869 | 0.0000 | | |
| S5 | 11.5869 | 2.1576 | 1.90 | 31.32 |
| S6 | −7.8178 | 0.0420 | | |
| STO | Infinity | 0.2000 | | |
| S7 | 13.2598 | 2.1750 | 1.70 | 55.53 |
| S8 | −3.2366 | 0.0000 | | |
| S9 | −3.2366 | 0.5525 | 1.78 | 25.72 |
| S10 | −36.7946 | 0.1532 | | |
| S11 | 9.0290 | 2.9671 | 1.50 | 81.61 |
| S12 | −4.9915 | 0.5000 | | |
| S13 | Infinity | 0.4000 | 1.52 | 64.20 |
| S14 | Infinity | 2.3798 | | |
| S15 | Infinity | 0.4000 | 1.52 | 64.17 |
| S16 | Infinity | 0.1250 | | |
| IMA | Infinity | | | |

TABLE 2

Aspherical coefficients of the two surfaces of the sixth lens as above embodiment K, A, B, C, D, E:

| Serial number of surface S | K | A | B | C | D | E |
|---|---|---|---|---|---|---|
| S11 | −1.347191 | −3.8302 × 10−3 | 1.3990 × 10−4 | 1.8330 × 10−6 | −7.3685 × 10−9 | −4.1216 × 10−10 |
| S12 | −1.410127 | 1.5832 × 10−3 | −3.2873 × 10−5 | 1.4010 × 10−6 | 1.2870 × 10−9 | 3.2824 × 10−10 |

The above Table 1 and Table 2 show a specific example of a lens assembly for the optical imaging lens according to the first preferred embodiment of the present invention, wherein the specific example may be used in an optical imaging system, wherein the radius of curvature of the convex surface S1 of the first lens L1 is 14.5306, which faces the object side, the radius of curvature of the concave surface S2 of the first lens L1 is 2.7853, which faces facing the image side, wherein the refractive index of the first lens L1 is 1.52, the abbe's constant of the first lens L1 is 64.20, wherein the distance between the center (or optical center) of the convex surface S1 of the first lens L1 and the center (or optical center) of the concave surface S2 of the first lens L1 is 0.80; the radius of curvature of the concave surface S3 of the second lens L2 is −4.6849, which faces the object side, and the radius of curvature of the concave surface S4 of the second lens L2 of the lens assembly is 11.5869, which faces the image side, wherein the refractive index of the second lens L2 is 1.5, the abbe's constant of the second lens L2 is 81.61, wherein the distance between the center (or optical center) of the concave surface S2 of the first lens L1 and the center (or optical center) of the concave surface S3 of the second lens L2 is 2.6038, and the distance between the center (or optical center) of the concave surface S3 and the center (or optical center) of the concave surface S4 of the second lens L2 is 0.550; the radius of curvature of the convex surface S6 of the third lens L3 of the lens assembly is −7.8178, which faces the image side, wherein the refractive index of the third lens L3 is 1.9, the abbe's constant of the third lens L3 is 31.32, wherein the concave surface S4 of the second lens L2 is glued together with the convex surface S5 of the third lens L3, and the distance between the center (or optical center) of the convex surface S5 and the center (or optical center) of the convex surface S6 of the third lens L3 is 2.1576, the distance between the center (or optical center) of the convex surface S6 of the third lens L3 and the diaphragm STO is 0.0420, the distance between the diaphragm STO and the fourth lens L4 is 0.2000; the radius of curvature of the convex surface S7 of the fourth lens L4 of the lens assembly is 13.2598, which faces the object side, the radius of curvature of the convex surface S8 of the fourth lens L4 of the lens assembly is −3.2366, which faces the image side, wherein the refractive index of the fourth lens L4 is 1.7, the abbe's constant of the fourth lens L4 is 55.53, wherein the distance between the center (or optical center) of the convex surface S7 of the fourth lens L4 and the center (or optical center) of the convex surface S8 of the fourth lens L4 is 2.1750; the radius of curvature of the convex surface S10 of the fifth lens L5 of the lens assembly is −36.7946, which faces the image side, wherein the refractive index of the fifth lens L5 is 1.78, the abbe's constant of the fifth lens L5 is 25.72, and the convex surface S8 of the fourth lens L4 is glued together with the concave surface S9 of the fifth lens L5, wherein the distance between the center of the concave surface S9 of the fifth lens L5 and the center (or optical center) of the convex surface S10 of the fifth lens L5 is 0.5525; and the curvature radius of the convex surface S11 of the sixth lens L6 of the lens assembly is 9.0290, which faces the object side, the radius of curvature of the convex surface S12 of the sixth lens L6 is −4.9915, which faces the image side, wherein the abbe's constant of the sixth lens L6 is 81.61, wherein the distance between the center (or optical center) of the convex surface S10 of the fifth lens L5 and the center (or optical center) of the convex surface S11 of the sixth lens L6 is 0.153232, the distance between the center (or optical center) of the convex surface S11 of the sixth lens L6 and the center (or optical center) of the convex surface S12 of the sixth lens L6 is 2.9671, the distance between the sixth lens L6 of the lens assembly L6 and the color filter IR of the optical imaging system is 0.5, the distance between the two surfaces S13, S14 of the filter IR is 0.4000, the distance between the color filter IR of the optical imaging system and the protective glass CG is 2.3798, the distance between the two surfaces S15, S16 of the protective plate CG is 0.40, and the distance between the protective glass CG and the image plane IMA is 0.125. In addition, both surfaces S11, S12 of the sixth lens L6 are aspherical, and for S11, K is −1.347191, the constant A is −3.8302×10−3; B is 1.3990×10−4; C is 1.8330×10−6; D is −7.3685×10−9; E is −4.1216×10−10, or S12, K is −1.410127, the constant A is 1.5832×10−3; B is −3.2873×10−5; C is 1.4010×10−6; D is 1.2870×10−9; E is 3.2824×10−10. In addition, the optical length of the lens assembly for the optical imaging lens according to the first preferred embodiment of the present invention is TTL=16.01, and the focal length F of the entire lens assembly is F=3.62, then TTL/F=4.42. The total focal length of the second achromatic lens assembly A2 and the sixth lens L6 is F2=5.91, and F2/F=1.63.

Figure 2:
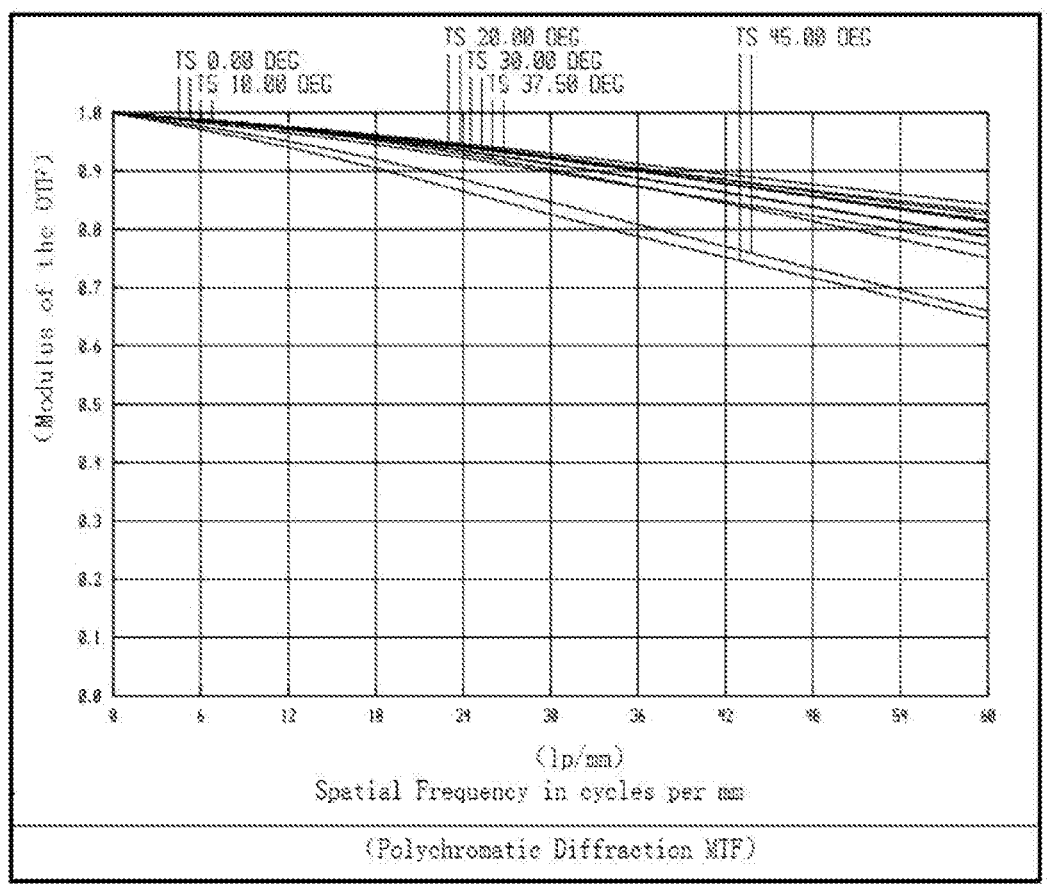
FIG. 2 shows a MTF resolution curve of the lens assembly for the optical imaging lens according to the above first preferred embodiment of the present invention.
Figure 3:
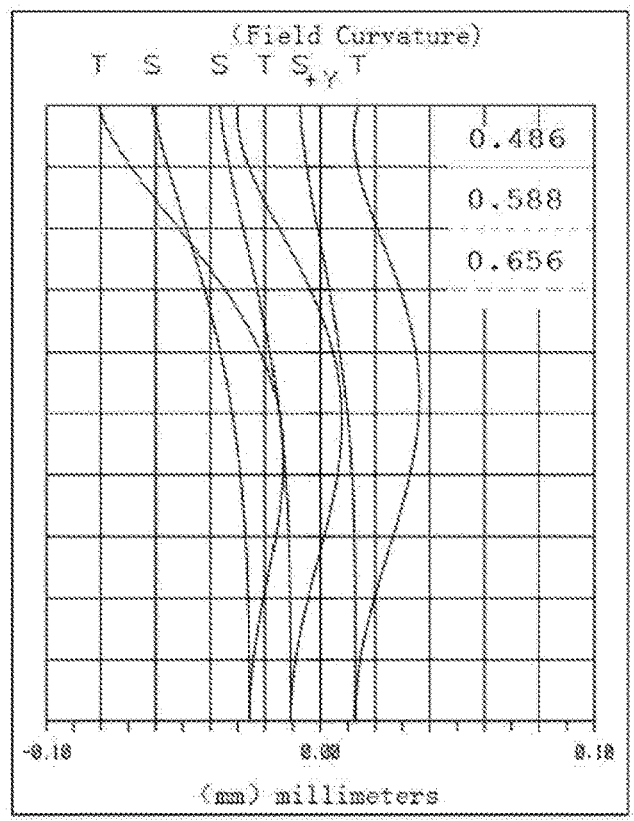
FIG. 3 shows an astigmatism curve of the lens assembly for the optical imaging lens according to the above first preferred embodiment of the present invention.
Figure 4:
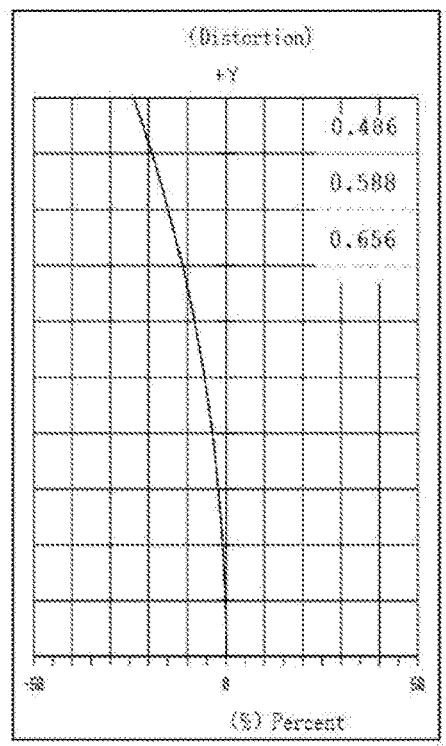
FIG. 4 shows a distortion curve of the lens assembly for the optical imaging lens according to the above first preferred embodiment of the present invention.

As shown in FIGS. 2 to 4 are curve graphs showing the optical properties of the specific example of the lens assembly according to the first preferred embodiment of the present invention, wherein FIG. 2 shows a MTF resolution curve of the specific example of the optical imaging lens employing the lens assembly according to the first preferred embodiment of the present invention; and FIG. 3 is a diagram showing an astigmatisma curve of the specific example of the lens assembly according to the first preferred embodiment of the present invention, which is represented by the wavelength of common three-color light in units of mm; and FIG. 4 is a diagram showing the distortion curve of the specific example of the lens assembly according to the first preferred embodiment of the present invention, which shows the value of the normalized distortion in different field angles. As shown in FIGS. 2 to 4, the optical imaging lens employing the specific example of the lens assembly according to the first preferred embodiment of the present invention has better optical performance.

As described above, the lens assembly for the optical imaging lens according to the first preferred embodiment of the present invention enables the entire optical imaging lens to be miniaturized under the condition of high pixel, small distortion, high-resolution imaging. In addition, the lens assembly for the optical imaging lens according to the first preferred embodiment of the present invention may be made of a material which is insensitive to temperature change, for example, a glass material, so that its performance can be remained stable under a condition with changing temperatures.

Referring to FIGS. 5 to 8 of the accompanying drawings of the present invention, a lens assembly for an optical imaging lens according to a second preferred embodiment of the present invention is illustrated, wherein the lens assembly of the optical imaging lens includes at least a first lens L1A, a second lens L2A, a third lens L3A, a fourth lens L4A, a fifth lens L5A and a sixth lens L6A, wherein the first lens L1A has a negative power, and the sixth lens L6A has a positive power, wherein the second lens L2A and the third lens L3A define a first achromatic lens assembly A1, and the fourth lens L4A and the fifth lens L5A defines a second achromatic lens assembly A2, wherein the first lens L1A, the first achromatic lens assembly A1, the second achromatic lens assembly A2 and the sixth lens L6A are orderly arranged along the direction from the object side to the image side.

As shown in FIGS. 5 to 8, the lens assembly according to the second preferred embodiment of the present invention, for the optical imaging lens, which comprises at least a first lens L1A, a second lens L2A, a third lens L3A, a fourth lens L4A, a fifth lens L5A and at least one sixth lens L6A, wherein the first lens L1A has a negative power, the second lens L2A has a positive power, the third lens L3A has a negative power; the fourth lens L4A has a positive power and the fifth lens L5A has a negative power, wherein the sixth lens L6A is an aspherical lens, wherein the sixth lens L6A comprises a center portion and an edge portion extended outwardly from the center portion, and the center portion of the sixth lens L6A has a positive power. Preferably, the first lens L1A, the second lens L2A, the third lens L3A, the fourth lens L4A, the fifth lens L5A and the sixth lens L6A are sequentially arranged along the direction from the object side to the image side, wherein the second lens L2A and the third lens L3A form the first achromatic lens assembly A1, and the fourth lens L4A and the fifth lens L5A form the second achromatic lens assembly A2. Alternatively, the first lens L1A, the second lens L2A, the third lens L3A, the fifth lens L5A, the fourth lens L4A and the sixth lens L6A are sequentially arranged along the direction from the object side to the image side. Preferably, the first lens L1A, the second lens L2A, the third lens L3A, the fourth lens L4A and/or the fifth lens L5A are aspheric lenses to improve the optical properties of the lens assembly according to the second preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1A, the second lens L2A, the third lens L3A, the fourth lens L4A, and/or the fifth lens L5A are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 5:
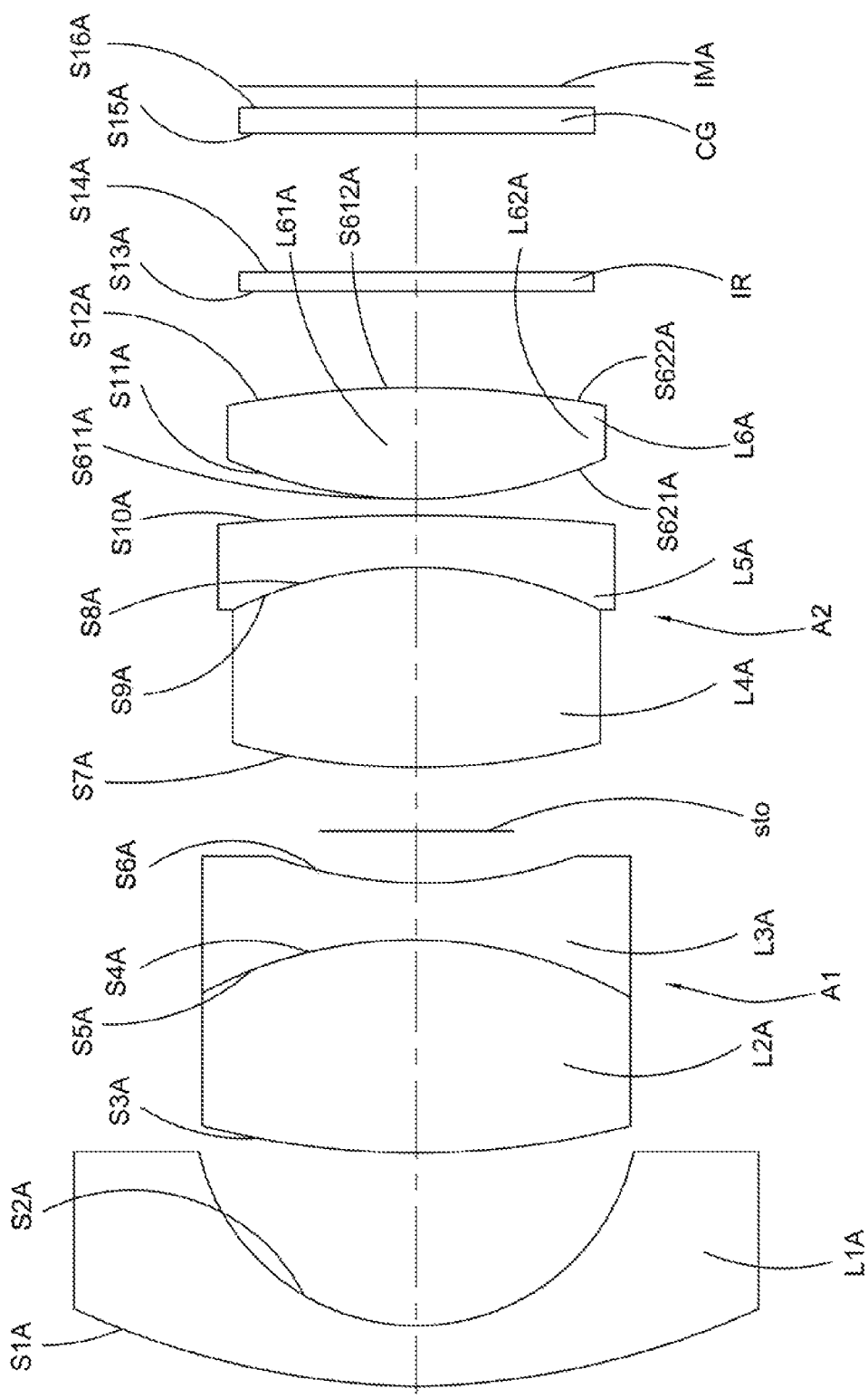
FIG. 5 is a structural schematic diagram of a lens assembly for an optical imaging lens according to a second preferred embodiment of the present invention.

As shown in FIG. 5, the first lens L1A, the second lens L2A, the third lens L3A, the fourth lens L4A, the fifth lens L5A and the sixth lens L6A of the lens assembly according to the second preferred embodiment of the present invention are coaxial with each other, which is used for the optical imaging lens.

As shown in FIG. 5, the lens assembly for the optical imaging lens according to the second preferred embodiment of the present invention further includes a diaphragm STO, wherein the diaphragm STO is provided between the third lens L3A and the four lens L4A, wherein the optical center of the diaphragm STO is coaxial with the optical centers of the first lens L1A, the second lens L2A, the third lens L3A, the fourth lens L4A, the fifth lens L5A and the sixth lens L6A. Alternatively, the diaphragm STO is provided between the first lens L1A and the second lens L2A. Alternatively, the diaphragm STO may also be provided between the fifth lens L5A and the sixth lens L6A. In some embodiments, the diaphragm STO is provided on the first lens L1A or the second lens L2A. In still other embodiments, the diaphragm STO is provided on the third lens L3A or the fourth lens L4A. In still other embodiments, the diaphragm STO is provided on the fifth lens L5A or the sixth lens L6A.

As shown in FIG. 5, the first lens L1A of the lens assembly for the optical imaging lens according to the second preferred embodiment of the present invention has a convex surface S1A and a concave surface S2A; the second lens L2A has two convex surfaces S3A, S4A; the third lens L3A has two concave surfaces SSA, S6A; the fourth lens L4A has two convex surfaces S7A, S8A; the fifth lens L5A has a concave surface S9A and a convex surface S10A; the center portion L61A of the sixth lens L6A has two convex surfaces S611A, S612A, and the edge portion L62A of the sixth lens L6A has two convex surfaces S621A, S622A, wherein the convex surface S1A of the first lens L1A faces the object side, the concave surface S2A of the first lens L1A faces the image side; the two convex surfaces S3A, S4A of the second lens L2A face the object side and the image side respectively; the two concave surfaces SSA, S6A of the third lens L3A face the object side and the image side respectively; the two convex surfaces S7A, S8A of the fourth lens L4A face the object side and the image side respectively; the concave surface S9A of the fifth lens L5A faces the object side, the convex surface S10A of the fifth lens L5A faces the image side; the convex surfaces S611A, S612A of the center portion L61A of the sixth lens L6A face the object side and the image side respectively, the convex surfaces S621A, S622A of the edge portion L62A of the sixth lens L6A face the object side and the image side respectively. Preferably, the convex surface S611A of the central portion L61A of the sixth lens L6A and the convex surface S621A of the edge portion L62A of the sixth lens L6A form a convex surface S11A facing the object side, and the convex surface S612A of the center portion L61A of the sixth lens L6A and the convex surface S622A of the edge portion L62A of the sixth lens L6A form a convex surface S12A facing the image side. Therefore, the first lens L1A, the second lens L2A, the third lens L3A, the fourth lens L4A, the fifth lens L5A and the sixth lens L6A of the lens assembly for the optical imaging lens according to the second preferred embodiment of the present invention are respectively double-sided lenses. Further, the second lens L2A is a biconvex lens, and the third lens L3A is a biconcave lens and the sixth lens L6A is a biconvex lens.

Alternatively, the first lens L1A of the lens assembly for the optical imaging lens according to the second preferred embodiment of the present invention has a concave surface S1A facing the object side and a concave surface S2A facing the image side. Alternatively, the edge portion L62A of the sixth lens L6A has a negative power. Optionally, the edge portion L62A of the sixth lens L6A has a convex surface S621A facing the object side and a concave surface S622A facing the image side. Therefore, the convex surface S611A of the central portion L61A of the sixth lens L6A and the convex surface S621A of the edge portion L62A of the sixth lens L6A form a convex surface S11A facing the object side.

It is worth mentioning that when the convex surface S1A of the first lens L1A of the lens assembly faces the object side, it is advantageous to make more light enter into the lens assembly as much as possible. At the same time, the convex surface S1A of the first lens L1A faces the object side, which makes the first lens L1A of the lens assembly not easily be contaminated with dirt when the lens assembly is used outdoor, for example, rain is easier to fall on a rainy day. When the first lens L1A facing the object side is a concave surface S2A, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 5, the convex surface S4A of the second lens L2A of the lens assembly for the optical imaging lens according to the second preferred embodiment of the present invention, which faces the image side, and the concave surface SSA of the third lens L3A, which faces the object side, are provided to face with each other; the convex surface S8A of the fourth lens L4A, which faces the image side, and the concave surface S9A of the fifth lens L5A, which faces the object side, are provided to face with each other.

As shown in FIG. 5, the first and second achromatic lens assemblies A1, A2 of the lens assembly for the optical imaging lens according to the second preferred embodiment of the present invention are preferably cemented lenses. In other words, the second lens L2A and the third lens L3A may be glued together to form the first achromatic lens assembly A1; the fourth lens L4A and the fifth lens L5A may be glued together to form the second achromatic lens assembly A2. At this time, since the second lens L2A and the third lens L3A are glued together and the fourth lens L4A and the fifth lens L5A are glued together, so the convex surface S4A of the second lens L2A and the concave surface S5A of the third lens L3A; the convex surface S8A of the fourth lens L4A and the concave surface S9A of the fifth lens L5A are glued together. Preferably, both the convex surface S4A of the second lens L2A and the concave surface S5A of the third lens L3A are aspherical. More preferably, the convex surface S8A of the fourth lens L4A and the concave surface S9A of the fifth lens L5A are both aspherical to further reduce the chromatic aberration. Alternatively, the first and second achromatic lens assemblies A1, A2 may respectively be a double-separated achromatic lens assembly. It is appreciated that the second lens L2A and the third lens L3A are separately provided when the first and second achromatic lens assemblies A1, A2 are double-separated type achromatic lens assemblies; the fourth lens L4A and the fifth lens L5A are separately provided, the diaphragm STO may be provided between the second lens L2A and the third lens L3A or between the fourth lens L4A and the fifth lens L5A.

As shown in FIG. 5, the second lens L2A and the third lens L3A of the first achromatic lens assembly A1 of the lens assembly for the optical imaging lens according to the second preferred embodiment of the present invention have a negative power and a positive power respectively, wherein the second lens L2A is preferably made of material having a high refractive index and a low Abbe number, and the third lens L3A is preferably made of material having a low refractive index and a high Abbe number, wherein the second lens L2A having a positive power has a higher refractive index, and the third lens L3A having a negative power has a lower refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4A and the fifth lens L5A of the second achromatic lens assembly A2 of the lens assembly for the optical imaging lens according to the second preferred embodiment of the present invention also respectively have a positive power and a negative light power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1A and the first achromatic lens assembly A1 of the lens assembly for the optical imaging lens according to the second preferred embodiment of the present invention is F1, the focal length of the combination of the second achromatic lens assembly A2 and the sixth lens L6A is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6A and the image plane.

As shown in FIG. 5, furthermore, the lens assembly for the optical imaging system according to the second preferred embodiment of the present invention defines an image plane IMA, and the optical imaging system may further include a color filter IR and a protective glass CG disposed in front of the image plane IMA.

As shown in FIG. 5, the imaging light may enter from the convex surface S1A of the first lens L1A of the lens assembly and pass sequentially through the first lens L1A, the second lens L2A, the third lens L3A, the diaphragm STO, the fourth lens L4A, the fifth lens L5A, the sixth lens L6A, the color filter IR, and the protective plate CG, and then is imaged on the image plane IMA.

As shown in FIG. 5, the sixth lens L6A of the lens assembly for the optical imaging lens according to the second preferred embodiment of the present invention is an aspheric lens. Preferably, the sixth lens L6A is a glass aspherical lens. Optionally, the sixth lens L6A is a plastic aspherical lens. When the sixth lens L6A is made of plastic material, the overall weight and the manufacturing cost of the lens assembly may be reduced. More preferably, the aspherical surface of the sixth lens L6A can satisfy the following formula:

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the second preferred embodiment of the present invention is TTL (referred to the distance from the outermost point of the object side of the first lens L1A to the image plane of the lens assembly), and the focal length of the entire lens assembly is F, then TTL/F≤12, as shown in Table 3 and Table 4. Preferably, TTL/F≤7.5, to satisfy the miniaturization requirement of the lens assembly of the present invention.

TABLE 3 parameters of Lens surfaces of a specific example of a lens assembly according to the second preferred embodiment of the present invention:

| Serial number of surface S | Radius of curvature R | Distance between centers of two neighboring lenses d | Refractive index Nd | Abbe number Vd |
|---|---|---|---|---|
| S1A | 18.7382 | 0.9500 | 1.59 | 61.30 |
| S2A | 4.2606 | 3.0000 | | |
| S3A | 85.7702 | 4.0418 | 1.90 | 31.32 |
| S4A | −22.5629 | 0.0000 | | |
| S5A | −22.5629 | 0.7000 | 1.50 | 81.61 |
| S6A | 3.1623 | 3.5000 | | |
| STO | Infinity | 0.7095 | | |
| S7A | 6.7296 | 4.0000 | 1.71 | 53.80 |
| S8A | −3.8378 | 0.0000 | | |
| S9A | −3.8378 | 0.5500 | 1.78 | 25.72 |
| S10A | −24.6627 | 0.0180 | | |
| S11A | 9.2677 | 2.0000 | 1.59 | 61.16 |
| S12A | −9.1967 | 1.9794 | | |
| S13A | Infinity | 0.3000 | 1.52 | 64.20 |
| S14A | Infinity | 4.4863 | | |
| S15A | Infinity | 0.4000 | 1.52 | 64.17 |

TABLE 3-continued parameters of Lens surfaces of a specific example
of a lens assembly according to the second preferred
embodiment of the present invention:

| Serial number of surface S | Radius of curvature R | Distance between centers of two neighboring lenses d | Refractive index Nd | Abbe number Vd |
|---|---|---|---|---|
| S16A | Infinity | 0.1250 | | |
| IMA | Infinity | | | |

TABLE 4

Aspherical coefficients of the two surfaces of the sixth lens as above embodiment K, A, B, C, D, E: :

| Serial number of surface S | K | A | B | C | D | E |
|---|---|---|---|---|---|---|
| S11A | 9.876362 | $-3.0257 \times 10-4$ | $2.3879 \times 10-5$ | $-8.6412 \times 10-5$ | $1.7276 \times 10-5$ | $-1.5894 \times 10-6$ |
| S12A | -1.937488 | $4.3099 \times 10-3$ | $-9.1974 \times 10-5$ | $1.0994 \times 10-4$ | $-1.3105 \times 10-5$ | $8.4956 \times 10-7$ |

The above Table 3 and Table 4 show a specific example of a lens assembly for the optical imaging lens according to the second preferred embodiment of the present invention, wherein the specific example may be used in an optical imaging system, wherein the radius of curvature of the convex surface S1A of the first lens L1A is 18.7382, which faces the object side, the radius of curvature of the concave surface S2A of the first lens L1A is 4.2606, which faces facing the image side, wherein the refractive index of the first lens L1A is 1.59, the abbe's constant of the first lens L1A is 61.30, wherein the distance between the center (or optical center) of the convex surface S1A of the first lens L1A and the center (or optical center) of the concave surface S2A of the first lens L1A is 0.9500; the radius of curvature of the convex surface S3A of the second lens L2A is 85.7702, which faces the object side, and the radius of curvature of the convex surface S4A of the second lens L2A of the lens assembly is -22.5629, which faces the image side, wherein the refractive index of the second lens L2A is 1.90, the abbe's constant of the second lens L2 is 31.32, wherein the distance between the center (or optical center) of the concave surface S2A of the first lens L1A and the center (or optical center) of the convex surface S3A of the second lens L2A is 3.0000, and the distance between the center (or optical center) of the convex surface S3A and the center (or optical center) of the convex surface S4A of the second lens L2A is 4.0418; the radius of curvature of the concave surface S6A of the third lens L3A of the lens assembly is 3.1623, which faces the image side, wherein the refractive index of the third lens L3A is 1.50, the abbe's constant of the third lens L3A is 81.61, wherein the convex surface S4A of the second lens L2A is glued together with the concave surface SSA of the third lens L3A, and the distance between the center (or optical center) of the concave surface SSA and the center (or optical center) of the concave surface S6A of the third lens L3A is 0.7000, the distance between the center (or optical center) of the concave surface S6 of the third lens L3A and the diaphragm STO is 3.5000, the distance between the diaphragm STO and the fourth lens L4A is 0.7095; the radius of curvature of the convex surface S7A of the fourth lens L4A of the lens assembly is 6.7296, which faces the object side, the radius of curvature of the convex surface S8A of the fourth lens L4A of the lens assembly is -3.8378, which faces the image side, wherein the refractive index of the fourth lens L4A is 1.71, the abbe's constant of the fourth lens L4A is 53.80, wherein the distance between the center (or optical center) of the convex surface S7A of the fourth lens L4A and the center (or optical center) of the convex surface S8A of the fourth lens L4A is 4.0000; the radius of curvature of the convex surface S10A of the fifth lens L5A of the lens assembly is -24.6627, which faces the image side, wherein the refractive index of the fifth lens L5A is 1.78, the abbe's constant of the fifth lens L5A is 25.72, and the convex surface S8 of the fourth lens L4A is glued together with the concave surface S9A of the fifth lens L5A, wherein the distance between the center of the concave surface S9A of the fifth lens L5 and the center (or optical center) of the convex surface S10A of the fifth lens L5A is 0.5500; and the curvature radius of the convex surface S11A of the sixth lens L6A of the lens assembly is 9.2677, which faces the object side, the radius of curvature of the convex surface S12A of the sixth lens L6A is -9.1967, which faces the image side, wherein the abbe's constant of the sixth lens L6A is 61.16, wherein the distance between the center (or optical center) of the convex surface S11A of the fifth lens L5A and the center (or optical center) of the convex surface S11A of the sixth lens L6A is 0.0180, the distance between the center (or optical center) of the convex surface S11A of the sixth lens L6A and the center (or optical center) of the convex surface S12A of the sixth lens L6A is 2.0000, the distance between the sixth lens L6A of the lens assembly L6A and the color filter IR of the optical imaging system is 1.9794, the distance between the two surfaces S13A, S14A of the filter IR is 0.3000, the distance between the color filter IR of the optical imaging system and the protective glass CG is 4.4863, the distance between the two surfaces S15A, S16A of the protective plate CG is 0.40, and the distance between the protective glass CG and the image plane IMA is 0.125. In addition, both surfaces S11A, S12A of the sixth lens L6A are aspherical, and for S11A, K is 9.876362, the constant A is $-3.0257 \times 10-4$; B is $2.3879 \times 10-5$; C is $-8.6412 \times 10-5$; D is $1.7276 \times 10-5$; E is $-1.5894 \times 10-6$, or S12A, K is -1.937488, the constant A is $4.3099 \times 10-3$; B $-9.1974 \times 10-5$; C is $1.0994 \times 10-4$; D is $-1.3105 \times 10-5$; E is $8.4956 \times 10-7$. In addition, the optical length of the lens assembly for the optical imaging lens according to the second preferred embodiment of the present invention is TTL=26.76, and the focal length F of the entire lens assembly is F=2.67, then TTL/F=10.02. The total focal length of the second achromatic lens assembly A2 and the sixth lens L6A is F2=5.15, and F2/F=1.93.

Figure 6:
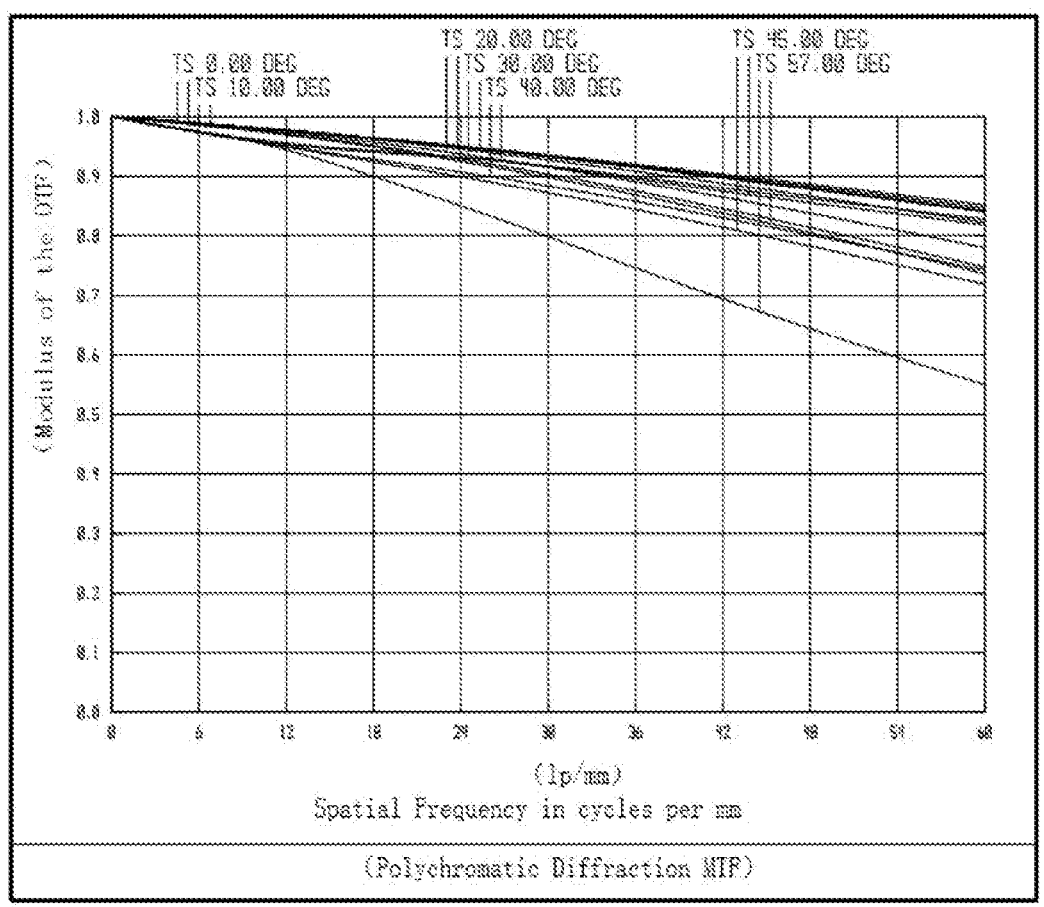
FIG. 6 shows a MTF resolution curve of the lens assembly for the optical imaging lens according to the above second preferred embodiment of the present invention.
Figure 7:
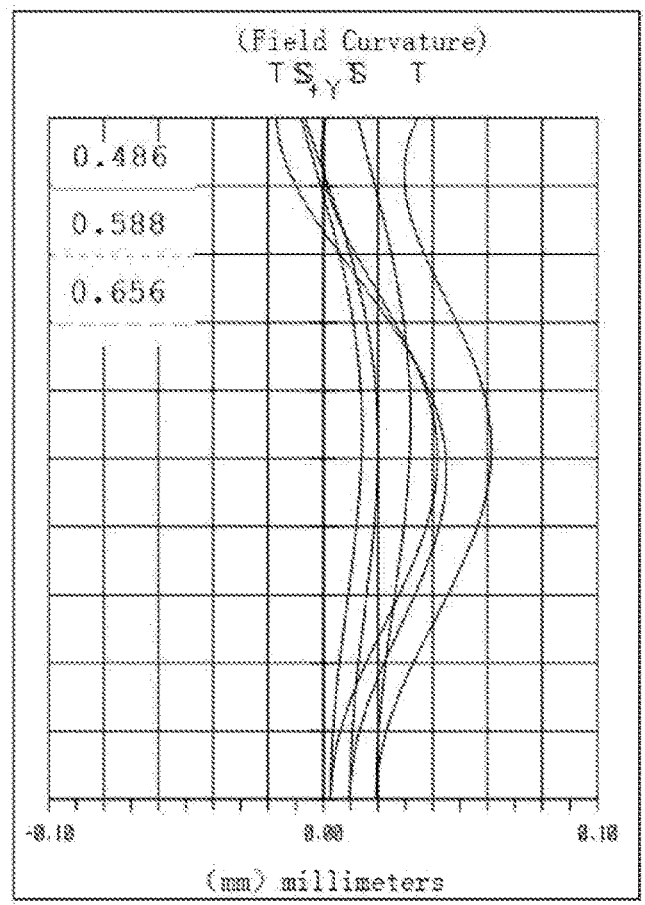
FIG. 7 shows an astigmatism curve of the lens assembly for the optical imaging lens according to the above second preferred embodiment of the present invention.
Figure 8:
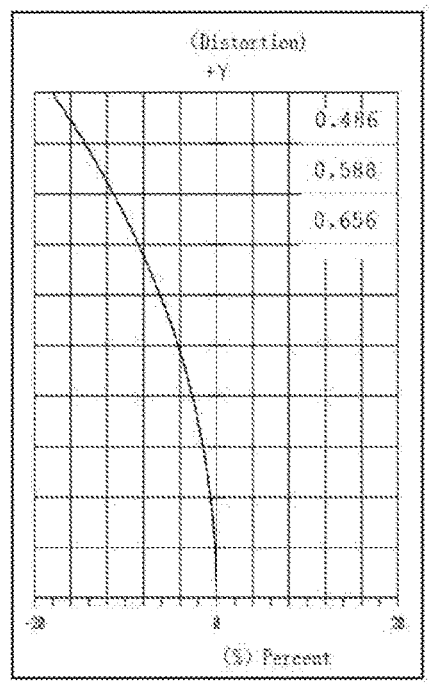
FIG. 8 shows a distortion curve of the lens assembly for the optical imaging lens according to the above second preferred embodiment of the present invention.

As shown in FIGS. 6 to 8 are curve graphs showing the optical properties of the specific example of the lens assembly according to the second preferred embodiment of the present invention, wherein FIG. 6 shows a MTF resolution curve of the specific example of the optical imaging lens employing the lens assembly according to the second preferred embodiment of the present invention; and FIG. 7 is a diagram showing an astigmatisma curve of the specific example of the lens assembly according to the second preferred embodiment of the present invention, which is represented by the wavelength of common three-color light in units of mm; and FIG. 8 is a diagram showing the distortion curve of the specific example of the lens assembly according to the second preferred embodiment of the present invention, which shows the value of the normalized distortion in different field angles. As shown in FIGS. 6 to 8, the optical imaging lens employing the specific example of the lens assembly according to the second preferred embodiment of the present invention has better optical performance.

Referring to FIGS. 9 to 12 of the accompanying drawings of the present invention, a lens assembly for an optical imaging lens according to a third preferred embodiment of the present invention is illustrated, wherein the lens assembly of the optical imaging lens includes at least a first lens L1B, a second lens L2B, a third lens L3B, a fourth lens L4B, a fifth lens L5B and a sixth lens L6B, wherein the first lens L1B has a negative power, and the sixth lens L6B has a positive power, wherein the second lens L2B and the third lens L3B define a first achromatic lens assembly A1, and the fourth lens L4B and the fifth lens L5B defines a second achromatic lens assembly A2, wherein the first lens L1B, the first achromatic lens assembly A1, the second achromatic lens assembly A2 and the sixth lens L6B are orderly arranged along the direction from the object side to the image side.

As shown in FIGS. 9 to 12, the lens assembly according to the third preferred embodiment of the present invention, for the optical imaging lens, which comprises at least a first lens L1B, a second lens L2B, a third lens L3B, a fourth lens L4B, a fifth lens L5B and at least one sixth lens L6B, wherein the first lens L1B has a negative power, the second lens L2B has a positive power, the third lens L3B has a negative power; the fourth lens L4B has a positive power and the fifth lens L5B has a negative power, wherein the sixth lens L6B is an aspherical lens, wherein the sixth lens L6B comprises a center portion and an edge portion extended outwardly from the center portion, and the center portion of the sixth lens L6B has a positive power. Preferably, the first lens L1B, the second lens L2B, the third lens L3B, the fourth lens L4B, the fifth lens L5B and the sixth lens L6B are sequentially arranged along the direction from the object side to the image side, wherein the second lens L2B and the third lens L3B form the first achromatic lens assembly A1, and the fourth lens L4B and the fifth lens L5B form the second achromatic lens assembly A2. Alternatively, the first lens L1B, the second lens L2B, the third lens L3B, the fifth lens L5B, the fourth lens L4B and the sixth lens L6B are sequentially arranged along the direction from the object side to the image side. Preferably, the first lens L1B, the second lens L2B, the third lens L3B, the fourth lens L4B and/or the fifth lens L5B are aspheric lenses to improve the optical properties of the lens assembly according to the third preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1B, the second lens L2B, the third lens L3B, the fourth lens L4B, and/or the fifth lens L5B are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 9:
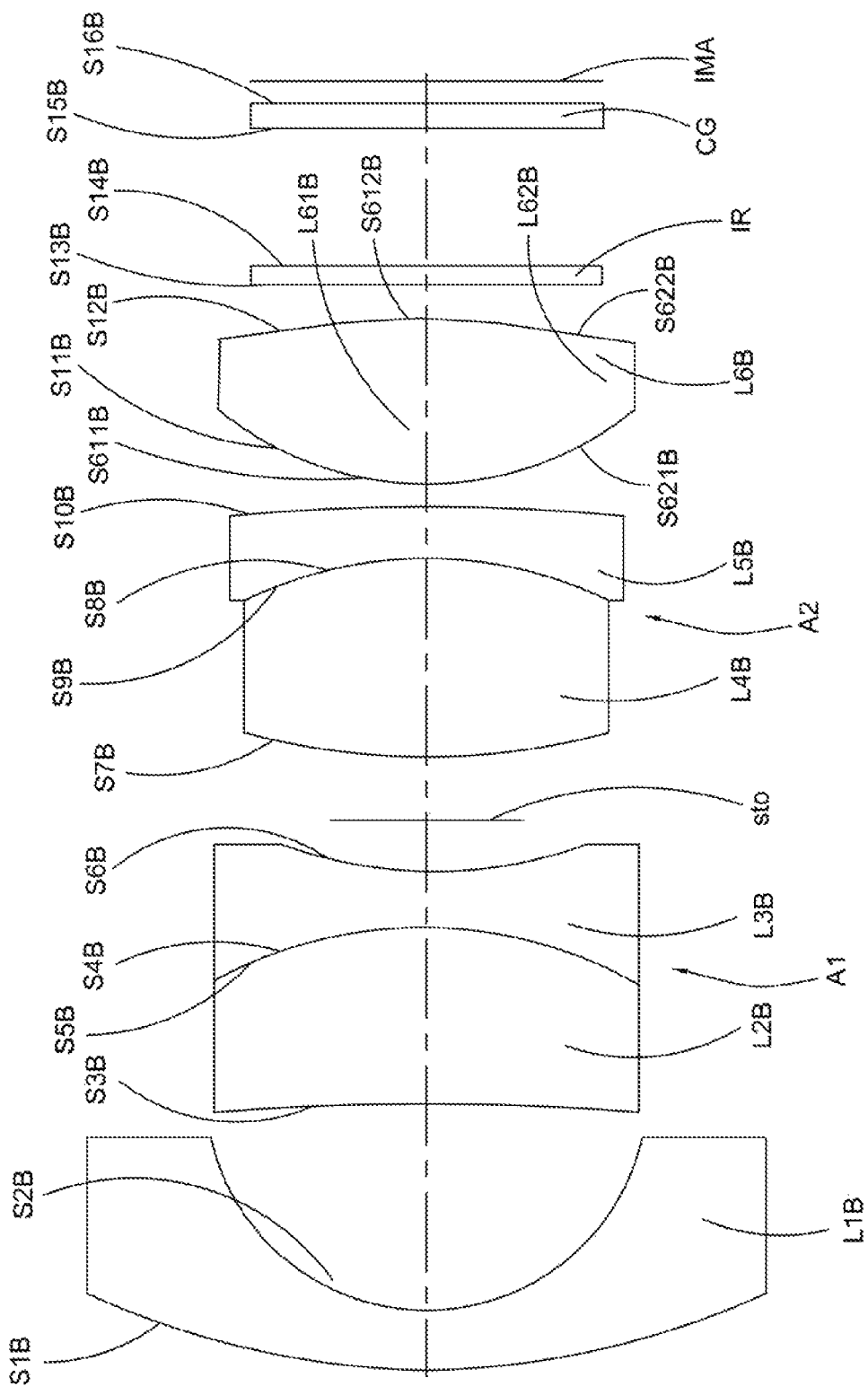
FIG. 9 is a structural schematic diagram of a lens assembly for an optical imaging lens according to a third preferred embodiment of the present invention.

As shown in FIG. 9, the first lens L1B, the second lens L2B, the third lens L3B, the fourth lens L4B, the fifth lens L5B and the sixth lens L6B of the lens assembly according to the third preferred embodiment of the present invention are coaxial with each other, which is used for the optical imaging lens.

As shown in FIG. 9, the lens assembly for the optical imaging lens according to the third preferred embodiment of the present invention further includes a diaphragm STO, wherein the diaphragm STO is provided between the third lens L3B and the fourth lens L4B, wherein the optical center of the diaphragm STO is coaxial with the optical centers of the first lens L1B, the second lens L2B, the third lens L3B, the fourth lens L4B, the fifth lens L5B and the sixth lens L6B. Alternatively, the diaphragm STO is provided between the first lens L1B and the second lens L2B. Alternatively, the diaphragm STO may also be provided between the fifth lens L5B and the sixth lens L6B. In some embodiments, the diaphragm STO is provided on the first lens L1B or the second lens L2B. In still other embodiments, the diaphragm STO is provided on the third lens L3B or the fourth lens L4B. In still other embodiments, the diaphragm STO is provided on the fifth lens L5B or the sixth lens L6B.

As shown in FIG. 9, the first lens L1B of the lens assembly for the optical imaging lens according to the third preferred embodiment of the present invention has a convex surface S1B and a concave surface S2B; the second lens L2B has a concave surface S3B and a convex surface S4B; the third lens L3B has two concave surfaces S5B, S6B; the fourth lens L4B has two convex surfaces S7B, S8B; the fifth lens L5B has a concave surface S9B and a convex surface S10B; the center portion L61B of the sixth lens L6B has two convex surfaces S611B, S612B, and the edge portion L62B of the sixth lens L6B has two convex surfaces S621B, S622B, wherein the convex surface S1B of the first lens L1B faces the object side, the concave surface S2B of the first lens L1B faces the image side; the concave surface S3B of the second lens L2B faces the object side, the convex surface S4B of the second lens L2B faces the image side; the two concave surfaces S5B, S6B of the third lens L3B face the object side and the image side respectively; the two convex surfaces S7B, S8B of the fourth lens L4B face the object side and the image side respectively; the concave surface S9B of the fifth lens L5B faces the object side, the convex surface S10B of the fifth lens L5B faces the image side; the convex surfaces S611B, S612B of the center portion L61B of the sixth lens L6B face the object side and the image side respectively, the convex surfaces S621B, S622B of the edge portion L62B of the sixth lens L6B face the object side and the image side respectively. Preferably, the convex surface S611B of the central portion L61B of the sixth lens L6B and the convex surface S621B of the edge portion L62B of the sixth lens L6B form a convex surface S11B facing the object side, and the convex surface S612B of the center portion L61B of the sixth lens L6B and the convex surface S622B of the edge portion L62B of the sixth lens L6B form a convex surface S12B facing the image side. Therefore, the edge portion of the sixth lens L6B has a positive power, and the first lens L1B, the second lens L2B, the third lens L3B, the fourth lens L4B, the fifth lens L5B and the sixth lens L6B of the lens assembly for the optical imaging lens according to the third preferred embodiment of the present invention are respectively double-sided lenses. Further, the third lens L3B is a biconcave lens and the sixth lens L6B is a biconvex lens.

Alternatively, the first lens L1B of the lens assembly for the optical imaging lens according to the third preferred embodiment of the present invention has a concave surface S1B facing the object side and a concave surface S2B facing the image side. Alternatively, the edge portion L62B of the sixth lens L6B has a negative power. Optionally, the edge portion L62B of the sixth lens L6B has a convex surface S621B facing the object side and a concave surface S622B facing the image side. Therefore, the convex surface S611B of the central portion L61B of the sixth lens L6B and the convex surface S621B of the edge portion L62B of the sixth lens L6B form a convex surface S11B facing the object side.

It is worth mentioning that when the convex surface S1B of the first lens L1B of the lens assembly faces the object side, it is advantageous to make more light enter into the lens assembly as much as possible. At the same time, the convex surface S1B of the first lens L1B faces the object side, which makes the first lens L1B of the lens assembly not easily be contaminated with dirt when the lens assembly is used outdoor, for example, rain is easier to fall on a rainy day. When the first lens L1B facing the object side is a concave surface S2B, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 9, the convex surface S4B of the second lens L2B of the lens assembly for the optical imaging lens according to the third preferred embodiment of the present invention, which faces the image side, and the concave surface S5B of the third lens L3B, which faces the object side, are provided to face with each other; the convex surface S8B of the fourth lens L4B, which faces the image side, and the concave surface S9B of the fifth lens L5B, which faces the object side, are provided to face with each other.

As shown in FIG. 9, the first and second achromatic lens assemblies A1, A2 of the lens assembly for the optical imaging lens according to the third preferred embodiment of the present invention are preferably cemented lenses. In other words, the second lens L2B and the third lens L3B may be glued together to form the first achromatic lens assembly A1; the fourth lens L4B and the fifth lens L5B may be glued together to form the second achromatic lens assembly A2. At this time, since the second lens L2B and the third lens L3B are glued together and the fourth lens L4B and the fifth lens L5B are glued together, so the convex surface S4B of the second lens L2B and the concave surface S5B of the third lens L3B; the convex surface S8B of the fourth lens L4B and the concave surface S9B of the fifth lens L5B are glued together. Preferably, both the convex surface S4B of the second lens L2B and the concave surface S5B of the third lens L3B are aspherical. More preferably, the convex surface S8B of the fourth lens L4B and the concave surface S9B of the fifth lens L5B are both aspherical to further reduce the chromatic aberration. Alternatively, the first and second achromatic lens assemblies A1, A2 may respectively be a double-separated achromatic lens assembly. It is appreciated that the second lens L2B and the third lens L3B are separately provided when the first and second achromatic lens assemblies A1, A2 are double-separated type achromatic lens assemblies; the fourth lens L4B and the fifth lens L5B are separately provided, the diaphragm STO may be provided between the second lens L2B and the third lens L3B or between the fourth lens L4B and the fifth lens L5B.

As shown in FIG. 9, the second lens L2B and the third lens L3B of the first achromatic lens assembly A1 of the lens assembly for the optical imaging lens according to the third preferred embodiment of the present invention have a negative power and a positive power respectively, wherein the second lens L2B is preferably made of material having a high refractive index and a low Abbe number, and the third lens L3B is preferably made of material having a low refractive index and a high Abbe number, wherein the second lens L2B having a positive power has a higher refractive index, and the third lens L3B having a negative power has a lower refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4B and the fifth lens L5B of the second achromatic lens assembly A2 of the lens assembly for the optical imaging lens according to the third preferred embodiment of the present invention also respectively have a positive power and a negative light power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1B and the first achromatic lens assembly A1 of the lens assembly for the optical imaging lens according to the third preferred embodiment of the present invention is F1, the focal length of the combination of the second achromatic lens assembly A2 and the sixth lens L6B is F2, and the focal length of the entire lens assembly is F, preferably, $1.0 \leq F2/F \leq 2.2$. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6B and the image plane.

As shown in FIG. 9, furthermore, the lens assembly for the optical imaging system according to the third preferred embodiment of the present invention defines an image plane IMA, and the optical imaging system may further include a color filter IR and a protective glass CG disposed in front of the image plane IMA.

As shown in FIG. 9, the imaging light may enter from the convex surface S1B of the first lens L1B of the lens assembly and pass sequentially through the first lens L1B, the second lens L2B, the third lens L3B, the diaphragm STO, the fourth lens L4B, the fifth lens L5B, the sixth lens L6B, the color filter IR, and the protective plate CG, and then is imaged on the image plane IMA.

As shown in FIG. 9, the sixth lens L6B of the lens assembly for the optical imaging lens according to the third preferred embodiment of the present invention is an aspheric lens. Preferably, the sixth lens L6B is a glass aspherical lens.

Optionally, the sixth lens L6B is a plastic aspherical lens. When the sixth lens L6B is made of plastic material, the overall weight and the manufacturing cost of the lens assembly may be reduced. More preferably, the aspherical surface of the sixth lens L6B can satisfy the following formula:

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the third preferred embodiment of the present invention is TTL (referred to the distance from the outermost point of the object side of the first lens L1B to the image plane of the lens assembly), and the focal length of the entire lens assembly is F, then TTL/F≤12, as shown in Table 5 and Table 6. Preferably, TTL/F≤7.5, to satisfy the miniaturization requirement of the lens assembly of the present invention.

TABLE 5 parameters of Lens surfaces of a specific example of a lens assembly according to the third preferred embodiment of the present invention:

| Serial number of surface S | Radius of curvature R | Distance between centers of two neighboring lenses d | Refractive index Nd | Abbe number Vd |
|---|---|---|---|---|
| S1B | 14.4540 | 0.9500 | 1.52 | 64.20 |
| S2B | 3.7838 | 3.5000 | | |
| S3B | −100.0000 | 2.3924 | 1.90 | 31.32 |
| S4B | −9.8797 | 0.0000 | | |
| S5B | −9.8797 | 0.5000 | 1.50 | 81.61 |
| S6B | 4.1623 | 2.1453 | | |
| STO | Infinity | 0.3142 | | |
| S7B | 5.1014 | 4.0000 | 1.64 | 55.50 |
| S8B | −3.5581 | 0.0000 | | |
| S9B | −3.5581 | 0.5000 | 1.78 | 25.72 |
| S10B | −175.6395 | 0.1000 | | |
| S11B | 7.4287 | 1.6275 | 1.59 | 61.16 |
| S12B | −5.9565 | 1.9956 | | |
| S13B | Infinity | 0.3000 | 1.52 | 64.20 |
| S14B | Infinity | 3.4734 | | |
| S15B | Infinity | 0.4000 | 1.52 | 64.17 |
| S16B | Infinity | 0.1250 | | |
| IMA | Infinity | | | |

TABLE 6

Aspherical coefficients of the two surfaces of the sixth lens as above embodiment K, A, B, C, D, E:

| Serial number of surface S | K | A | B | C | D | E |
|---|---|---|---|---|---|---|
| S11B | 6.968532 | −9.8124 × 10−4 | 2.2905 × 10−4 | −7.5200 × 10−5 | 2.6476 × 10−5 | −3.3239 × 10−6 |
| S12B | −3.813857 | 4.8004 × 10−4 | −5.5414 × 10−4 | 3.6405 × 10−4 | −4.6727 × 10−5 | 3.2293 × 10−6 |

Table 5 and Table 6 show a specific example of a lens assembly for the optical imaging lens according to the third preferred embodiment of the present invention, wherein the specific example may be used in an optical imaging system, wherein the radius of curvature of the convex surface S1B of the first lens L1B is 14.4540, which faces the object side, the radius of curvature of the concave surface S2B of the first lens L1B is 3.7838, which faces facing the image side, wherein the refractive index of the first lens L1B is 1.52, the abbe's constant of the first lens L1B is 64.20, wherein the distance between the center (or optical center) of the convex surface S1B of the first lens L1B and the center (or optical center) of the concave surface S2B of the first lens L1B is 0.9500; the radius of curvature of the concave surface S3B of the second lens L2B is −100.0000, which faces the object side, and the radius of curvature of the convex surface S4B of the second lens L2B of the lens assembly is −9.8797, which faces the image side, wherein the refractive index of the second lens L2B is 1.9, the abbe's constant of the second lens L2B is 31.32, wherein the distance between the center (or optical center) of the concave surface S2 of the first lens L1B and the center (or optical center) of the concave surface S3B of the second lens L2B is 3.5000, and the distance between the center (or optical center) of the concave surface S3B and the center (or optical center) of the convex surface S4B of the second lens L2B is 2.3924; the radius of curvature of the concave surface S6B of the third lens L3B of the lens assembly is 4.1623, which faces the image side, wherein the refractive index of the third lens L3B is 1.50, the abbe's constant of the third lens L3B is 81.61, wherein the convex surface S4 of the second lens L2B is glued together with the concave surface S5B of the third lens L3B, and the distance between the center (or optical center) of the concave surface S5B and the center (or optical center) of the concave surface S6B of the third lens L3B is 0.5000, the distance between the center (or optical center) of the convex surface S6B of the third lens L3B and the diaphragm STO is 2.1453, the distance between the diaphragm STO and the fourth lens L4B is 0.3142; the radius of curvature of the convex surface S7B of the fourth lens L4B of the lens assembly is 5.1014, which faces the object side, the radius of curvature of the convex surface S8B of the fourth lens L4B of the lens assembly is −3.5581, which faces the image side, wherein the refractive index of the fourth lens L4B is 1.64, the abbe's constant of the fourth lens L4B is 55.50, wherein the distance between the center (or optical center) of the convex surface S7B of the fourth lens L4B and the center (or optical center) of the convex surface S8B of the fourth lens L4B is 4.0000; the radius of curvature of the convex surface S10B of the fifth lens L5B of the lens assembly is −175.6395, which faces the image side, wherein the refractive index of the fifth lens L5B is 1.78, the abbe's constant of the fifth lens L5B is 25.72, and the convex surface S8B of the fourth lens L4B is glued together with the concave surface S9B of the fifth lens L5B, wherein the distance between the center of the concave surface S9B of the fifth lens L5B and the center (or optical center) of the convex surface S10B of the fifth lens L5B is 0.5000; and the curvature radius of the convex surface S11B of the sixth lens L6B of the lens assembly is 7.4287, which faces the object side, the radius of curvature of the convex surface S12B of the sixth lens L6B is −5.9565, which faces the image side, wherein the abbe's constant of the sixth lens L6B is 61.16, wherein the distance between the center (or optical center) of the convex surface S10B of the fifth lens L5B and the center (or optical center) of the convex surface S11B of the sixth lens L6 is 0.1000, the distance between the center (or optical center) of the convex surface S11B of the sixth lens L6B and the center (or optical center) of the convex surface S12B of the sixth lens L6B is 1.6275, the distance between the sixth lens L6B of the lens assembly L6B and the color filter IR of the optical imaging system is 1.9956, the distance between the two surfaces S13B, S14B of the filter IR is 0.3000, the distance between the color filter IR of the optical imaging system and the protective glass CG is 3.4734, the distance between the two surfaces S15B, S16B of the protective plate CG is 0.40, and the distance between the protective glass CG and the image plane IMA is 0.125. In addition, both surfaces S11B, S12B of the sixth lens L6B are aspherical, and for S11B, K is 6.968532, the constant A is −9.8124×10−4; B is 2.2905×10−4; C is −7.5200×10−5; D is 2.6476×10−5; E is −3.3239×10−6, or S12B, K is −3.813857, the constant A is 4.8004×10−4; B is −5.5414×10−4; C is 3.6405×10−4; D is −4.6727×10−5; E is 3.2293×10-6.

In addition, the optical length of the lens assembly for the optical imaging lens according to the third preferred embodiment of the present invention is TTL=22.32, and the focal length F of the entire lens assembly is F=3.35, then TTL/F=6.66. The total focal length of the second achromatic lens assembly A2 and the sixth lens L6B is F2=4.96, and F2/F=1.48.

Figure 10:
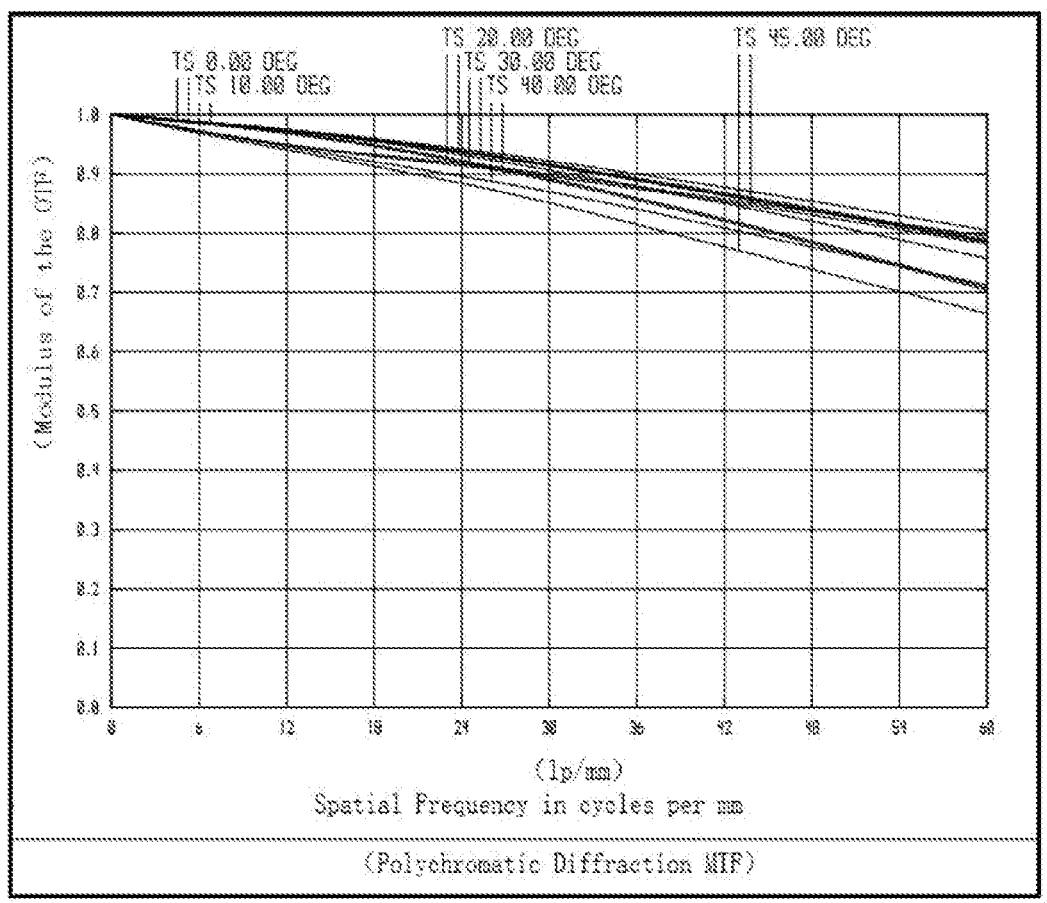
FIG. 10 shows a MTF resolution curve of the lens assembly for the optical imaging lens according to the above third preferred embodiment of the present invention.
Figure 11:
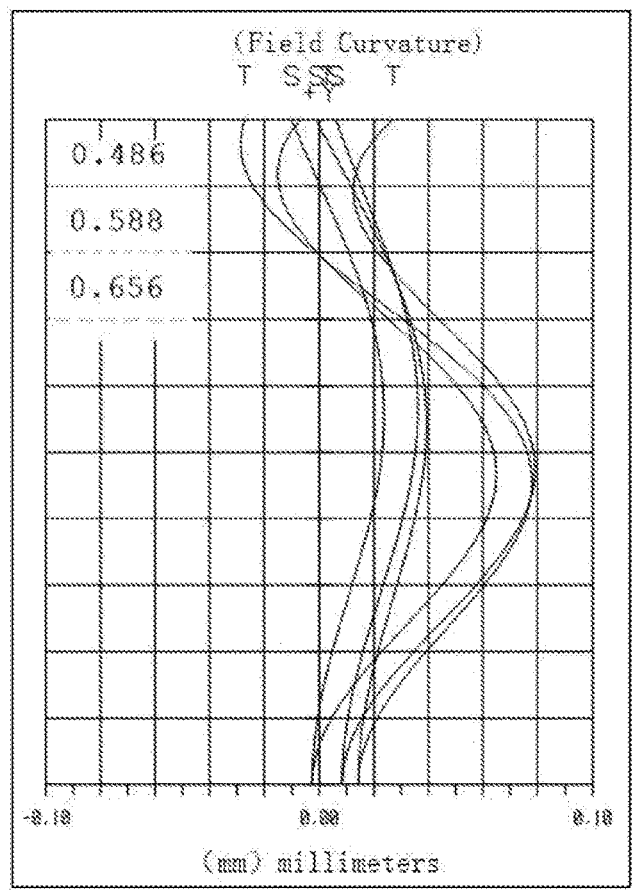
FIG. 11 shows an astigmatism curve of the lens assembly for the optical imaging lens according to the above third preferred embodiment of the present invention.
Figure 12:
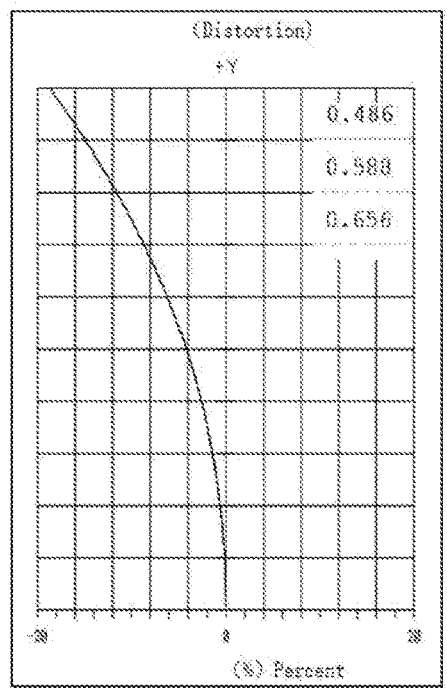
FIG. 12 shows a distortion curve of the lens assembly for the optical imaging lens according to the above third preferred embodiment of the present invention.

As shown in FIGS. 10 to 12 are curve graphs showing the optical properties of the specific example of the lens assembly according to the third preferred embodiment of the present invention, wherein FIG. 10 shows a MTF resolution curve of the specific example of the optical imaging lens employing the lens assembly according to the third preferred embodiment of the present invention; and FIG. 11 is a diagram showing an astigmatisma curve of the specific example of the lens assembly according to the third preferred embodiment of the present invention, which is represented by the wavelength of common three-color light in units of mm; and FIG. 12 is a diagram showing the distortion curve of the specific example of the lens assembly according to the third preferred embodiment of the present invention, which shows the value of the normalized distortion in different field angles. As shown in FIGS. 10 to 12, the optical imaging lens employing the specific example of the lens assembly according to the third preferred embodiment of the present invention has better optical performance.

Referring to FIGS. 13 to 16 of the accompanying drawings of the present invention, a lens assembly for an optical imaging lens according to a fourth preferred embodiment of the present invention is illustrated, wherein the lens assembly of the optical imaging lens includes at least a first lens L1C, a second lens L2C, a third lens L3C, a fourth lens L4C, a fifth lens L5C and a sixth lens L6C, wherein the first lens L1C has a negative power, and the sixth lens L6C has a positive power, wherein the second lens L2C and the third lens L3C define a first achromatic lens assembly A1, and the fourth lens L4C and the fifth lens L5C defines a second achromatic lens assembly A2, wherein the first lens L1C, the first achromatic lens assembly A1, the second achromatic lens assembly A2 and the sixth lens L6C are orderly arranged along the direction from the object side to the image side.

As shown in FIGS. 13 to 16, the lens assembly according to the fourth preferred embodiment of the present invention, for the optical imaging lens, which comprises at least a first lens L1C, a second lens L2C, a third lens L3C, a fourth lens L4C, a fifth lens L5C and at least one sixth lens L6C, wherein the first lens L1C has a negative power, the second lens L2C has a negative power, the third lens L3C has a positive power; the fourth lens L4C has a negative power and the fifth lens L5C has a positive power, wherein the sixth lens L6C is an aspherical lens, wherein the sixth lens L6C comprises a center portion and an edge portion extended outwardly from the center portion, and the center portion of the sixth lens L6C has a positive power. Preferably, the first lens L1C, the second lens L2C, the third lens L3C, the fourth lens L4C, the fifth lens L5C and the sixth lens L6C are sequentially arranged along the direction from the object side to the image side, wherein the second lens L2C and the third lens L3C form the first achromatic lens assembly A1, and the fourth lens L4C and the fifth lens L5C form the second achromatic lens assembly A2. Preferably, the first lens L1C, the second lens L2C, the third lens L3C, the fourth lens L4C and/or the fifth lens L5C are aspheric lenses to improve the optical properties of the lens assembly according to the fourth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1C, the second lens L2C, the third lens L3C, the fourth lens L4C, and/or the fifth lens L5C are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 13:
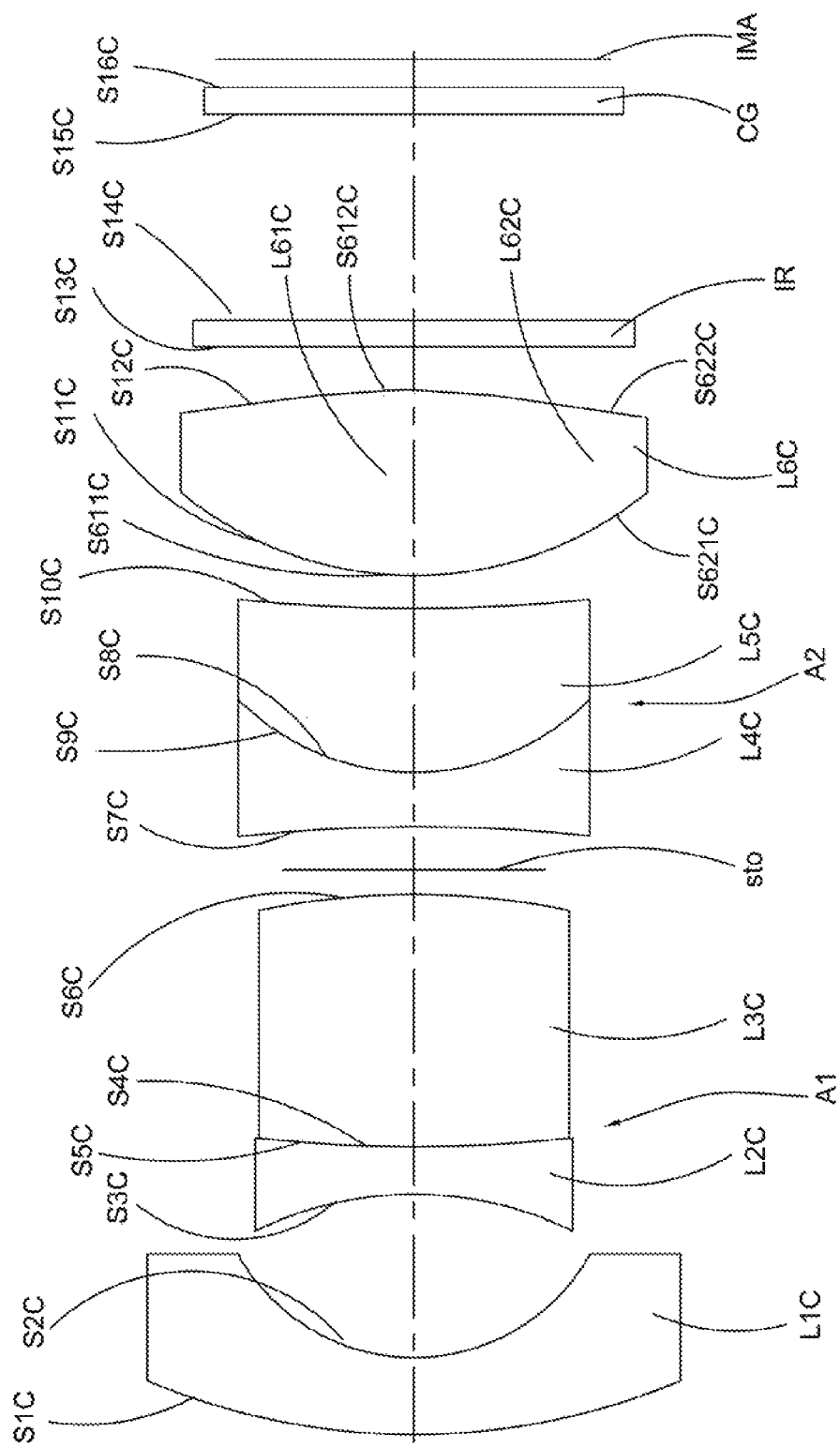
FIG. 13 is a structural schematic diagram of a lens assembly for an optical imaging lens according to a fourth preferred embodiment of the present invention.

As shown in FIG. 13, the first lens L1C, the second lens L2C, the third lens L3C, the fourth lens L4C, the fifth lens L5C and the sixth lens L6C of the lens assembly according to the fourth preferred embodiment of the present invention are coaxial with each other, which is used for the optical imaging lens.

As shown in FIG. 13, the lens assembly for the optical imaging lens according to the fourth preferred embodiment of the present invention further includes a diaphragm STO, wherein the diaphragm STO is provided between the third lens L3C and the fourth lens L4C, wherein the optical center of the diaphragm STO is coaxial with the optical centers of the first lens L1B, the second lens L2C, the third lens L3C, the fourth lens L4C, the fifth lens L5C and the sixth lens L6B. Alternatively, the diaphragm STO is provided between the first lens L1C and the second lens L2C. Alternatively, the diaphragm STO may also be provided between the fifth lens L5C and the sixth lens L6C. In some embodiments, the diaphragm STO is provided on the first lens L1C or the second lens L2C. In still other embodiments, the diaphragm STO is provided on the third lens L3C or the fourth lens L4C. In still other embodiments, the diaphragm STO is provided on the fifth lens L5C or the sixth lens L6C.

As shown in FIG. 13, the first lens L1C of the lens assembly for the optical imaging lens according to the fourth preferred embodiment of the present invention has a convex surface S1C and a concave surface S2C; the second lens L2C has two concave surfaces S3C, S4C; the third lens L3C has two convex surfaces S5C, S6C; the fourth lens L4C has two concave surfaces S7C, S8C; the fifth lens L5C has a convex surface S9C and a concave surface S10B; the center portion L61C of the sixth lens L6C has two convex surfaces S611C, S612C, and the edge portion L62C of the sixth lens L6C has two convex surfaces S621C, S622C, wherein the convex surface S1C of the first lens L1C faces the object side, the concave surface S2C of the first lens L1C faces the image side; the two concave surfaces S3C, S4C of the second lens L2C face the object side and the image side respectively; the two convex surfaces S5C, S6C of the third lens L3C face the object side and the image side respectively; the two convex surfaces S7C, S8C of the fourth lens L4C face the object side and the image side respectively; the convex surface S9C of the fifth lens L5C faces the object side, the concave surface S10C of the fifth lens L5C faces the image side; the convex surfaces S611C, S612C of the center portion L61C of the sixth lens L6C face the object side and the image side respectively, the convex surfaces S621C, S622C of the edge portion L62C of the sixth lens L6C face the object side and the image side respectively. Preferably, the edge portion of the sixth lens L6B has a positive power, and the edge portion L62C of the sixth lens L6C has two convex surfaces S621C, S622C, the convex surface S611C of the central portion L61C of the sixth lens L6C and the convex surface S621C of the edge portion L62C of the sixth lens L6C form a convex surface S11C facing the object side, and the convex surface S612C of the center portion L61C of the sixth lens L6C and the convex surface S622C of the edge portion L62C of the sixth lens L6C form a convex surface S12C facing the image side. Therefore, the first lens L1C, the second lens L2C, the third lens L3C, the fourth lens L4C, the fifth lens L5C and the sixth lens L6C of the lens assembly for the optical imaging lens according to the fourth preferred embodiment of the present invention are respectively double-sided lenses. Further, the second lens L2C is a biconcave lens, and the third lens L3C is a biconvex lens.

Alternatively, the first lens L1C of the lens assembly for the optical imaging lens according to the fourth preferred embodiment of the present invention has a concave surface S1C facing the object side and a concave surface S2C facing the image side. Alternatively, the edge portion L62C of the sixth lens L6C has a negative power. Optionally, the edge portion L62C of the sixth lens L6C has a convex surface S621C facing the object side and a concave surface S622C facing the image side. Therefore, the convex surface S611C of the central portion L61C of the sixth lens L6C and the convex surface S621C of the edge portion L62C of the sixth lens L6C form a convex surface S11C facing the object side.

It is worth mentioning that when the convex surface S1C of the first lens L1C of the lens assembly faces the object side, it is advantageous to make more light enter into the lens assembly as much as possible. At the same time, the convex surface S1C of the first lens L1C faces the object side, which makes the first lens L1C of the lens assembly not easily be contaminated with dirt when the lens assembly is used outdoor, for example, rain is easier to fall on a rainy day. When the first lens L1C facing the object side is a concave surface S2C, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 13, the concave surface S4C of the second lens L2C of the lens assembly for the optical imaging lens according to the fourth preferred embodiment of the present invention, which faces the image side, and the convex surface S5C of the third lens L3C, which faces the object side, are provided to face with each other; the concave surface S8C of the fourth lens L4C, which faces the image side, and the convex surface S9C of the fifth lens L5C, which faces the object side, are provided to face with each other.

As shown in FIG. 13, the first and second achromatic lens assemblies A1, A2 of the lens assembly for the optical imaging lens according to the fourth preferred embodiment of the present invention are preferably cemented lenses. In other words, the second lens L2C and the third lens L3C may be glued together to form the first achromatic lens assembly A1; the fourth lens L4C and the fifth lens L5C may be glued together to form the second achromatic lens assembly A2. At this time, since the second lens L2C and the third lens L3C are glued together and the fourth lens L4C and the fifth lens L5C are glued together, so the concave surface S4C of the second lens L2C and the convex surface S5C of the third lens L3C are glued together; the concave surface S8C of the fourth lens L4C and the convex surface S9C of the fifth lens L5C are glued together. Preferably, both the concave surface S4C of the second lens L2C and the convex surface S5C of the third lens L3C are aspherical. More preferably, the concave surface S8C of the fourth lens L4C and the convex surface S9C of the fifth lens L5C are both aspherical to further reduce the chromatic aberration. Alternatively, the first and second achromatic lens assemblies A1, A2 may respectively be a double-separated achromatic lens assembly. It is appreciated that the second lens L2C and the third lens L3C are separately provided when the first and second achromatic lens assemblies A1, A2 are double-separated type achromatic lens assemblies; the fourth lens L4C and the fifth lens L5C are separately provided, the diaphragm STO may be provided between the second lens L2C and the third lens L3C or between the fourth lens L4C and the fifth lens L5C.

As shown in FIG. 13, the second lens L2C and the third lens L3C of the first achromatic lens assembly A1 of the lens assembly for the optical imaging lens according to the fourth preferred embodiment of the present invention have a negative power and a positive power respectively, wherein the second lens L2C is preferably made of material having a low refractive index and a high Abbe number, and the third lens L3C is preferably made of material having a high refractive index and a low Abbe number, wherein the second lens L2C having a negative power has a lower refractive index, and the third lens L3C having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4C and the fifth lens L5C of the second achromatic lens assembly A2 of the lens assembly for the optical imaging lens according to the fourth preferred embodiment of the present invention also respectively have a positive power and a negative light power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1C and the first achromatic lens assembly A1 of the lens assembly for the optical imaging lens according to the fourth preferred embodiment of the present invention is F1, the focal length of the combination of the second achromatic lens assembly A2 and the sixth lens L6C is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6C and the image plane.

As shown in FIG. 13, furthermore, the lens assembly for the optical imaging system according to the fourth preferred embodiment of the present invention defines an image plane IMA, and the optical imaging system may further include a color filter IR and a protective glass CG disposed in front of the image plane IMA.

As shown in FIG. 13, the imaging light may enter from the convex surface S1C of the first lens L1C of the lens assembly and pass sequentially through the first lens L1C, the second lens L2C, the third lens L3C, the diaphragm STO, the fourth lens L4C, the fifth lens L5C, the sixth lens L6C, the color filter IR, and the protective plate CG, and then is imaged on the image plane IMA.

As shown in FIG. 13, the sixth lens L6C of the lens assembly for the optical imaging lens according to the fourth preferred embodiment of the present invention is an aspheric lens. Preferably, the sixth lens L6C is a glass aspherical lens. Optionally, the sixth lens L6C is a plastic aspherical lens. When the sixth lens L6C is made of plastic material, the overall weight and the manufacturing cost of the lens assembly may be reduced. More preferably, the aspherical surface of the sixth lens L6C can satisfy the following formula:

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the fourth preferred embodiment of the present invention is TTL (referred to the distance from the outermost point of the object side of the first lens L1C to the image plane of the lens assembly), and the focal length of the entire lens assembly is F, then TTL/F≤12, as shown in Table 7 and Table 8. Preferably, TTL/F≤7.5, to satisfy the miniaturization requirement of the lens assembly of the present invention.

TABLE 7 parameters of Lens surfaces of a specific example of a lens assembly according to the fourth preferred embodiment of the present invention:

| Serial number of surface S | Radius of curvature R | Distance between centers of two neighboring lenses d | Refractive index Nd | Abbe number Vd |
|---|---|---|---|---|
| S1C | 12.3177 | 1.0000 | 1.50 | 68.06 |
| 2C | 2.6321 | 2.3000 | | |
| S3C | -3.6023 | 0.5500 | 1.50 | 81.61 |
| S4C | 6.7377 | 0.0000 | | |
| S5C | 6.7377 | 2.0651 | 1.90 | 31.32 |
| S6C | -8.2837 | 0.0420 | | |
| STO | Infinity | 0.2000 | | |
| S7C | -21.6573 | 0.5525 | 1.78 | 25.72 |
| S8C | 3.3070 | 0.0000 | | |
| S9C | 3.3070 | 2.2000 | 1.77 | 49.60 |
| S10C | 69.7786 | 0.1532 | | |
| S11C | 5.1857 | 2.8916 | 1.61 | 60.61 |
| S12C | -5.6033 | 0.5000 | | |
| S13C | Infinity | 0.4000 | 1.52 | 64.20 |
| S14C | Infinity | 5.9561 | | |
| S15C | Infinity | 0.4000 | 1.52 | 64.17 |
| S16C | Infinity | 0.1250 | | |
| IMA | Infinity | | | |

TABLE 8

Aspherical coefficients of the two surfaces of the sixth lens as above embodiment K, A, B, C, D, E:

| Serial number of surface S | K | A | B | C | D | E |
|---|---|---|---|---|---|---|
| S11C | -24.60846 | $8.1578 \times 10^{-3}$ | $-9.5143 \times 10^{-4}$ | $8.3930 \times 10^{-5}$ | $-2.8149 \times 10^{-6}$ | $3.0439 \times 10^{-8}$ |
| S12C | -0.3078668 | $1.3320 \times 10^{-3}$ | $2.9381 \times 10^{-4}$ | $-4.0500 \times 10^{-5}$ | $3.8731 \times 10^{-6}$ | $-5.9425 \times 10^{-8}$ |

The above Table 7 and Table 8 show a specific example of a lens assembly for the optical imaging lens according to the fourth preferred embodiment of the present invention, wherein the specific example may be used in an optical imaging system, wherein the radius of curvature of the convex surface S1C of the first lens L1C is 12.3177, which faces the object side, the radius of curvature of the concave surface S2C of the first lens L1C is 2.6321, which faces facing the image side, wherein the refractive index of the first lens L1C is 1.50, the abbe's constant of the first lens L1C is 68.06, wherein the distance between the center (or optical center) of the convex surface S1C of the first lens L1C and the center (or optical center) of the concave surface S2C of the first lens L1 is 1.0000; the radius of curvature of the concave surface S3C of the second lens L2C is −3.6023, which faces the object side, and the radius of curvature of the concave surface S4C of the second lens L2C of the lens assembly is 6.7377, which faces the image side, wherein the refractive index of the second lens L2C is 1.5, the abbe's constant of the second lens L2 is 81.61, wherein the distance between the center (or optical center) of the concave surface S2C of the first lens L1C and the center (or optical center) of the concave surface S3C of the second lens L2C is 2.3000, and the distance between the center (or optical center) of the concave surface S3C and the center (or optical center) of the concave surface S4C of the second lens L2C is 0.5500; the radius of curvature of the convex surface S6C of the third lens L3C of the lens assembly is −8.2837, which faces the image side, wherein the refractive index of the third lens L3C is 1.9, the abbe's constant of the third lens L3C is 31.32, wherein the concave surface S4C of the second lens L2C is glued together with the convex surface SSC of the third lens L3C, and the distance between the center (or optical center) of the convex surface SSC and the center (or optical center) of the convex surface S6C of the third lens L3C is 2.0651, the distance between the center (or optical center) of the convex surface S6C of the third lens L3C and the diaphragm STO is 0.0420, the distance between the diaphragm STO and the fourth lens L4C is 0.2000; the radius of curvature of the concave surface S7C of the fourth lens L4C of the lens assembly is −21.6573, which faces the object side, the radius of curvature of the concave surface S8C of the fourth lens L4C of the lens assembly is 3.3070, which faces the image side, wherein the refractive index of the fourth lens L4C is 1.78, the abbe's constant of the fourth lens L4C is 25.72, wherein the distance between the center (or optical center) of the concave surface S7C of the fourth lens L4C and the center (or optical center) of the concave surface S8C of the fourth lens L4C is 0.5525; the radius of curvature of the concave surface S10C of the fifth lens L5C of the lens assembly is 69.7786, which faces the image side, wherein the refractive index of the fifth lens L5C is 1.77, the abbe's constant of the fifth lens L5C is 49.60, and the convex surface S8C of the fourth lens L4C is glued together with the concave surface S9C of the fifth lens L5C, wherein the distance between the center of the concave surface S9C of the fifth lens L5C and the center (or optical center) of the convex surface S10C of the fifth lens L5C is 2.2000; and the curvature radius of the convex surface S11C of the sixth lens L6C of the lens assembly is 5.1857, which faces the object side, the radius of curvature of the convex surface S12C of the sixth lens L6C is −5.6033, which faces the image side, wherein the abbe's constant of the sixth lens L6C is 60.61, wherein the distance between the center (or optical center) of the convex surface S10C of the fifth lens L5C and the center (or optical center) of the convex surface S11C of the sixth lens L6C is 0.1532, the distance between the center (or optical center) of the convex surface S11C of the sixth lens L6C and the center (or optical center) of the convex surface S12 of the sixth lens L6C is 2.8916, the distance between the sixth lens L6C of the lens assembly L6C and the color filter IR of the optical imaging system is 0.5, the distance between the two surfaces S13C, S14C of the filter IR is 0.4000, the distance between the color filter IR of the optical imaging system and the protective glass CG is 5.9561, the distance between the two surfaces S15C, S16C of the protective plate CG is 0.40, and the distance between the protective glass CG and the image plane IMA is 0.125. In addition, both surfaces S11C, S12C of the sixth lens L6C are aspherical, and for S11, K is −24.60846, the constant A is $8.1578 \times 10^{-3}$; B is $-9.5143 \times 10^{-4}$; C is $8.3930 \times 10^{-5}$; D is $-2.8149 \times 10^{-6}$; E is $3.0439 \times 10^{-8}$, or S12, K is −0.3078668, the constant A is $1.3320 \times 10^{-3}$; B is $2.9381 \times 10^{-4}$; C is $-4.0500 \times 10^{-5}$; D is $3.8731 \times 10^{-6}$; E is $-5.9425 \times 10^{-8}$.

In addition, the optical length of the lens assembly for the optical imaging lens according to the fourth preferred embodiment of the present invention is TTL=19.34, and the focal length F of the entire lens assembly is F=3.64, then TTL/F=5.32. The total focal length of the second achromatic lens assembly A2 and the sixth lens L6 is F2=2.65, and F2/F=1.55.

Figure 14:
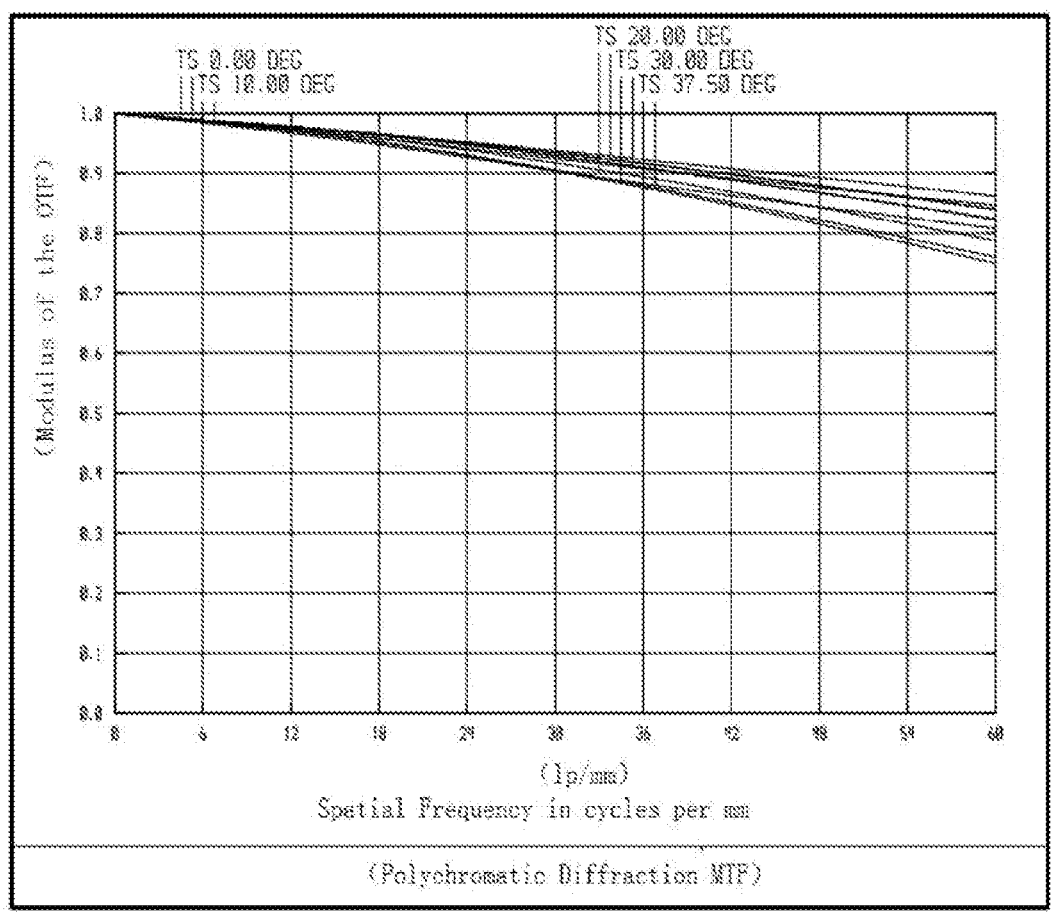
FIG. 14 shows a MTF resolution curve of the lens assembly for the optical imaging lens according to the above fourth preferred embodiment of the present invention.
Figure 15:
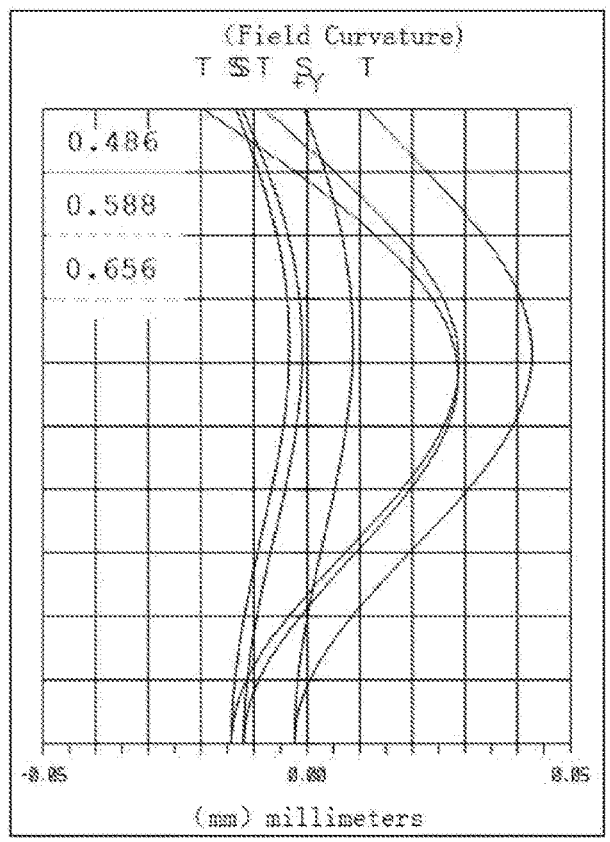
FIG. 15 shows an astigmatism curve of the lens assembly for the optical imaging lens according to the above fourth preferred embodiment of the present invention.
Figure 16:
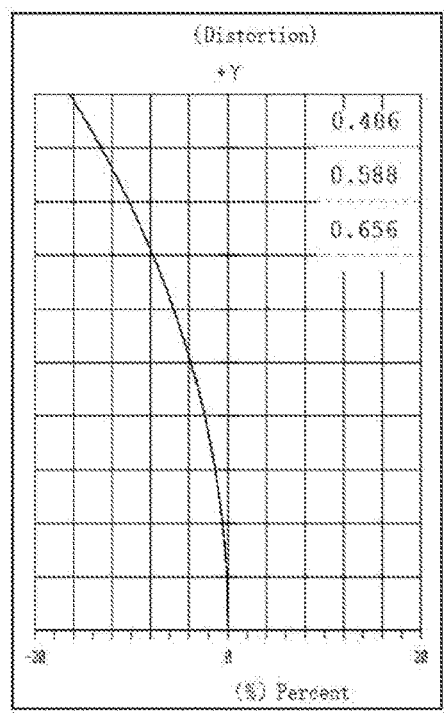
FIG. 16 shows a distortion curve of the lens assembly for the optical imaging lens according to the above fourth preferred embodiment of the present invention.

As shown in FIGS. 14 to 16 are curve graphs showing the optical properties of the specific example of the lens assembly according to the fourth preferred embodiment of the present invention, wherein FIG. 14 shows a MTF resolution curve of the specific example of the optical imaging lens employing the lens assembly according to the fourth preferred embodiment of the present invention; and FIG. 15 is a diagram showing an astigmatisma curve of the specific example of the lens assembly according to the fourth preferred embodiment of the present invention, which is represented by the wavelength of common three-color light in units of mm; and FIG. 16 is a diagram showing the distortion curve of the specific example of the lens assembly according to the fourth preferred embodiment of the present invention, which shows the value of the normalized distortion in different field angles. As shown in FIGS. 14 to 16, the optical imaging lens employing the specific example of the lens assembly according to the fourth preferred embodiment of the present invention has better optical performance.

Referring to FIGS. 17 to 20 of the accompanying drawings of the present invention, a lens assembly for an optical imaging lens according to a fifth preferred embodiment of the present invention is illustrated, wherein the lens assembly of the optical imaging lens includes at least a first lens L1D, a second lens L2D, a third lens L3D, a fourth lens L4D, a fifth lens LSD and a sixth lens L6D, wherein the first lens L1D has a negative power, and the sixth lens L6D has a positive power, wherein the second lens L2D and the third lens L3D define a first achromatic lens assembly A1, and the fourth lens L4D and the fifth lens LSD defines a second achromatic lens assembly A2, wherein the first lens L1D, the first achromatic lens assembly A1, the second achromatic lens assembly A2 and the sixth lens L6D are orderly arranged along the direction from the object side to the image side.

As shown in FIGS. 17 to 20, the lens assembly according to the fifth preferred embodiment of the present invention, for the optical imaging lens, which comprises at least a first lens L1D, a second lens L2D, a third lens L3D, a fourth lens L4D, a fifth lens LSD and at least one sixth lens L6D, wherein the first lens L1D has a negative power, the second lens L2D has a negative power, the third lens L3D has a positive power; the fourth lens L4D has a negative power and the fifth lens LSD has a positive power, wherein the sixth lens L6D is an aspherical lens, wherein the sixth lens L6D comprises a center portion and an edge portion extended outwardly from the center portion, and the center portion of the sixth lens L6D has a positive power. Preferably, the first lens L1D, the second lens L2D, the third lens L3D, the fourth lens L4D, the fifth lens LSD and the sixth lens L6D are sequentially arranged along the direction from the object side to the image side, wherein the second lens L2D and the third lens L3D form the first achromatic lens assembly A1, and the fourth lens L4D and the fifth lens LSD form the second achromatic lens assembly A2. Preferably, the first lens L1D, the second lens L2D, the third lens L3D, the fourth lens L4D and/or the fifth lens LSD are aspheric lenses to improve the optical properties of the lens assembly according to the fifth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1D, the second lens L2D, the third lens L3D, the fourth lens L4D, and/or the fifth lens L5D are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 17:
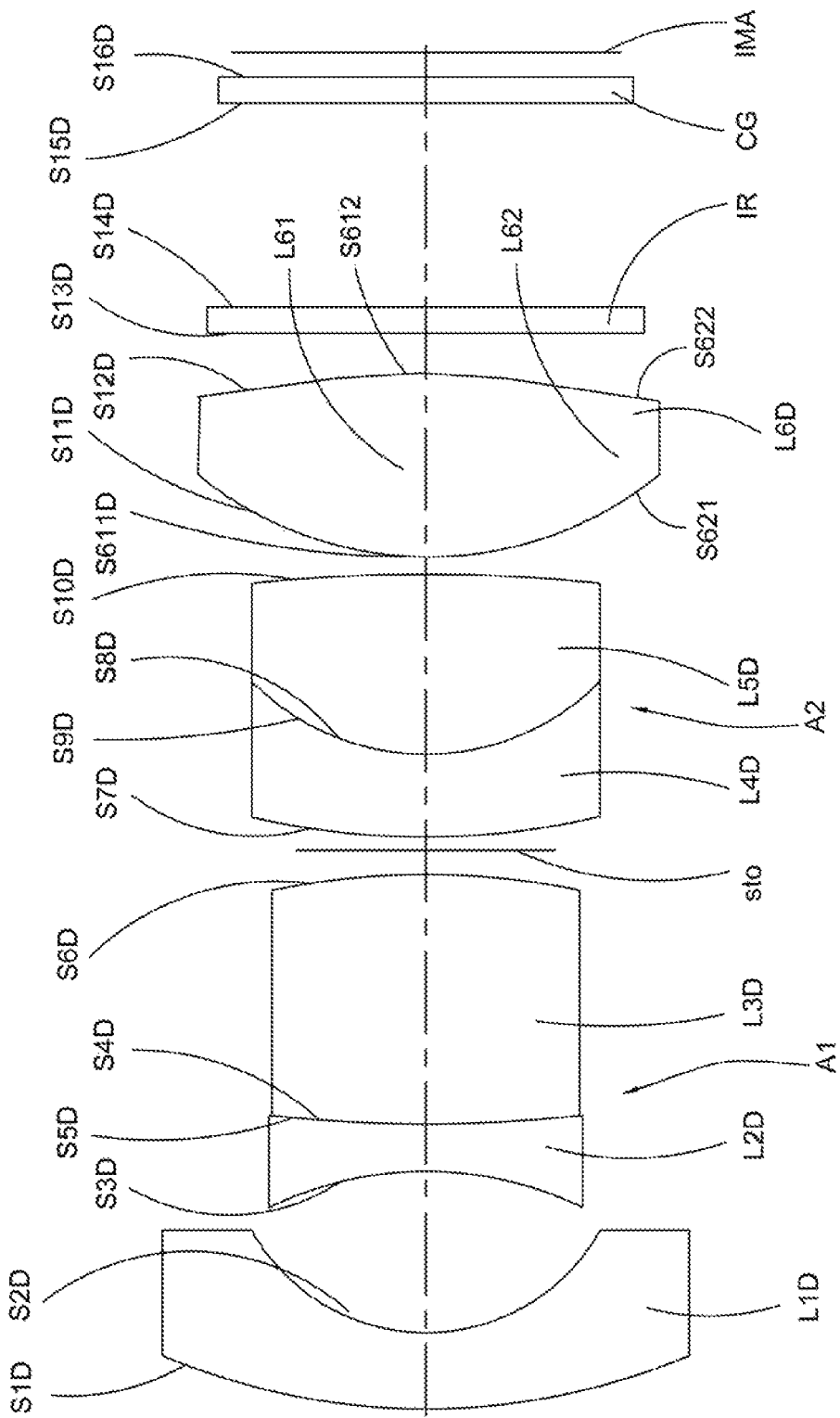
FIG. 17 is a structural schematic diagram of a lens assembly for an optical imaging lens according to a fifth preferred embodiment of the present invention.

As shown in FIG. 17, the first lens L1D, the second lens L2D, the third lens L3D, the fourth lens L4D, the fifth lens L5D and the sixth lens L6D of the lens assembly according to the fifth preferred embodiment of the present invention are coaxial with each other, which is used for the optical imaging lens.

As shown in FIG. 17, the lens assembly for the optical imaging lens according to the fifth preferred embodiment of the present invention further includes a diaphragm STO, wherein the diaphragm STO is provided between the third lens L3D and the fourth lens L4D, wherein the optical center of the diaphragm STO is coaxial with the optical centers of the first lens L1D, the second lens L2D, the third lens L3D, the fourth lens L4D, the fifth lens L5D and the sixth lens L6B. Alternatively, the diaphragm STO is provided between the first lens L1D and the second lens L2D. Alternatively, the diaphragm STO may also be provided between the fifth lens L5D and the sixth lens L6D. In some embodiments, the diaphragm STO is provided on the first lens L1D or the second lens L2D. In still other embodiments, the diaphragm STO is provided on the third lens L3D or the fourth lens L4D. In still other embodiments, the diaphragm STO is provided on the fifth lens L5D or the sixth lens L6D.

As shown in FIG. 17, the first lens L1D of the lens assembly for the optical imaging lens according to the fifth preferred embodiment of the present invention has a convex surface S1D and a concave surface S2D; the second lens L2D has two concave surfaces S3D, S4D; the third lens L3D has two convex surfaces S5D, S6D; the fourth lens L4D has a convex surface S7D and a concave surface S8D; the fifth lens L5D has a convex surface S9D and a convex surface S10D; the center portion L61D of the sixth lens L6D has two convex surfaces S611D, S612D, and the edge portion L62D of the sixth lens L6D has two convex surfaces S621D, S622D, wherein the convex surface S1D of the first lens L1D faces the object side, the concave surface S2D of the first lens L1D faces the image side; the two concave surfaces S3D, S4D of the second lens L2D face the object side and the image side respectively; the two convex surfaces S5D, S6D of the third lens L3D face the object side and the image side respectively; the convex surface S7D of the fourth lens L4D faces the object side, the concave surface S8D of the fourth lens L4D faces the image side; the convex surface S9D of the fifth lens L5D faces the object side, the convex surface S10D of the fifth lens L5D faces the image side; the convex surfaces S611D, S612D of the center portion L61D of the sixth lens L6D face the object side and the image side respectively, the convex surfaces S621D, S622D of the edge portion L62D of the sixth lens L6D face the object side and the image side respectively. Preferably, the edge portion of the sixth lens L6D has a positive power, and the edge portion L62D of the sixth lens L6D has two convex surfaces S621D, S622D, the convex surface S611D of the central portion L61D of the sixth lens L6D and the convex surface S621D of the edge portion L62D of the sixth lens L6D form a convex surface S11D facing the object side, and the convex surface S612D of the center portion L61D of the sixth lens L6D and the convex surface S622D of the edge portion L62D of the sixth lens L6D form a convex surface S12D facing the image side. Therefore, the sixth lens L6D is a biconvex lens, and the first lens L1D, the second lens L2D, the third lens L3D, the fourth lens L4D, the fifth lens L5D and the sixth lens L6D of the lens assembly for the optical imaging lens according to the fifth preferred embodiment of the present invention are respectively double-sided lenses. Further, the second lens L2D is a biconcave lens, and the third lens L3D is a biconvex lens.

Alternatively, the first lens L1D of the lens assembly for the optical imaging lens according to the fifth preferred embodiment of the present invention has a concave surface S1D facing the object side and a concave surface S2D facing the image side. Alternatively, the edge portion L62D of the sixth lens L6D has a negative power. Optionally, the edge portion L62D of the sixth lens L6D has a convex surface S621D facing the object side and a concave surface S622D facing the image side. Therefore, the convex surface S611D of the central portion L61D of the sixth lens L6D and the convex surface S621D of the edge portion L62D of the sixth lens L6D form a convex surface S11D facing the object side.

It is worth mentioning that when the convex surface S1D of the first lens L1D of the lens assembly faces the object side, it is advantageous to make more light enter into the lens assembly as much as possible. At the same time, the convex surface S1D of the first lens L1D faces the object side, which makes the first lens L1D of the lens assembly not easily be contaminated with dirt when the lens assembly is used outdoor, for example, rain is easier to fall on a rainy day. When the first lens L1D facing the object side is a concave surface S2D, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 17, the concave surface S4D of the second lens L2D of the lens assembly for the optical imaging lens according to the fifth preferred embodiment of the present invention, which faces the image side, and the convex surface S5D of the third lens L3D, which faces the object side, are provided to face with each other; the concave surface S8D of the fourth lens L4D, which faces the image side, and the convex surface S9D of the fifth lens L5D, which faces the object side, are provided to face with each other.

As shown in FIG. 17, the first and second achromatic lens assemblies A1, A2 of the lens assembly for the optical imaging lens according to the fifth preferred embodiment of the present invention are preferably cemented lenses. In other words, the second lens L2D and the third lens L3D may be glued together to form the first achromatic lens assembly A1; the fourth lens L4D and the fifth lens L5D may be glued together to form the second achromatic lens assembly A2. At this time, since the second lens L2D and the third lens L3D are glued together and the fourth lens L4D and the fifth lens L5D are glued together, so the concave surface S4D of the second lens L2D and the convex surface S5D of the third lens L3D are glued together; the concave surface S8D of the fourth lens L4D and the convex surface S9D of the fifth lens L5D are glued together. Preferably, both the concave surface S4D of the second lens L2D and the convex surface S5D of the third lens L3D are aspherical. More preferably, the concave surface S8D of the fourth lens L4D and the convex surface S9D of the fifth lens L5D are both aspherical to further reduce the chromatic aberration. Alternatively, the first and second achromatic lens assemblies A1, A2 may respectively be a double-separated achromatic lens assembly. It is appreciated that the second lens L2D and the third lens L3D are separately provided when the first and second achromatic lens assemblies A1, A2 are double-separated type achromatic lens assemblies; the fourth lens L4D and the fifth lens L5D are separately provided, the diaphragm STO may be provided between the second lens L2D and the third lens L3D or between the fourth lens L4D and the fifth lens L5D.

As shown in FIG. 17, the second lens L2D and the third lens L3D of the first achromatic lens assembly A1 of the lens assembly for the optical imaging lens according to the fifth preferred embodiment of the present invention have a negative power and a positive power respectively, wherein the second lens L2D is preferably made of material having a low refractive index and a high Abbe number, and the third lens L3D is preferably made of material having a high refractive index and a low Abbe number, wherein the second lens L2D having a negative power has a lower refractive index, and the third lens L3D having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4D and the fifth lens L5D of the second achromatic lens assembly A2 of the lens assembly for the optical imaging lens according to the fifth preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1D and the first achromatic lens assembly A1 of the lens assembly for the optical imaging lens according to the fifth preferred embodiment of the present invention is F1, the focal length of the combination of the second achromatic lens assembly A2 and the sixth lens L6D is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6D and the image plane.

As shown in FIG. 17, furthermore, the lens assembly for the optical imaging system according to the fifth preferred embodiment of the present invention defines an image plane IMA, and the optical imaging system may further include a color filter IR and a protective glass CG disposed in front of the image plane IMA.

As shown in FIG. 17, the imaging light may enter from the convex surface S1D of the first lens L1D of the lens assembly and pass sequentially through the first lens L1D, the second lens L2D, the third lens L3D, the diaphragm STO, the fourth lens L4D, the fifth lens L5D, the sixth lens L6D, the color filter IR, and the protective plate CG, and then is imaged on the image plane IMA.

As shown in FIG. 17, the sixth lens L6D of the lens assembly for the optical imaging lens according to the fifth preferred embodiment of the present invention is an aspheric lens. Preferably, the sixth lens L6D is a glass aspherical lens. Optionally, the sixth lens L6D is a plastic aspherical lens. When the sixth lens L6D is made of plastic material, the overall weight and the manufacturing cost of the lens assembly may be reduced. More preferably, the aspherical surface of the sixth lens L6D can satisfy the following formula:

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the fifth preferred embodiment of the present invention is TTL (referred to the distance from the outermost point of the object side of the first lens L1D to the image plane of the lens assembly), and the focal length of the entire lens assembly is F, then TTL/F≤12, as shown in Table 9 and Table 10. Preferably, TTL/F≤7.5, to satisfy the miniaturization requirement of the lens assembly of the present invention.

TABLE 9 parameters of Lens surfaces of a specific example of a lens assembly according to the fifth preferred embodiment of the present invention:

| Serial number of surface S | Radius of curvature R | Distance between centers of two neighboring lenses d | Refractive index Nd | Abbe number Vd |
|---|---|---|---|---|
| S1D | 8.3842 | 1.0000 | 1.62 | 58.10 |
| S2D | 2.6414 | 2.3000 | | |
| S3D | −3.6897 | 0.5500 | 1.50 | 81.61 |
| S4D | 6.9074 | 0.0000 | | |
| SS5D | 6.9074 | 2.4396 | 1.90 | 31.32 |
| S6D | −10.5656 | 0.0420 | | |
| STO | Infinity | 0.2000 | | |
| S7D | 29.4129 | 0.5525 | 1.78 | 25.72 |
| S8D | 3.2728 | 0.0000 | | |
| S9D | 3.2728 | 2.2000 | 1.77 | 49.60 |
| S10D | −23.6219 | 0.1532 | | |
| S11D | 5.2430 | 2.2254 | 1.50 | 81.61 |
| S12D | −5.8835 | 0.5000 | | |
| S13D | Infinity | 0.4000 | 1.52 | 64.20 |
| S14D | Infinity | 3.8693 | | |
| S15D | Infinity | 0.4000 | 1.52 | 64.17 |
| S16D | Infinity | 0.1250 | | |
| IMA | Infinity | | | |

TABLE 10

Aspherical coefficients of the two surfaces of the sixth lens as above embodiment K, A, B, C, D, E:

| Serial number of surface S | K | A | B | C | D | E |
|---|---|---|---|---|---|---|
| S11D | −14.92563 | 8.3884 × 10−3 | −9.4844 × 10−4 | 7.7184 × 10−5 | −2.8002 × 10−6 | 4.1032 × 10−8 |
| S12D | −1.257569 | 1.3444 × 10−3 | 1.2234 × 10−4 | −1.2976 × 10−5 | 8.8417 × 10−6 | 1.5125 × 10−8 |

The above Table 9 and Table 10 show a specific example of a lens assembly for the optical imaging lens according to the fifth preferred embodiment of the present invention, wherein the specific example may be used in an optical imaging system, wherein the radius of curvature of the convex surface S1D of the first lens L1D is 8.3842, which faces the object side, the radius of curvature of the concave surface S2D of the first lens L1D is 2.6414, which faces facing the image side, wherein the refractive index of the first lens L1D is 1.62, the abbe's constant of the first lens L1D is 58.10, wherein the distance between the center (or optical center) of the convex surface S1D of the first lens L1D and the center (or optical center) of the concave surface S2D of the first lens L1D is 1.0000; the radius of curvature of the concave surface S3D of the second lens L2D is −3.6897, which faces the object side, and the radius of curvature of the concave surface S4D of the second lens L2D of the lens assembly is 6.9074, which faces the image side, wherein the refractive index of the second lens L2D is 1.5, the abbe's constant of the second lens L2 is 81.61, wherein the distance between the center (or optical center) of the concave surface S2D of the first lens L1D and the center (or optical center) of the concave surface S3D of the second lens L2D is 2.3000, and the distance between the center (or optical center) of the concave surface S3D and the center (or optical center) of the concave surface S4D of the second lens L2D is 0.5500; the radius of curvature of the convex surface S6D of the third lens L3D of the lens assembly is −10.5656, which faces the image side, wherein the refractive index of the third lens L3D is 1.9, the abbe's constant of the third lens L3D is 31.32, wherein the concave surface S4D of the second lens L2D is glued together with the convex surface S5D of the third lens L3D, and the distance between the center (or optical center) of the convex surface S5D and the center (or optical center) of the convex surface S6D of the third lens L3D is 2.4396, the distance between the center (or optical center) of the convex surface S6D of the third lens L3D and the diaphragm STO is 0.0420, the distance between the diaphragm STO and the fourth lens L4D is 0.2000; the radius of curvature of the convex surface S7D of the fourth lens L4D of the lens assembly is 29.4129, which faces the object side, the radius of curvature of the concave surface S8D of the fourth lens L4D of the lens assembly is 3.2728, which faces the image side, wherein the refractive index of the fourth lens L4D is 1.78, the abbe's constant of the fourth lens L4D is 25.72, wherein the distance between the center (or optical center) of the convex surface S7D of the fourth lens L4D and the center (or optical center) of the concave surface S8D of the fourth lens L4D is 0.5525; the radius of curvature of the convex surface S10D of the fifth lens L5D of the lens assembly is −23.6219, which faces the image side, wherein the refractive index of the fifth lens L5D is 1.77, the abbe's constant of the fifth lens L5D is 49.60, and the concave surface S8D of the fourth lens L4D is glued together with the concave surface S9D of the fifth lens L5D, wherein the distance between the center of the concave surface S9D of the fifth lens L5D and the center (or optical center) of the convex surface S1M of the fifth lens L5D is 2.2000; and the curvature radius of the convex surface S11D of the sixth lens L6D of the lens assembly is 5.2430, which faces the object side, the radius of curvature of the convex surface S12D of the sixth lens L6D is −5.8835, which faces the image side, wherein the abbe's constant of the sixth lens L6D is 81.61, wherein the distance between the center (or optical center) of the convex surface S1M of the fifth lens L5 and the center (or optical center) of the convex surface S11D of the sixth lens L6D is 0.1532, the distance between the center (or optical center) of the convex surface S11D of the sixth lens L6D and the center (or optical center) of the convex surface S12D of the sixth lens L6D is 2.2254, the distance between the sixth lens L6D of the lens assembly L6D and the color filter IR of the optical imaging system is 0.5, the distance between the two surfaces S13D, S14D of the filter IR is 0.4000, the distance between the color filter IR of the optical imaging system and the protective glass CG is 3.8693, the distance between the two surfaces S15D, S16D of the protective plate CG is 0.40, and the distance between the protective glass CG and the image plane IMA is 0.125. In addition, both surfaces S11D, S12D of the sixth lens L6D are aspherical, and for S11D, K is −14.92563, the constant A is 8.3884×10−3; B is −9.4844× 10−4; C is 7.7184×10−5; D is −2.8002×10−6; E is 4.1032× 10−8, or S12D, K is −1.257569, the constant A is 1.3444× 10−3; B is 1.2234×10−4; C is −1.2976×10−5; D is 8.8417× 10−6; E is 1.5125×10−8.

In addition, the optical length of the lens assembly for the optical imaging lens according to the fifth preferred embodiment of the present invention is TTL=16.96, and the focal length F of the entire lens assembly is F=3.19, then TTL/F=5.31. The total focal length of the second achromatic lens assembly A2 and the sixth lens L6 is F2=4.82, and F2/F=1.51.

Figure 18:
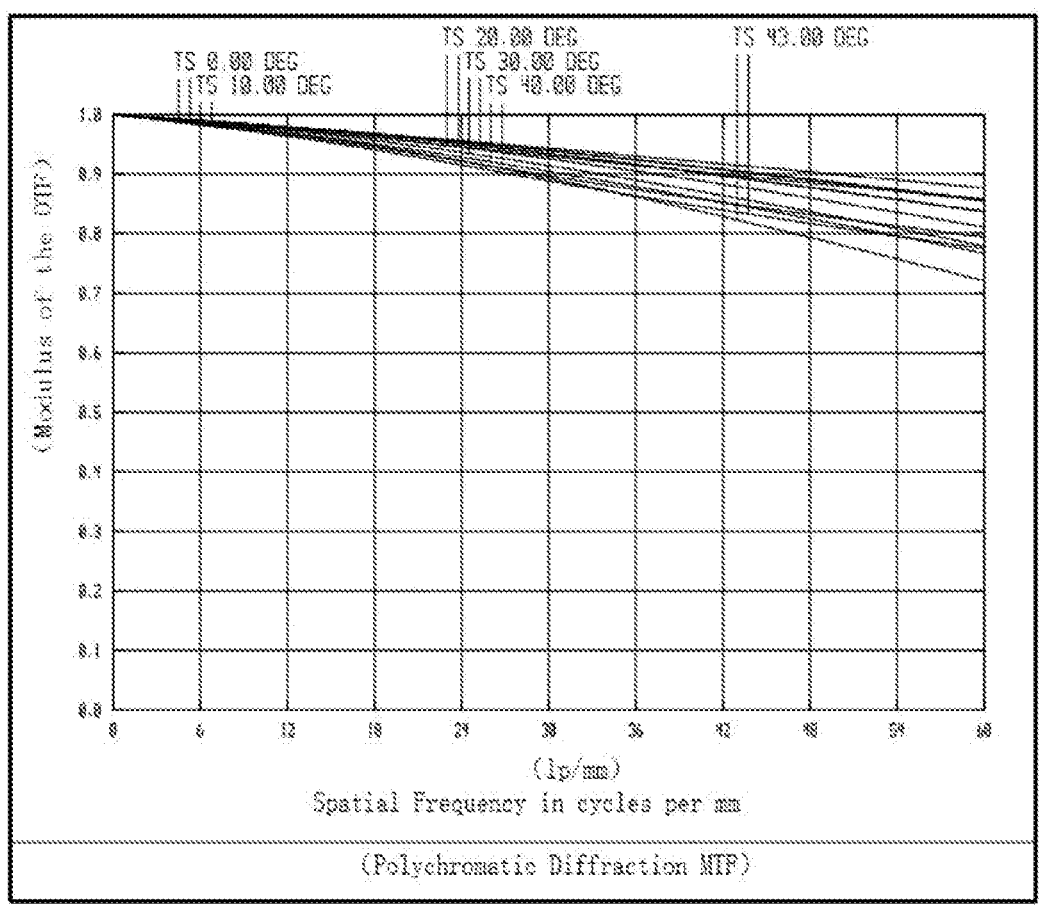
FIG. 18 shows a MTF resolution curve of the lens assembly for the optical imaging lens according to the above fifth preferred embodiment of the present invention.
Figure 19:
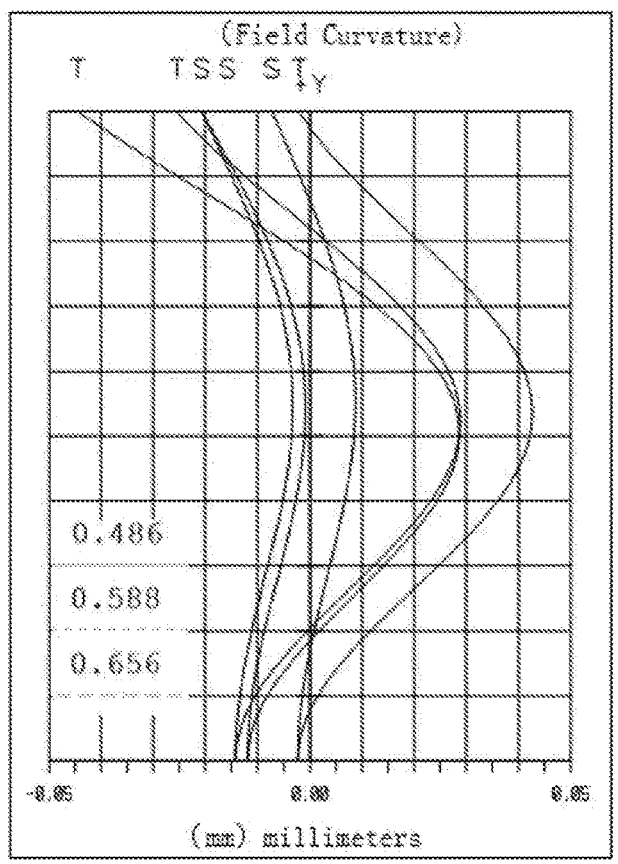
FIG. 19 shows an astigmatism curve of the lens assembly for the optical imaging lens according to the above fifth preferred embodiment of the present invention.
Figure 20:
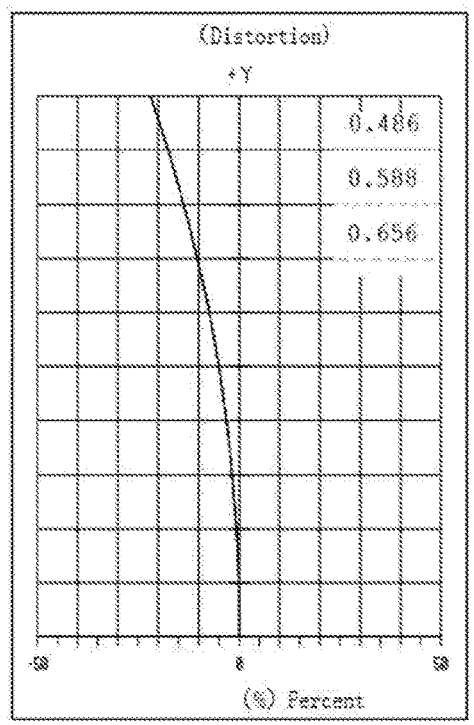
FIG. 20 shows a distortion curve of the lens assembly for the optical imaging lens according to the above fifth preferred embodiment of the present invention.

As shown in FIGS. 18 to 20 are curve graphs showing the optical properties of the specific example of the lens assembly according to the fifth preferred embodiment of the present invention, wherein FIG. 18 shows a MTF resolution curve of the specific example of the optical imaging lens employing the lens assembly according to the fifth preferred embodiment of the present invention; and FIG. 19 is a diagram showing an astigmatisma curve of the specific example of the lens assembly according to the fifth preferred embodiment of the present invention, which is represented by the wavelength of common three-color light in units of mm; and FIG. 20 is a diagram showing the distortion curve of the specific example of the lens assembly according to the fifth preferred embodiment of the present invention, which shows the value of the normalized distortion in different field angles. As shown in FIGS. 18 to 20, the optical imaging lens employing the specific example of the lens assembly according to the fifth preferred embodiment of the present invention has better optical performance.

Referring to FIGS. 21 to 24 of the accompanying drawings of the present invention, a lens assembly for an optical imaging lens according to a sixth preferred embodiment of the present invention is illustrated, wherein the lens assembly of the optical imaging lens includes at least a first lens L1E, a second lens L2E, a third lens L3E, a fourth lens L4E, a fifth lens L5E and a sixth lens L6E, wherein the first lens LIE has a negative power, and the sixth lens L6E has a positive power, wherein the second lens L2E and the third lens L3E define a first achromatic lens assembly A1, and the fourth lens L4E and the fifth lens L5E defines a second achromatic lens assembly A2, wherein the first lens L1E, the first achromatic lens assembly A1, the second achromatic lens assembly A2 and the sixth lens L6E are orderly arranged along the direction from the object side to the image side.

As shown in FIGS. 21 to 24, the lens assembly according to the sixth preferred embodiment of the present invention, for the optical imaging lens, which comprises at least a first lens L1E, a second lens L2E, a third lens L3E, a fourth lens L4E, a fifth lens L5E and at least one sixth lens L6E, wherein the first lens L1E has a negative power, the second lens L2E has a negative power, the third lens L3E has a positive power; the fourth lens L4E has a negative power and the fifth lens L5E has a positive power, wherein the sixth lens L6E is an aspherical lens, wherein the sixth lens L6E comprises a center portion and an edge portion extended outwardly from the center portion, and the center portion of the sixth lens L6E has a positive power. Preferably, the first lens L1E, the second lens L2E, the third lens L3E, the fourth lens L4E, the fifth lens L5E and the sixth lens L6E are sequentially arranged along the direction from the object side to the image side, wherein the second lens L2E and the third lens L3E form the first achromatic lens assembly A1, and the fourth lens L4E and the fifth lens L5E form the second achromatic lens assembly A2. Preferably, the first lens L1E, the second lens L2E, the third lens L3E, the fourth lens L4E and/or the fifth lens L5E are aspheric lenses to improve the optical properties of the lens assembly according to the sixth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1E, the second lens L2E, the third lens L3E, the fourth lens L4E, and/or the fifth lens L5E are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 21:
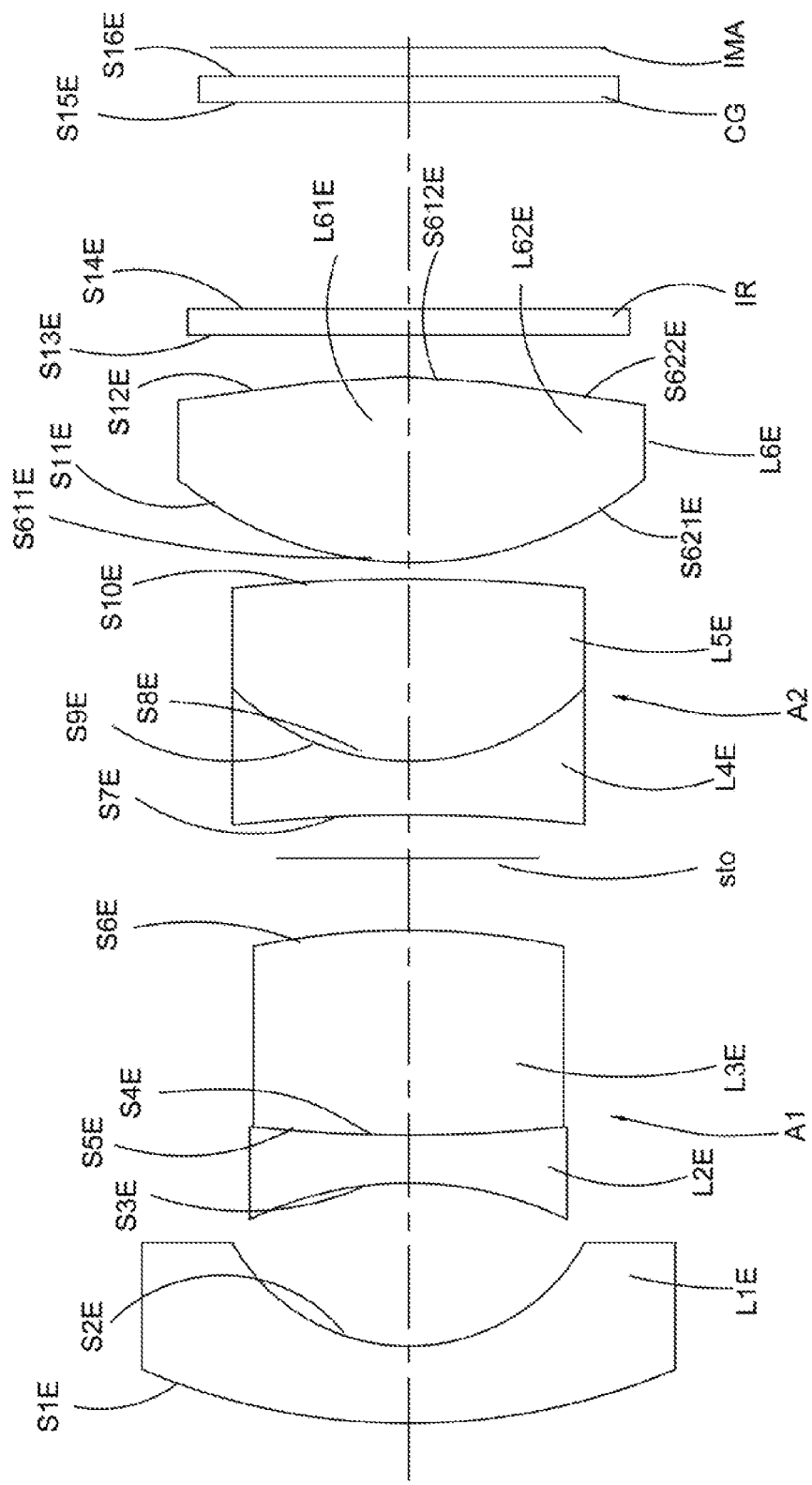
FIG. 21 is a structural schematic diagram of a lens assembly for an optical imaging lens according to a sixth preferred embodiment of the present invention.

As shown in FIG. 21, the first lens L1E, the second lens L2E, the third lens L3E, the fourth lens L4E, the fifth lens L5E and the sixth lens L6E of the lens assembly according to the sixth preferred embodiment of the present invention are coaxial with each other, which is used for the optical imaging lens.

As shown in FIG. 21, the lens assembly for the optical imaging lens according to the sixth preferred embodiment of the present invention further includes a diaphragm STO, wherein the diaphragm STO is provided between the third lens L3E and the fourth lens L4E, wherein the optical center of the diaphragm STO is coaxial with the optical centers of the first lens L1E, the second lens L2E, the third lens L3E, the fourth lens L4E, the fifth lens L5E and the sixth lens L6E. Alternatively, the diaphragm STO is provided between the first lens L1E and the second lens L2E. Alternatively, the diaphragm STO may also be provided between the fifth lens L5E and the sixth lens L6E. In some embodiments, the diaphragm STO is provided on the first lens L1E or the second lens L2E. In still other embodiments, the diaphragm STO is provided on the third lens L3E or the fourth lens L4E. In still other embodiments, the diaphragm STO is provided on the fifth lens L5E or the sixth lens L6E.

As shown in FIG. 21, the first lens L1E of the lens assembly for the optical imaging lens according to the sixth preferred embodiment of the present invention has a convex surface S1E and a concave surface S2E; the second lens L2E has two concave surfaces S3E, S4E; the third lens L3E has two convex surfaces S5E, S6E; the fourth lens L4E has two concave surfaces S7E, S8E; the fifth lens L5E has a convex surface S9E and a convex surface S10E; the center portion L61E of the sixth lens L6E has two convex surfaces S611E, S612E, and the edge portion L62E of the sixth lens L6E has two convex surfaces S621E, S622E, wherein the convex surface S1E of the first lens L1E faces the object side, the concave surface S2E of the first lens L1E faces the image side; the two concave surfaces S3E, S4E of the second lens L2E face the object side and the image side respectively; the two convex surfaces S5E, S6E of the third lens L3E face the object side and the image side respectively; the concave surface S7D of the fourth lens L4E faces the object side, the concave surface S8E of the fourth lens L4E faces the image side; the convex surface S9E of the fifth lens L5E faces the object side, the convex surface S10E of the fifth lens L5E faces the image side; the convex surfaces S611E, S612E of the center portion L61E of the sixth lens L6E face the object side and the image side respectively, the convex surfaces S621E, S622E of the edge portion L62E of the sixth lens L6E face the object side and the image side respectively. Preferably, the edge portion of the sixth lens L6E has a positive power, and the edge portion L62E of the sixth lens L6E has two convex surfaces S621E, S622E, wherein the convex surface S611E of the central portion L61E of the sixth lens L6E and the convex surface S621E of the edge portion L62E of the sixth lens L6E form a convex surface S11E facing the object side, and the convex surface S612E of the center portion L61E of the sixth lens L6E and the convex surface S622E of the edge portion L62E of the sixth lens L6E form a convex surface S12E facing the image side. Therefore, the sixth lens L6D is a biconvex lens, the first lens L1E, the second lens L2E, the third lens L3E, the fourth lens L4E, the fifth lens L5E and the sixth lens L6E of the lens assembly for the optical imaging lens according to the sixth preferred embodiment of the present invention are respectively double-sided lenses. Further, the second lens L2E is a biconcave lens, and the third lens L3E is a biconvex lens.

Alternatively, the first lens L1E of the lens assembly for the optical imaging lens according to the sixth preferred embodiment of the present invention has a concave surface S1E facing the object side and a concave surface S2E facing the image side. Alternatively, the edge portion L62E of the sixth lens L6E has a negative power. Optionally, the edge portion L62E of the sixth lens L6E has a convex surface S621E facing the object side and a concave surface S622E facing the image side. Therefore, the convex surface S611E of the central portion L61E of the sixth lens L6E and the convex surface S621E of the edge portion L62E of the sixth lens L6E form a convex surface S11E facing the object side.

It is worth mentioning that when the convex surface S1E of the first lens L1E of the lens assembly faces the object side, it is advantageous to make more light enter into the lens assembly as much as possible. At the same time, the convex surface S1E of the first lens L1E faces the object side, which makes the first lens L1E of the lens assembly not easily be contaminated with dirt when the lens assembly is used outdoor, for example, rain is easier to fall on a rainy day. When the first lens L1E facing the object side is a concave surface S2E, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 21, the concave surface S4E of the second lens L2E of the lens assembly for the optical imaging lens according to the sixth preferred embodiment of the present invention, which faces the image side, and the convex surface S5E of the third lens L3E, which faces the object side, are provided to face with each other; the concave surface S8E of the fourth lens L4E, which faces the image side, and the convex surface S9E of the fifth lens L5E, which faces the object side, are provided to face with each other.

As shown in FIG. 21, the first and second achromatic lens assemblies A1, A2 of the lens assembly for the optical imaging lens according to the sixth preferred embodiment of the present invention are preferably cemented lenses. In other words, the second lens L2E and the third lens L3E may be glued together to form the first achromatic lens assembly A1; the fourth lens L4E and the fifth lens L5E may be glued together to form the second achromatic lens assembly A2. At this time, since the second lens L2E and the third lens L3E are glued together and the fourth lens L4E and the fifth lens L5E are glued together, so the concave surface S4E of the second lens L2E and the convex surface S5E of the third lens L3E are glued together; the concave surface S8E of the fourth lens L4E and the convex surface S9E of the fifth lens L5E are glued together. Preferably, both the concave surface S4E of the second lens L2E and the convex surface S5E of the third lens L3E are aspherical. More preferably, the concave surface S8E of the fourth lens L4E and the convex surface S9E of the fifth lens L5E are both aspherical to further reduce the chromatic aberration. Alternatively, the first and second achromatic lens assemblies A1, A2 may respectively be a double-separated achromatic lens assembly. It is appreciated that the second lens L2E and the third lens L3E are separately provided when the first and second achromatic lens assemblies A1, A2 are double-separated type achromatic lens assemblies; the fourth lens L4E and the fifth lens L5E are separately provided, the diaphragm STO may be provided between the second lens L2E and the third lens L3E or between the fourth lens L4E and the fifth lens L5E.

As shown in FIG. 21, the second lens L2E and the third lens L3E of the first achromatic lens assembly A1 of the lens assembly for the optical imaging lens according to the sixth preferred embodiment of the present invention have a negative power and a positive power respectively, wherein the second lens L2E is preferably made of material having a low refractive index and a high Abbe number, and the third lens L3E is preferably made of material having a high refractive index and a low Abbe number, wherein the second lens L2E having a negative power has a lower refractive index, and the third lens L3E having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4E and the fifth lens L5E of the second achromatic lens assembly A2 of the lens assembly for the optical imaging lens according to the sixth preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1E and the first achromatic lens assembly A1 of the lens assembly for the optical imaging lens according to the sixth preferred embodiment of the present invention is F1, the focal length of the combination of the second achromatic lens assembly A2 and the sixth lens L6E is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6E and the image plane.

As shown in FIG. 21, furthermore, the lens assembly for the optical imaging system according to the sixth preferred embodiment of the present invention defines an image plane IMA, and the optical imaging system may further include a color filter IR and a protective glass CG disposed in front of the image plane IMA.

As shown in FIG. 21, the imaging light may enter from the convex surface S1E of the first lens L1E of the lens assembly and pass sequentially through the first lens L1E, the second lens L2E, the third lens L3E, the diaphragm STO, the fourth lens L4E, the fifth lens L5E, the sixth lens L6E, the color filter IR, and the protective plate CG, and then is imaged on the image plane IMA.

As shown in FIG. 21, the sixth lens L6E of the lens assembly for the optical imaging lens according to the sixth preferred embodiment of the present invention is an aspheric lens. Preferably, the sixth lens L6E is a glass aspherical lens. Optionally, the sixth lens L6E is a plastic aspherical lens. When the sixth lens L6E is made of plastic material, the overall weight and the manufacturing cost of the lens assembly may be reduced. More preferably, the aspherical surface of the sixth lens L6E can satisfy the following formula:

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the sixth preferred embodiment of the present invention is TTL (referred to the distance from the outermost point of the object side of the first lens L1E to the image plane of the lens assembly), and the focal length of the entire lens assembly is F, then TTL/F≤12, as shown in Table 11 and Table 12. Preferably, TTL/F≤7.5, to satisfy the miniaturization requirement of the lens assembly of the present invention.

TABLE 11 parameters of Lens surfaces of a specific example of a lens assembly according to the sixth preferred embodiment of the present invention:

| Serial number of surface S | Radius of curvature R | Distance between centers of two neighboring lenses d | Refractive index Nd | Abbe number Vd |
|---|---|---|---|---|
| S1E | 11.6875 | 1.0000 | 1.50 | 81.60 |
| S2E | 3.3309 | 3.5193 | | |
| S3E | −6.7518 | 0.7000 | 1.50 | 81.61 |
| S4E | 9.1651 | 0.0000 | | |
| S5E | 9.1651 | 3.5000 | 1.90 | 31.32 |
| S6E | −13.9682 | 0.1000 | | |
| STO | Infinity | 0.2000 | | |
| S7E | −16.6398 | 0.9433 | 1.78 | 25.72 |
| S8E | 4.7206 | 0.0000 | | |
| S9E | 4.7206 | 2.7000 | 1.77 | 49.60 |
| S10E | −11.3989 | 0.1500 | | |
| S11E | 4.3869 | 2.7000 | 1.50 | 81.61 |
| S12E | −29.3099 | 0.5000 | | |
| S13E | Infinity | 0.4000 | 1.62 | 60.30 |
| S14E | Infinity | 6.4889 | | |
| S15E | Infinity | 0.4000 | 1.52 | 64.17 |
| S16E | Infinity | 0.1250 | | |
| IMA | Infinity | | | |

TABLE 12

Aspherical coefficients of the two surfaces of the sixth lens as above embodiment K, A, B, C, D, E:

| Serial number of surface S | K | A | B | C | D | E |
|---|---|---|---|---|---|---|
| S11E | −23.65473 | $5.4184 \times 10^{-3}$ | $-2.2106 \times 10^{-4}$ | $2.4411 \times 10^{-5}$ | $-9.2024 \times 10^{-7}$ | $1.7622 \times 10^{-9}$ |
| S12E | 29.53945 | $3.4325 \times 10^{-3}$ | $3.9939 \times 10^{-4}$ | $-7.7060 \times 10^{-5}$ | $1.4310 \times 10^{-5}$ | $-5.9497 \times 10^{-8}$ |

The above Table 11 and Table 12 show a specific example of a lens assembly for the optical imaging lens according to the sixth preferred embodiment of the present invention, wherein the specific example may be used in an optical imaging system, wherein the radius of curvature of the convex surface S1E of the first lens L1E is 11.6875, which faces the object side, the radius of curvature of the concave surface S2E of the first lens L1E is 3.3309, which faces facing the image side, wherein the refractive index of the first lens L1E is 1.50, the abbe's constant of the first lens L1E is 81.60, wherein the distance between the center (or optical center) of the convex surface S1E of the first lens L1E and the center (or optical center) of the concave surface S2E of the first lens L1E is 1.0000; the radius of curvature of the concave surface S3E of the second lens L2E is −6.7518, which faces the object side, and the radius of curvature of the concave surface S4E of the second lens L2E of the lens assembly is 9.1651, which faces the image side, wherein the refractive index of the second lens L2E is 1.5, the abbe's constant of the second lens L2 is 81.61, wherein the distance between the center (or optical center) of the concave surface S2E of the first lens L1E and the center (or optical center) of the concave surface S3E of the second lens L2E is 3.5193, and the distance between the center (or optical center) of the concave surface S3E and the center (or optical center) of the concave surface S4E of the second lens L2E is 0.7000; the radius of curvature of the convex surface S6E of the third lens L3E of the lens assembly is −13.9682, which faces the image side, wherein the refractive index of the third lens L3E is 1.9, the abbe's constant of the third lens L3E is 31.32, wherein the concave surface S4E of the second lens L2E is glued together with the convex surface S5E of the third lens L3E, and the distance between the center (or optical center) of the convex surface S5E and the center (or optical center) of the convex surface S6E of the third lens L3E is 3.5000, the distance between the center (or optical center) of the convex surface S6E of the third lens L3E and the diaphragm STO is 0.1000, the distance between the diaphragm STO and the fourth lens L4E is 0.2000; the radius of curvature of the concave surface S7E of the fourth lens L4E of the lens assembly is −16.6398, which faces the object side, the radius of curvature of the concave surface S8E of the fourth lens L4E of the lens assembly is 4.7206, which faces the image side, wherein the refractive index of the fourth lens L4E is 1.78, the abbe's constant of the fourth lens L4E is 25.72, wherein the distance between the center (or optical center) of the concave surface S7 of the fourth lens L4E and the center (or optical center) of the concave surface S8E of the fourth lens L4E is 0.9433; the radius of curvature of the convex surface S10E of the fifth lens L5E of the lens assembly is −11.3989, which faces the image side, wherein the refractive index of the fifth lens L5E is 1.77, the abbe's constant of the fifth lens L5E is 49.60, and the concave surface S8E of the fourth lens L4E is glued together with the concave surface S9E of the fifth lens L5E, wherein the distance between the center of the concave surface S9E of the fifth lens L5E and the center (or optical center) of the convex surface S1M of the fifth lens L5E is 2.7000; and the curvature radius of the convex surface S11E of the sixth lens L6E of the lens assembly is 4.3869, which faces the object side, the radius of curvature of the convex surface S12E of the sixth lens L6E is −29.3099, which faces the image side, wherein the abbe's constant of the sixth lens L6E is 81.61, wherein the distance between the center (or optical center) of the convex surface S1M of the fifth lens L5E and the center (or optical center) of the convex surface S11E of the sixth lens L6E is 0.1500, the distance between the center (or optical center) of the convex surface S11E of the sixth lens L6E and the center (or optical center) of the convex surface S12E of the sixth lens L6E is 2.7000, the distance between the sixth lens L6E of the lens assembly L6E and the color filter IR of the optical imaging system is 0.5, the distance between the two surfaces S13E, S14E of the filter IR is 0.4000, the distance between the color filter IR of the optical imaging system and the protective glass CG is 6.4889, the distance between the two surfaces S15E, S16E of the protective plate CG is 0.40, and the distance between the protective glass CG and the image plane IMA is 0.125. In addition, both surfaces S11E, S12E of the sixth lens L6E are aspherical, and for S11E, K is −23.65473, the constant A is 5.4184×10−3; B is −2.2106×10−4; C is 2.4411×10−5; D is −9.2024×10−7; E is 1.7622×10−9, or S12E, K is 29.53945, the constant A is 3.4325×10−3; B is 3.9939×10−4; C is −7.7060×10−5; D is 1.4310×10−5; E is −5.9497×10−8.

In addition, the optical length of the lens assembly for the optical imaging lens according to the sixth preferred embodiment of the present invention is TTL=23.43, and the focal length F of the entire lens assembly is F=3.85, then TTL/F=6.09. The total focal length of the second achromatic lens assembly A2 and the sixth lens L6 is F2=6.13, and F2/F=1.59.

Figure 22:
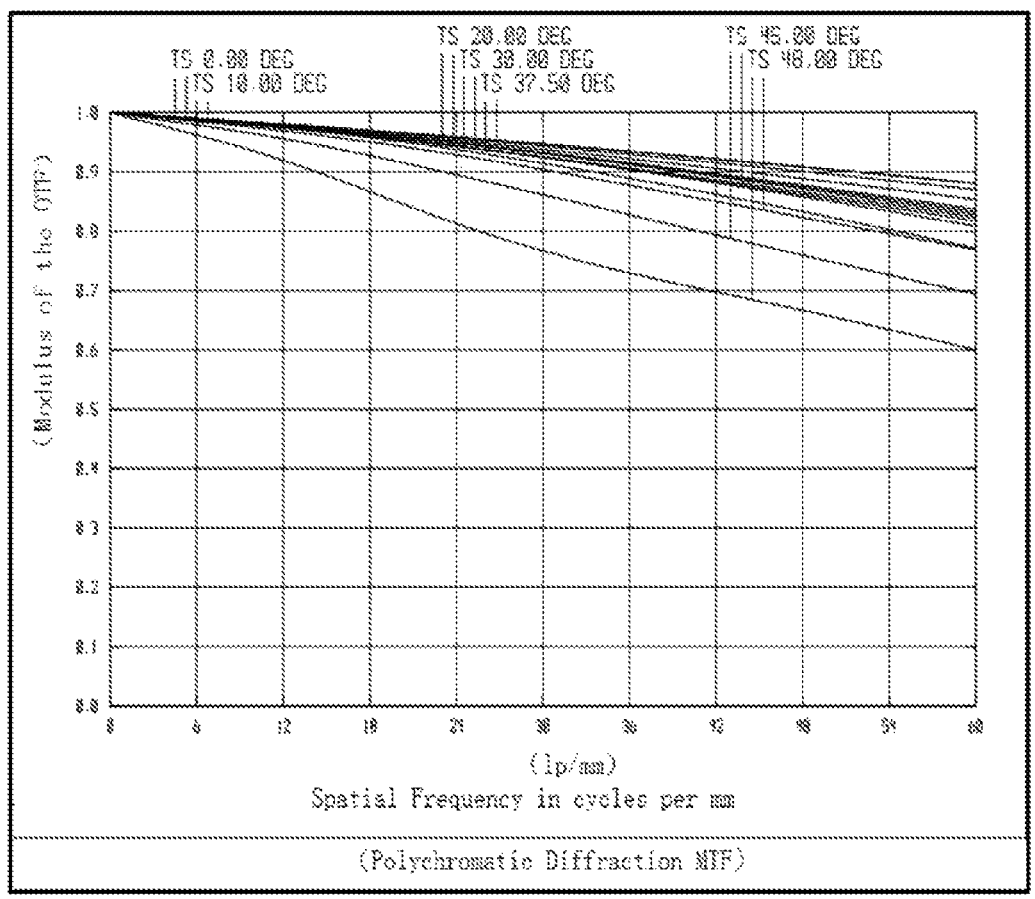
FIG. 22 shows a MTF resolution curve of the lens assembly for the optical imaging lens according to the above sixth preferred embodiment of the present invention.
Figure 23:
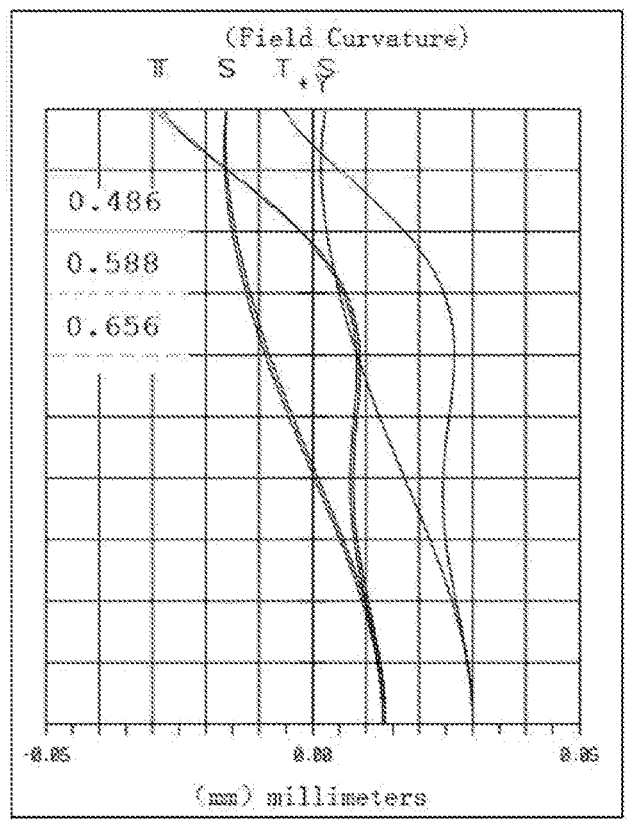
FIG. 23 shows an astigmatism curve of the lens assembly for the optical imaging lens according to the above sixth preferred embodiment of the present invention.
Figure 24:
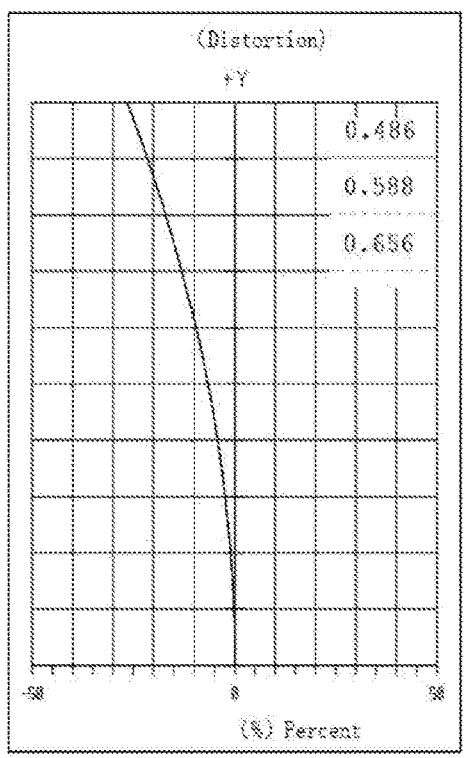
FIG. 24 shows a distortion curve of the lens assembly for the optical imaging lens according to the above sixth preferred embodiment of the present invention.

As shown in FIGS. 22 to 24 are curve graphs showing the optical properties of the specific example of the lens assembly according to the sixth preferred embodiment of the present invention, wherein FIG. 22 shows a MTF resolution curve of the specific example of the optical imaging lens employing the lens assembly according to the sixth preferred embodiment of the present invention; and FIG. 23 is a diagram showing an astigmatisma curve of the specific example of the lens assembly according to the sixth preferred embodiment of the present invention, which is represented by the wavelength of common three-color light in units of mm; and FIG. 24 is a diagram showing the distortion curve of the specific example of the lens assembly according to the sixth preferred embodiment of the present invention, which shows the value of the normalized distortion in different field angles. As shown in FIGS. 22 to 24, the optical imaging lens employing the specific example of the lens assembly according to the sixth preferred embodiment of the present invention has better optical performance.

Referring to FIGS. 25 to 28 of the accompanying drawings of the present invention, a lens assembly for an optical imaging lens according to a seventh preferred embodiment of the present invention is illustrated, wherein the lens assembly of the optical imaging lens includes at least a first lens L1F, a second lens L2F, a third lens L3F, a fourth lens L4F, a fifth lens L5F and a sixth lens L6F, wherein the first lens L1F has a negative power, and the sixth lens L6F has a positive power, wherein the second lens L2F and the third lens L3F define a first achromatic lens assembly A1, and the fourth lens L4F and the fifth lens L5F defines a second achromatic lens assembly A2, wherein the first lens L1F, the first achromatic lens assembly A1, the second achromatic lens assembly A2 and the sixth lens L6F are orderly arranged along the direction from the object side to the image side.

As shown in FIGS. 25 to 28, the lens assembly according to the seventh preferred embodiment of the present invention, for the optical imaging lens, which comprises at least a first lens L1F, a second lens L2F, a third lens L3F, a fourth lens L4F, a fifth lens L5E and at least one sixth lens L6F, wherein the first lens L1F has a negative power, the second lens L2F has a negative power, the third lens L3F has a positive power; the fourth lens L4F has a positive power and the fifth lens L5F has a negative power, wherein the sixth lens L6F is an aspherical lens, wherein the sixth lens L6F comprises a center portion and an edge portion extended outwardly from the center portion, and the center portion of the sixth lens L6F has a positive power. Preferably, the first lens L1F, the second lens L2F, the third lens L3F, the fourth lens L4F, the fifth lens L5F and the sixth lens L6F are sequentially arranged along the direction from the object side to the image side, wherein the second lens L2F and the third lens L3F form the first achromatic lens assembly A1, and the fourth lens L4F and the fifth lens L5F form the second achromatic lens assembly A2. Alternatively, the first lens L1F, the second lens L2F, the third lens L3F, the fifth lens L5F, the fourth lens L4F and the sixth lens L6F are sequentially arranged along the direction from the object side to the image side. Preferably, the first lens L1F, the second lens L2F, the third lens L3F, the fourth lens L4F and/or the fifth lens L5F are aspheric lenses to improve the optical properties of the lens assembly according to the seventh preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1F, the second lens L2F, the third lens L3F, the fourth lens L4F, and/or the fifth lens L5F are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 25:
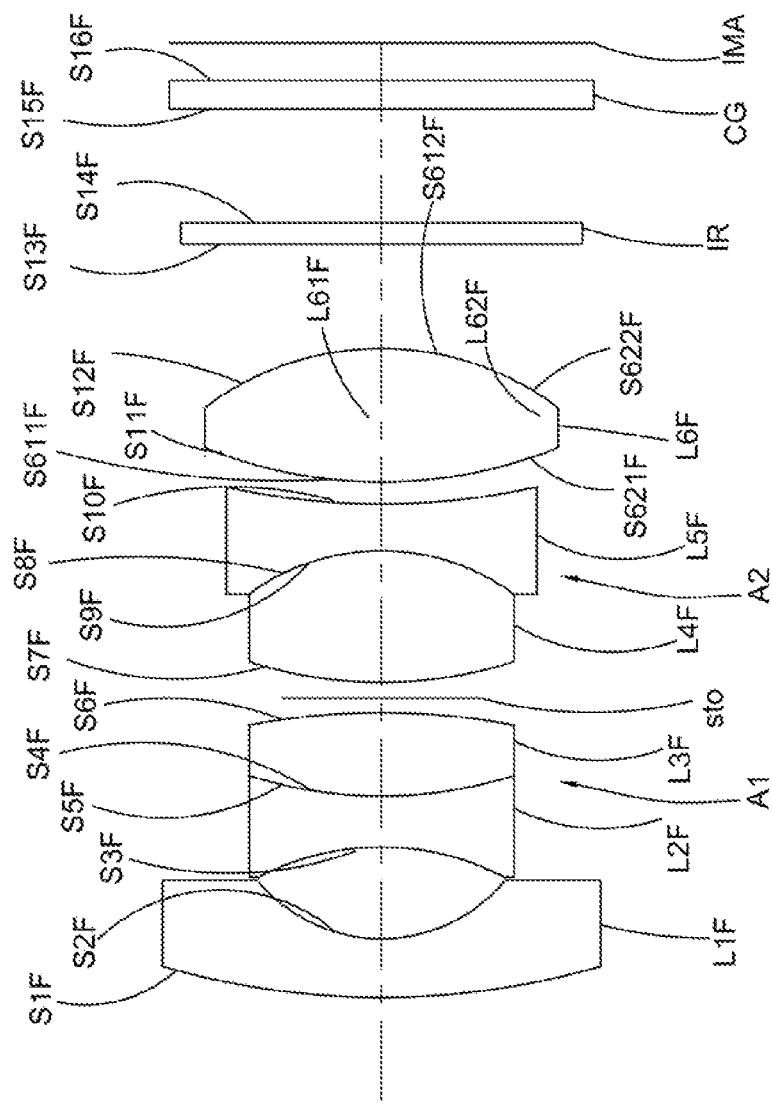
FIG. 25 is a structural schematic diagram of a lens assembly for an optical imaging lens according to a seventh preferred embodiment of the present invention.

As shown in FIG. 25, the first lens L1F, the second lens L2F, the third lens L3F, the fourth lens L4F, the fifth lens L5F and the sixth lens L6F of the lens assembly according to the seventh preferred embodiment of the present invention are coaxial with each other, which is used for the optical imaging lens.

As shown in FIG. 25, the lens assembly for the optical imaging lens according to the seventh preferred embodiment of the present invention further includes a diaphragm STO, wherein the diaphragm STO is provided between the third lens L3F and the fourth lens L4F, wherein the optical center of the diaphragm STO is coaxial with the optical centers of the first lens L1F, the second lens L2F, the third lens L3F, the fourth lens L4F, the fifth lens L5F and the sixth lens L6F. Alternatively, the diaphragm STO is provided between the first lens L1F and the second lens L2F. Alternatively, the diaphragm STO may also be provided between the fifth lens L5F and the sixth lens L6F. In some embodiments, the diaphragm STO is provided on the first lens L1F or the second lens L2F. In still other embodiments, the diaphragm STO is provided on the third lens L3F or the fourth lens L4F. In still other embodiments, the diaphragm STO is provided on the fifth lens L5F or the sixth lens L6F.

As shown in FIG. 25, the first lens L1F of the lens assembly for the optical imaging lens according to the seventh preferred embodiment of the present invention has a convex surface S1F and a concave surface S2F; the second lens L2F has two concave surfaces S3F, S4F; the third lens L3F has two convex surfaces S5F, S6F; the fourth lens L4F has two convex surfaces S7F, S8F; the fifth lens L5F has a concave surface S9F and a concave surface S10F; the center portion L61F of the sixth lens L6F has two convex surfaces S611F, S612F, and the edge portion L62F of the sixth lens L6F has two convex surfaces S621F, S622F, wherein the convex surface S1F of the first lens L1F faces the object side, the concave surface S2F of the first lens L1F faces the image side; the two concave surfaces S3F, S4F of the second lens L2F face the object side and the image side respectively; the two convex surfaces S5F, S6F of the third lens L3F face the object side and the image side respectively; the convex surface S7F of the fourth lens L4F faces the object side, the convex surface S8F of the fourth lens L4F faces the image side; the concave surface S9F of the fifth lens L5F faces the object side, the concave surface S10F of the fifth lens L5F faces the image side; the convex surfaces S611F, S612F of the center portion L61F of the sixth lens L6F face the object side and the image side respectively, the convex surfaces S621F, S622F of the edge portion L62F of the sixth lens L6F face the object side and the image side respectively. Preferably, the edge portion of the sixth lens L6F has a positive power, and the edge portion L62F of the sixth lens L6F has two convex surfaces S621F, S622F, wherein the convex surface S611F of the central portion L61F of the sixth lens L6F and the convex surface S621F of the edge portion L62F of the sixth lens L6F form a convex surface S11F facing the object side, and the convex surface S612F of the center portion L61F of the sixth lens L6F and the convex surface S622F of the edge portion L62F of the sixth lens L6F form a convex surface S12F facing the image side. Therefore, the sixth lens L6F is a biconvex lens. Therefore, the first lens L1F, the second lens L2F, the third lens L3F, the fourth lens L4F, the fifth lens L5F and the sixth lens L6F of the lens assembly for the optical imaging lens according to the seventh preferred embodiment of the present invention are respectively double-sided lenses. Further, the second lens L2F is a biconcave lens, and the third lens L3F is a biconvex lens.

Alternatively, the first lens L1F of the lens assembly for the optical imaging lens according to the seventh preferred embodiment of the present invention has a concave surface S1F facing the object side and a concave surface S2F facing the image side. Alternatively, the edge portion L62F of the sixth lens L6F has a negative power. Optionally, the edge portion L62F of the sixth lens L6F has a convex surface S621F facing the object side and a concave surface S622F facing the image side. Therefore, the convex surface S611F of the central portion L61F of the sixth lens L6F and the convex surface S621F of the edge portion L62F of the sixth lens L6F form a convex surface S11F facing the object side.

It is worth mentioning that when the convex surface S1F of the first lens L1F of the lens assembly faces the object side, it is advantageous to make more light enter into the lens assembly as much as possible. At the same time, the convex surface S1F of the first lens L1F faces the object side, which makes the first lens L1F of the lens assembly not easily be contaminated with dirt when the lens assembly is used outdoor, for example, rain is easier to fall on a rainy day. When the first lens L1F facing the object side is a concave surface S2F, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 25, the concave surface S4F of the second lens L2F of the lens assembly for the optical imaging lens according to the seventh preferred embodiment of the present invention, which faces the image side, and the convex surface S5F of the third lens L3F, which faces the object side, are provided to face with each other; the convex surface S8F of the fourth lens L4F, which faces the image side, and the concave surface S9F of the fifth lens L5F, which faces the object side, are provided to face with each other.

As shown in FIG. 25, the first and second achromatic lens assemblies A1, A2 of the lens assembly for the optical imaging lens according to the seventh preferred embodiment of the present invention are preferably cemented lenses. In other words, the second lens L2F and the third lens L3F may be glued together to form the first achromatic lens assembly A1; the fourth lens L4F and the fifth lens L5F may be glued together to form the second achromatic lens assembly A2. At this time, since the second lens L2F and the third lens L3F are glued together and the fourth lens L4F and the fifth lens L5F are glued together, so the concave surface S4F of the second lens L2F and the convex surface S5F of the third lens L3F are glued together; the convex surface S8F of the fourth lens L4F and the concave surface S9F of the fifth lens L5F are glued together. Preferably, both the concave surface S4F of the second lens L2F and the convex surface S5F of the third lens L3F are aspherical. More preferably, the convex surface S8F of the fourth lens L4F and the concave surface S9F of the fifth lens L5F are both aspherical to further reduce the chromatic aberration. Alternatively, the first and second achromatic lens assemblies A1, A2 may respectively be a double-separated achromatic lens assembly. It is appreciated that the second lens L2F and the third lens L3F are separately provided when the first and second achromatic lens assemblies A1, A2 are double-separated type achromatic lens assemblies; the fourth lens L4F and the fifth lens L5F are separately provided, the diaphragm STO may be provided between the second lens L2F and the third lens L3F or between the fourth lens L4F and the fifth lens L5F.

As shown in FIG. 25, the second lens L2F and the third lens L3F of the first achromatic lens assembly A1 of the lens assembly for the optical imaging lens according to the seventh preferred embodiment of the present invention have a negative power and a positive power respectively, wherein the second lens L2F is preferably made of material having a low refractive index and a high Abbe number, and the third lens L3F is preferably made of material having a high refractive index and a low Abbe number, wherein the second lens L2F having a negative power has a lower refractive index, and the third lens L3F having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4F and the fifth lens L5F of the second achromatic lens assembly A2 of the lens assembly for the optical imaging lens according to the seventh preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1F and the first achromatic lens assembly A1 of the lens assembly for the optical imaging lens according to the seventh preferred embodiment of the present invention is F1, the focal length of the combination of the second achromatic lens assembly A2 and the sixth lens L6F is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6F and the image plane.

As shown in FIG. 25, furthermore, the lens assembly for the optical imaging system according to the seventh preferred embodiment of the present invention defines an image plane IMA, and the optical imaging system may further include a color filter IR and a protective glass CG disposed in front of the image plane IMA.

As shown in FIG. 25, the imaging light may enter from the convex surface S1F of the first lens L1F of the lens assembly and pass sequentially through the first lens L1F, the second lens L2F, the third lens L3F, the diaphragm STO, the fourth lens L4F, the fifth lens L5F, the sixth lens L6F, the color filter IR, and the protective plate CG, and then is imaged on the image plane IMA.

As shown in FIG. 25, the sixth lens L6F of the lens assembly for the optical imaging lens according to the seventh preferred embodiment of the present invention is an aspheric lens. Preferably, the sixth lens L6F is a glass aspherical lens. Optionally, the sixth lens L6F is a plastic aspherical lens. When the sixth lens L6F is made of plastic material, the overall weight and the manufacturing cost of the lens assembly may be reduced. More preferably, the aspherical surface of the sixth lens L6F can satisfy the following formula:

TABLE 13 parameters of Lens surfaces of a specific example of a lens assembly according to the seventh preferred embodiment of the present invention:

| Serial number of surface S | Radius of curvature R | Distance between centers of two neighboring lenses d | Refractive index Nd | Abbe number Vd |
|---|---|---|---|---|
| S1F | 10.8179 | 0.7000 | 1.52 | 64.21 |
| S2F | 2.1912 | 1.7278 | | |
| S3F | -3.3552 | 0.5000 | 1.52 | 64.21 |
| S4F | 3.1763 | 0.0000 | | |
| S5F | 3.1763 | 1.2000 | 1.90 | 31.32 |
| S6F | -11.9057 | 0.0300 | | |
| STO | Infinity | 0.1000 | | |
| S7F | 7.8060 | 1.6526 | 1.50 | 81.59 |
| S8F | -1.9209 | 0.0000 | | |
| S9F | -1.9209 | 0.5500 | 1.68 | 25.54 |
| S10F | 12.3187 | 0.0923 | | |
| S11F | 5.8507 | 1.9099 | 1.74 | 49.24 |
| S12F | -3.5394 | 1.6032 | | |
| S13F | Infinity | 0.3000 | 1.52 | 64.21 |
| S14F | Infinity | 2.9849 | | |
| S15F | Infinity | 0.4000 | 1.52 | 64.17 |
| S16F | Infinity | 0.1250 | | |
| IMA | Infinity | | | |

TABLE 14

Aspherical coefficients of the two surfaces of the sixth lens as above embodiment K, A, B, C, D, E:

| Serial number of surface S | K | A | B | C | D | E |
|---|---|---|---|---|---|---|
| S11F | -8.196958 | -5.0394 × 10-4 | -1.0147 × 10-5 | 4.0442 × 10-5 | -8.1176 × 10-6 | 7.7383 × 10-7 |
| S12F | -1.557704 | 2.3667 × 10-4 | -5.9141 × 10-5 | 2.0128 × 10-4 | -3.0947 × 10-5 | 2.0305 × 10-6 |

$$Z(h) = \frac{ch^2}{1+\sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the seventh preferred embodiment of the present invention is TTL (referred to the distance from the outermost point of the object side of the first lens L1F to the image plane of the lens assembly), and the focal length of the entire lens assembly is F, then TTL/F≤12, as shown in Table 13 and Table 14. Preferably, TTL/F≤7.5, to satisfy the miniaturization requirement of the lens assembly of the present invention.

The above Table 13 and Table 14 show a specific example of a lens assembly for the optical imaging lens according to the seventh preferred embodiment of the present invention, wherein the specific example may be used in an optical imaging system, wherein the radius of curvature of the convex surface S1F of the first lens L1F is 10.8179, which faces the object side, the radius of curvature of the concave surface S2F of the first lens L1F is 2.1912, which faces facing the image side, wherein the refractive index of the first lens L1F is 1.52, the abbe's constant of the first lens L1F is 64.21, wherein the distance between the center (or optical center) of the convex surface S1F of the first lens L1F and the center (or optical center) of the concave surface S2F of the first lens L1F is 0.70; the radius of curvature of the concave surface S3F of the second lens L2F is -3.3552, which faces the object side, and the radius of curvature of the concave surface S4F of the second lens L2F of the lens assembly is 3.1763, which faces the image side, wherein the refractive index of the second lens L2F is 1.52, the abbe's constant of the second lens L2F is 64.21, wherein the distance between the center (or optical center) of the concave surface S2F of the first lens L1F and the center (or optical center) of the concave surface S3F of the second lens L2 is 1.7278, and the distance between the center (or optical center) of the concave surface S3F and the center (or optical center) of the concave surface S4F of the second lens L2F is 0.5000; the radius of curvature of the convex surface S6F of the third lens L3F of the lens assembly is −11.9057, which faces the image side, wherein the refractive index of the third lens L3F is 1.9, the abbe's constant of the third lens L3F is 31.32, wherein the concave surface S4F of the second lens L2F is glued together with the convex surface S5F of the third lens L3F, and the distance between the center (or optical center) of the convex surface S5F and the center (or optical center) of the convex surface S6F of the third lens L3F is 1.2000, the distance between the center (or optical center) of the convex surface S6F of the third lens L3F and the diaphragm STO is 0.0300, the distance between the diaphragm STO and the fourth lens L4F is 0.1000; the radius of curvature of the convex surface S7F of the fourth lens L4F of the lens assembly is 7.8060, which faces the object side, the radius of curvature of the convex surface S8F of the fourth lens L4F of the lens assembly is −1.9209, which faces the image side, wherein the refractive index of the fourth lens L4F is 1.50, the abbe's constant of the fourth lens L4F is 81.59, wherein the distance between the center (or optical center) of the convex surface S7F of the fourth lens L4F and the center (or optical center) of the convex surface S8F of the fourth lens L4F is 1.6526; the radius of curvature of the concave surface S10F of the fifth lens L5F of the lens assembly is 12.3187, which faces the image side, wherein the refractive index of the fifth lens L5F is 1.68, the abbe's constant of the fifth lens L5F is 25.54, and the convex surface S8F of the fourth lens L4F is glued together with the concave surface S9F of the fifth lens L5F, wherein the distance between the center of the concave surface S9F of the fifth lens L5F and the center (or optical center) of the concave surface S10F of the fifth lens L5F is 0.5500; and the curvature radius of the convex surface S11F of the sixth lens L6F of the lens assembly is 5.8507, which faces the object side, the radius of curvature of the convex surface S12F of the sixth lens L6F is −3.5394, which faces the image side, wherein the abbe's constant of the sixth lens L6F is 49.24, wherein the distance between the center (or optical center) of the convex surface S10F of the fifth lens L5F and the center (or optical center) of the convex surface S11F of the sixth lens L6F is 0.0923, the distance between the center (or optical center) of the convex surface S11F of the sixth lens L6F and the center (or optical center) of the convex surface S12F of the sixth lens L6F is 1.9099, the distance between the sixth lens L6F of the lens assembly L6F and the color filter IR of the optical imaging system is 1.6032, the distance between the two surfaces S13F, S14F of the filter IR is 0.3000, the distance between the color filter IR of the optical imaging system and the protective glass CG is 2.9849, the distance between the two surfaces S15F, S16F of the protective plate CG is 0.40, and the distance between the protective glass CG and the image plane IMA is 0.125. In addition, both surfaces S11F, S12F of the sixth lens L6F are aspherical, and for S11F, K is −8.196958, the constant A is −5.0394×10−4; B is −1.0147×10−5; C is 4.0442×10−5; D is −8.1176×10−6; E is 7.7383×10−7, or S12F, K is −1.557704, the constant A is 2.3667×10−4; B is −5.9141×10−5; C is 2.0128×10−4; D is −3.0947×10−5; E is 2.0305×10−6.

In addition, the optical length of the lens assembly for the optical imaging lens according to the seventh preferred embodiment of the present invention is TTL=13.88, and the focal length F of the entire lens assembly is F=3.06, then TTL/F=4.53. The total focal length of the second achromatic lens assembly A2 and the sixth lens L6F is F2=4.29, and F2/F=1.40.

Figure 26:
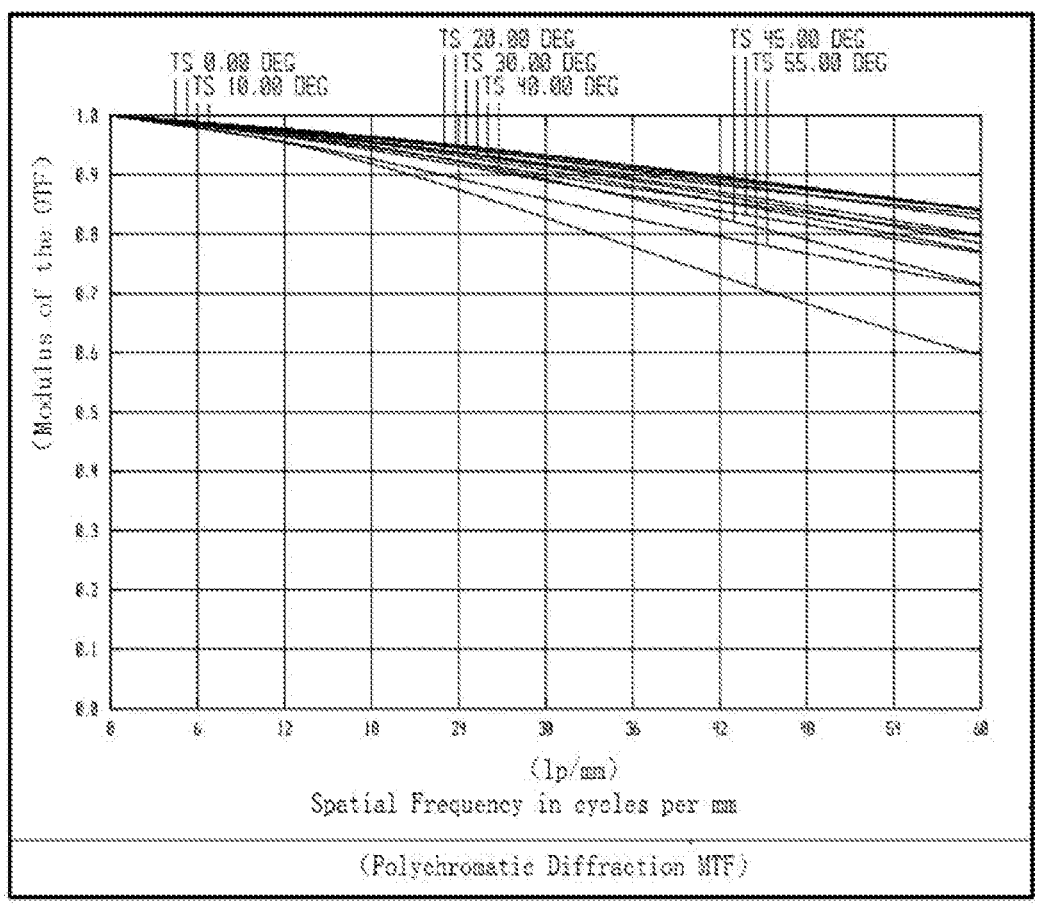
FIG. 26 shows a MTF resolution curve of the lens assembly for the optical imaging lens according to the above seventh preferred embodiment of the present invention.
Figure 27:
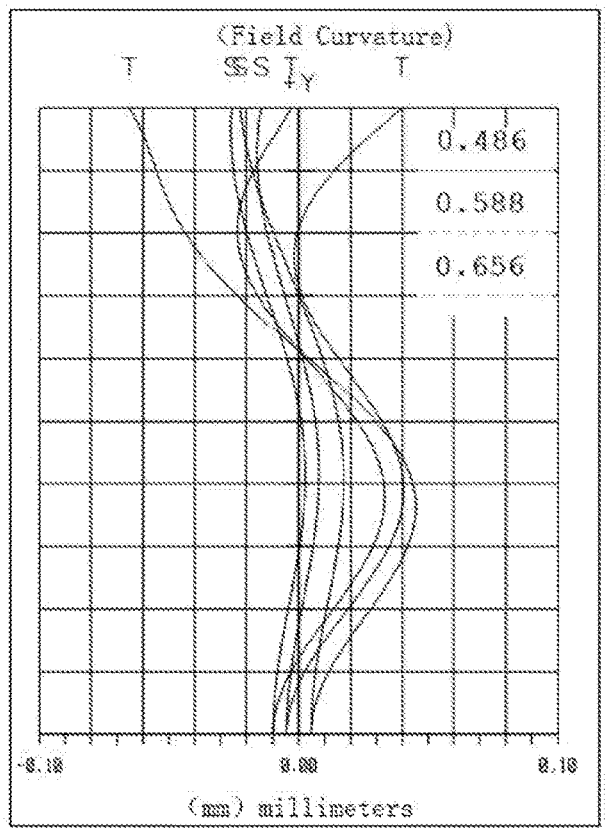
FIG. 27 shows an astigmatism curve of the lens assembly for the optical imaging lens according to the above seventh preferred embodiment of the present invention.
Figure 28:
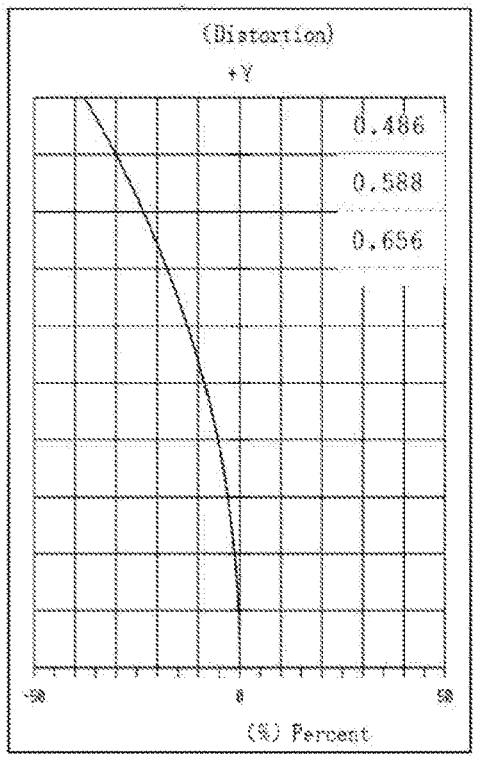
FIG. 28 shows a distortion curve of the lens assembly for the optical imaging lens according to the above seventh preferred embodiment of the present invention.

As shown in FIGS. 26 to 28 are curve graphs showing the optical properties of the specific example of the lens assembly according to the seventh preferred embodiment of the present invention, wherein FIG. 26 shows a MTF resolution curve of the specific example of the optical imaging lens employing the lens assembly according to the seventh preferred embodiment of the present invention; and FIG. 27 is a diagram showing an astigmatisma curve of the specific example of the lens assembly according to the seventh preferred embodiment of the present invention, which is represented by the wavelength of common three-color light in units of mm; and FIG. 28 is a diagram showing the distortion curve of the specific example of the lens assembly according to the seventh preferred embodiment of the present invention, which shows the value of the normalized distortion in different field angles. As shown in FIGS. 26 to 28, the optical imaging lens employing the specific example of the lens assembly according to the seventh preferred embodiment of the present invention has better optical performance.

Referring to FIGS. 29 to 32 of the accompanying drawings of the present invention, a lens assembly for an optical imaging lens according to a eighth preferred embodiment of the present invention is illustrated, wherein the lens assembly of the optical imaging lens includes at least a first lens L1G, a second lens L2G, a third lens L3G, a fourth lens L4G, a fifth lens L5G and a sixth lens L6G, wherein the first lens L1G has a negative power, and the sixth lens L6G has a positive power, wherein the second lens L2G and the third lens L3G define a first achromatic lens assembly A1, and the fourth lens L4G and the fifth lens L5G defines a second achromatic lens assembly A2, wherein the first lens L1G, the first achromatic lens assembly A1, the second achromatic lens assembly A2 and the sixth lens L6G are orderly arranged along the direction from the object side to the image side.

As shown in FIGS. 29 to 32, the lens assembly according to the eighth preferred embodiment of the present invention, for the optical imaging lens, which comprises at least a first lens L1G, a second lens L2G, a third lens L3G, a fourth lens L4G, a fifth lens L5G and at least one sixth lens L6G, wherein the first lens L1G has a negative power, the second lens L2G has a positive power, the third lens L3G has a negative power; the fourth lens L4G has a positive power and the fifth lens L5G has a negative power, wherein the sixth lens L6G is an aspherical lens, wherein the sixth lens L6G comprises a center portion and an edge portion extended outwardly from the center portion, and the center portion of the sixth lens L6G has a positive power. Preferably, the first lens L1G, the second lens L2G, the third lens L3G, the fourth lens L4G, the fifth lens L5G and the sixth lens L6G are sequentially arranged along the direction from the object side to the image side. Alternatively, the first lens L1G, the second lens L2G, the third lens L3G, the fifth lens L5G, the fourth lens L4G and the sixth lens L6G are sequentially arranged along the direction from the object side to the image side. Preferably, the first lens L1G, the second lens L2G, the third lens L3G, the fourth lens L4G and/or the fifth lens L5G are aspheric lenses to improve the optical properties of the lens assembly according to the eighth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1G, the second lens L2G, the third lens L3G, the fourth lens L4G, and/or the fifth lens L5G are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 29:
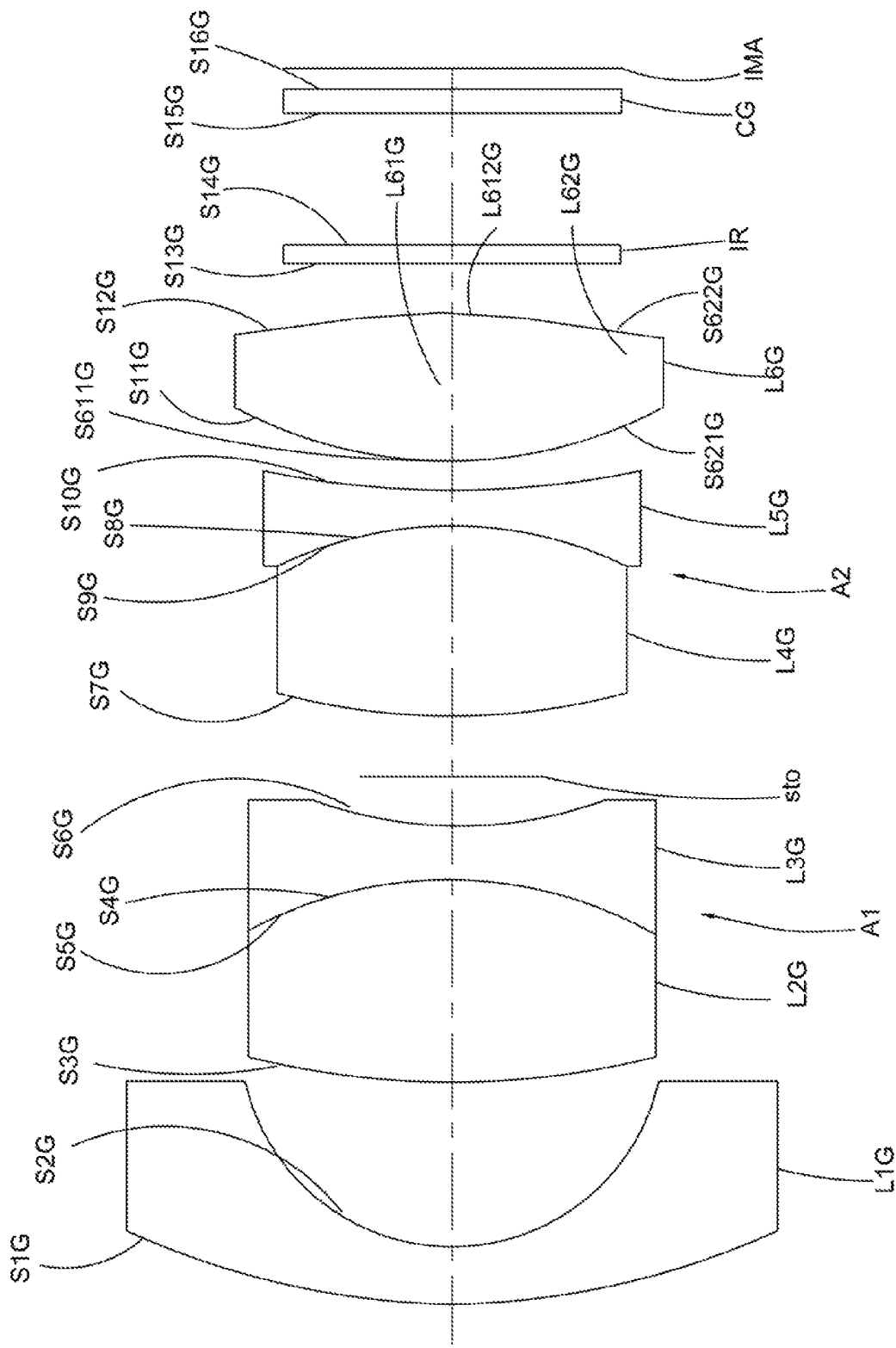
FIG. 29 is a structural schematic diagram of a lens assembly for an optical imaging lens according to an eighth preferred embodiment of the present invention.

As shown in FIG. 29, the first lens L1G, the second lens L2G, the third lens L3G, the fourth lens L4G, the fifth lens L5G and the sixth lens L6G of the lens assembly according to the eighth preferred embodiment of the present invention are coaxial with each other, which is used for the optical imaging lens.

As shown in FIG. 29, the lens assembly for the optical imaging lens according to the eighth preferred embodiment of the present invention further includes a diaphragm STO, wherein the diaphragm STO is provided between the third lens L3G and the fourth lens L4G, wherein the optical center of the diaphragm STO is coaxial with the optical centers of the first lens L1G, the second lens L2G, the third lens L3G, the fourth lens L4G, the fifth lens L5G and the sixth lens L6G. Alternatively, the diaphragm STO is provided between the first lens L1G and the second lens L2G. Alternatively, the diaphragm STO may also be provided between the fifth lens L5G and the sixth lens L6G. In some embodiments, the diaphragm STO is provided on the first lens L1G or the second lens L2G. In still other embodiments, the diaphragm STO is provided on the third lens L3G or the fourth lens L4G. In still other embodiments, the diaphragm STO is provided on the fifth lens L5G or the sixth lens L6G.

As shown in FIG. 29, the first lens L1G of the lens assembly for the optical imaging lens according to the eighth preferred embodiment of the present invention has a convex surface S1G and a concave surface S2G; the second lens L2G has two convex surfaces S3G, S4G; the third lens L3G has two concave surfaces S5G, 56G; the fourth lens L4G has two convex surfaces S7G, S8G; the fifth lens L5G has a concave surface S9G and a concave surface S10G; the center portion L61G of the sixth lens L6G has two convex surfaces S611G, S612G, and the edge portion L62G of the sixth lens L6G has two convex surfaces S621G, 5622G, wherein the convex surface S1G of the first lens L1G faces the object side, the concave surface S2G of the first lens L1G faces the image side; the two convex surfaces S3G, S4G of the second lens L2G face the object side and the image side respectively; the two concave surfaces S5G, S6G of the third lens L3G face the object side and the image side respectively; the convex surface S7G of the fourth lens L4G faces the object side, the convex surface S8G of the fourth lens L4G faces the image side; the concave surface S9G of the fifth lens L5G faces the object side, the concave surface S10G of the fifth lens L5G faces the image side; the convex surfaces S611G, S612G of the center portion L61G of the sixth lens L6G face the object side and the image side respectively, the convex surfaces S621G, S622G of the edge portion L62G of the sixth lens L6G face the object side and the image side respectively. Therefore, the convex surface S611G of the central portion L61G of the sixth lens L6G and the convex surface S621G of the edge portion L62G of the sixth lens L6G form a convex surface S11G facing the object side, and the convex surface S612G of the center portion L61G of the sixth lens L6G and the convex surface S622G of the edge portion L62G of the sixth lens L6G form a convex surface S12G facing the image side. The edge portion of the sixth lens L6G has a positive power. Therefore, the first lens L1G, the second lens L2G, the third lens L3G, the fourth lens L4G, the fifth lens L5G and the sixth lens L6F of the lens assembly for the optical imaging lens according to the eighth preferred embodiment of the present invention are respectively double-sided lenses. Further, the second lens L2G is a biconvex lens, and the third lens L3G is a biconcave lens and the sixth lens L6G is a biconvex lens.

Alternatively, the first lens L1G of the lens assembly for the optical imaging lens according to the eighth preferred embodiment of the present invention has a concave surface S1G facing the object side and a concave surface S2G facing the image side. Alternatively, the edge portion L62G of the sixth lens L6G has a negative power. Optionally, the edge portion L62G of the sixth lens L6G has a convex surface S621G facing the object side and a concave surface S622G facing the image side. Therefore, the convex surface S611G of the central portion L61G of the sixth lens L6G and the convex surface S621G of the edge portion L62G of the sixth lens L6G form a convex surface S11G facing the object side.

It is worth mentioning that when the convex surface S1G of the first lens L1G of the lens assembly faces the object side, it is advantageous to make more light enter into the lens assembly as much as possible. At the same time, the convex surface S1G of the first lens L1G faces the object side, which makes the first lens L1G of the lens assembly not easily be contaminated with dirt when the lens assembly is used outdoor, for example, rain is easier to fall on a rainy day. When the first lens L1G facing the object side is a concave surface S2G, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 29, the convex surface S4G of the second lens L2G of the lens assembly for the optical imaging lens according to the eighth preferred embodiment of the present invention, which faces the image side, and the concave surface S5G of the third lens L3G, which faces the object side, are provided to face with each other; the convex surface S8G of the fourth lens L4G, which faces the image side, and the concave surface S9G of the fifth lens L5G, which faces the object side, are provided to face with each other.

As shown in FIG. 29, the first and second achromatic lens assemblies A1, A2 of the lens assembly for the optical imaging lens according to the eighth preferred embodiment of the present invention are preferably cemented lenses. In other words, the second lens L2G and the third lens L3G may be glued together to form the first achromatic lens assembly A1; the fourth lens L4G and the fifth lens L5G may be glued together to form the second achromatic lens assembly A2. At this time, since the second lens L2G and the third lens L3G are glued together and the fourth lens L4G and the fifth lens L5G are glued together, so the convex surface S4G of the second lens L2G and the concave surface S5G of the third lens L3G are glued together; the convex surface S8G of the fourth lens L4G and the concave surface S9G of the fifth lens L5G are glued together. Preferably, both the convex surface S4G of the second lens L2G and the concave surface S5G of the third lens L3G are aspherical. More preferably, the convex surface S8G of the fourth lens L4G and the concave surface S9G of the fifth lens L5G are both aspherical to further reduce the chromatic aberration. Alternatively, the first and second achromatic lens assemblies A1, A2 may respectively be a double-separated achromatic lens assembly. It is appreciated that the second lens L2G and the third lens L3G are separately provided when the first and second achromatic lens assemblies A1, A2 are double-separated type achromatic lens assemblies; the fourth lens L4G and the fifth lens L5G are separately provided, the diaphragm STO may be provided between the second lens L2G and the third lens L3G or between the fourth lens L4G and the fifth lens L5G.

As shown in FIG. 29, the second lens L2G and the third lens L3G of the first achromatic lens assembly A1 of the lens assembly for the optical imaging lens according to the eighth preferred embodiment of the present invention have a negative power and a positive power respectively, wherein the second lens L2G is preferably made of material having a high refractive index and a low Abbe number, and the third lens L3G is preferably made of material having a low refractive index and a high Abbe number, wherein the second lens L2G having a positive power has a higher refractive index, and the third lens L3G having a negative power has a lower refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4G and the fifth lens L5G of the second achromatic lens assembly A2 of the lens assembly for the optical imaging lens according to the eighth preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1G and the first achromatic lens assembly A1 of the lens assembly for the optical imaging lens according to the eighth preferred embodiment of the present invention is F1, the focal length of the combination of the second achromatic lens assembly A2 and the sixth lens L6G is F2, and the focal length of the entire lens assembly is F, preferably, $1.0 \leq F2/F \leq 2.2$. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6G and the image plane.

As shown in FIG. 29, furthermore, the lens assembly for the optical imaging system according to the eighth preferred embodiment of the present invention defines an image plane IMA, and the optical imaging system may further include a color filter IR and a protective glass CG disposed in front of the image plane IMA.

As shown in FIG. 29, the imaging light may enter from the convex surface S1G of the first lens L1G of the lens assembly and pass sequentially through the first lens L1G, the second lens L2G, the third lens L3G, the diaphragm STO, the fourth lens L4G, the fifth lens L5G, the sixth lens L6G, the color filter IR, and the protective plate CG, and then is imaged on the image plane IMA.

As shown in FIG. 29, the sixth lens L6G of the lens assembly for the optical imaging lens according to the eighth preferred embodiment of the present invention is an aspheric lens. Preferably, the sixth lens L6G is a glass aspherical lens. Optionally, the sixth lens L6G is a plastic aspherical lens. When the sixth lens L6G is made of plastic material, the overall weight and the manufacturing cost of the lens assembly may be reduced. More preferably, the aspherical surface of the sixth lens L6G can satisfy the following formula:

$$Z(h) = \frac{ch^2}{1 + \sqrt{1 - (1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the eighth preferred embodiment of the present invention is TTL (referred to the distance from the outermost point of the object side of the first lens L1G to the image plane of the lens assembly), and the focal length of the entire lens assembly is F, then TTL/F≤12, as shown in Table 15 and Table 16. Preferably, TTL/F≤7.5, to satisfy the miniaturization requirement of the lens assembly of the present invention.

TABLE 15 parameters of Lens surfaces of a specific example of a lens assembly according to the eighth preferred embodiment of the present invention:

| Serial number of surface S | Radius of curvature R | Distance between centers of two neighboring lenses d | Refractive index Nd | Abbe number Vd |
|---|---|---|---|---|
| S1G | 14.2859 | 1.2500 | 1.52 | 64.20 |
| S2G | 4.0121 | 3.8000 | | |
| S3G | 48.1826 | 2.7728 | 1.90 | 31.32 |
| S4G | −11.9428 | 0.0000 | | |
| S5G | −11.9428 | 0.8000 | 1.50 | 81.61 |
| S6G | 4.1623 | 2.9083 | | |
| STO | Infinity | 0.4794 | | |
| S7G | 5.3398 | 4.0000 | 1.71 | 53.80 |
| S8G | −3.9469 | 0.0000 | | |
| S9G | −3.9469 | 0.6000 | 1.78 | 25.72 |
| S10G | 34.1718 | 0.2000 | | |
| S11G | 7.7138 | 2.5328 | 1.59 | 61.16 |
| S12G | −6.4978 | 2.0844 | | |
| S13G | Infinity | 0.3000 | 1.52 | 64.20 |
| S14G | Infinity | 2.6649 | | |
| S15G | Infinity | 0.4000 | 1.52 | 64.17 |
| S16G | Infinity | 0.1250 | | |
| IMA | Infinity | | | |

TABLE 16

Aspherical coefficients of the two surfaces of the sixth lens as above embodiment K, A, B, C, D, E:

| Serial number of surface S | K | A | B | C | D | E |
|---|---|---|---|---|---|---|
| S11G | 7.444128 | −1.3843 × 10−3 | 3.7675 × 10−4 | −1.3436 × 10−4 | 3.5175 × 10−5 | −3.6077 × 10−6 |
| S12G | −3.311991 | 4.7074 × 10−3 | −3.8505 × 10−4 | 2.7477 × 10−4 | −3.3602 × 10−5 | 2.3610 × 10−6 |

The above Table 15 and Table 16 show a specific example of a lens assembly for the optical imaging lens according to the eighth preferred embodiment of the present invention, wherein the specific example may be used in an optical imaging system, wherein the radius of curvature of the convex surface S1G of the first lens L1G is 14.2859, which faces the object side, the radius of curvature of the concave surface S2G of the first lens L1G is 4.0121, which faces facing the image side, wherein the refractive index of the first lens L1G is 1.52, the abbe's constant of the first lens L1G is 64.20, wherein the distance between the center (or optical center) of the convex surface S1G of the first lens L1G and the center (or optical center) of the concave surface S2 of the first lens L1G is 1.2500; the radius of curvature of the convex surface S3G of the second lens L2G is 48.1826, which faces the object side, and the radius of curvature of the convex surface S4G of the second lens L2G of the lens assembly is −11.9428, which faces the image side, wherein the refractive index of the second lens L2G is 1.90, the abbe's constant of the second lens L2G is 31.32, wherein the distance between the center (or optical center) of the concave surface S2G of the first lens L1G and the center (or optical center) of the convex surface S3G of the second lens L2G is 3.8000, and the distance between the center (or optical center) of the convex surface S3 and the center (or optical center) of the convex surface S4G of the second lens L2G is 2.7728; the radius of curvature of the concave surface S6G of the third lens L3G of the lens assembly is 4.1623, which faces the image side, wherein the refractive index of the third lens L3G is 1.50, the abbe's constant of the third lens L3G is 81.61, wherein the convex surface S4G of the second lens L2G is glued together with the concave surface S5G of the third lens L3G, and the distance between the center (or optical center) of the concave surface S5G and the center (or optical center) of the concave surface S6G of the third lens L3G is 0.8000, the distance between the center (or optical center) of the concave surface S6G of the third lens L3G and the diaphragm STO is 2.9083, the distance between the diaphragm STO and the fourth lens L4G is 0.4794; the radius of curvature of the convex surface S7G of the fourth lens L4G of the lens assembly is 5.3398, which faces the object side, the radius of curvature of the convex surface S8G of the fourth lens L4G of the lens assembly is −3.9469, which faces the image side, wherein the refractive index of the fourth lens L4G is 1.71, the abbe's constant of the fourth lens L4G is 53.80, wherein the distance between the center (or optical center) of the convex surface S7G of the fourth lens L4G and the center (or optical center) of the convex surface S8G of the fourth lens L4G is 4.0000; the radius of curvature of the concave surface S10G of the fifth lens L5G of the lens assembly is 34.1718, which faces the image side, wherein the refractive index of the fifth lens L5G is 1.78, the abbe's constant of the fifth lens L5G is 25.72, and the convex surface S8G of the fourth lens L4G is glued together with the concave surface S9G of the fifth lens L5G, wherein the distance between the center of the concave surface S9G of the fifth lens L5G and the center (or optical center) of the concave surface S10G of the fifth lens L5G is 0.6000; and the curvature radius of the convex surface S11G of the sixth lens L6G of the lens assembly is 7.7138, which faces the object side, the radius of curvature of the convex surface S12G of the sixth lens L6G is −6.4978, which faces the image side, wherein the abbe's constant of the sixth lens L6G is 61.16, wherein the distance between the center (or optical center) of the concave surface S10G of the fifth lens L5G and the center (or optical center) of the convex surface S11G of the sixth lens L6G is 0.2000, the distance between the center (or optical center) of the convex surface S11G of the sixth lens L6G and the center (or optical center) of the convex surface S12G of the sixth lens L6G is 2.5328, the distance between the sixth lens L6G of the lens assembly L6G and the color filter IR of the optical imaging system is 2.0844, the distance between the two surfaces S13G, S14G of the filter IR is 0.3000, the distance between the color filter IR of the optical imaging system and the protective glass CG is 2.6649, the distance between the two surfaces S15G, S16G of the protective plate CG is 0.40, and the distance between the protective glass CG and the image plane IMA is 0.125. In addition, both surfaces S11G, S12G of the sixth lens L6G are aspherical, and for S11G, K is 7.444128, the constant A is −1.3843×10−3; B is 3.7675×10−4; C is −1.3436×10−4; D is 3.5175×10−5; E is −3.6077×10−6, or S12G, K is −3.311991, the constant A is 4.7074×10−3; B −3.8505×10−4; C is 2.7477×10−4; D is −3.3602×10−5; E is 2.3610×10-6.

In addition, the optical length of the lens assembly for the optical imaging lens according to the eighth preferred embodiment of the present invention is TTL=24.92, and the focal length F of the entire lens assembly is F=3.41, then TTL/F=7.30. The total focal length of the second achromatic lens assembly A2 and the sixth lens L6G is F2=5.30, and F2/F=1.55.

Figure 30:
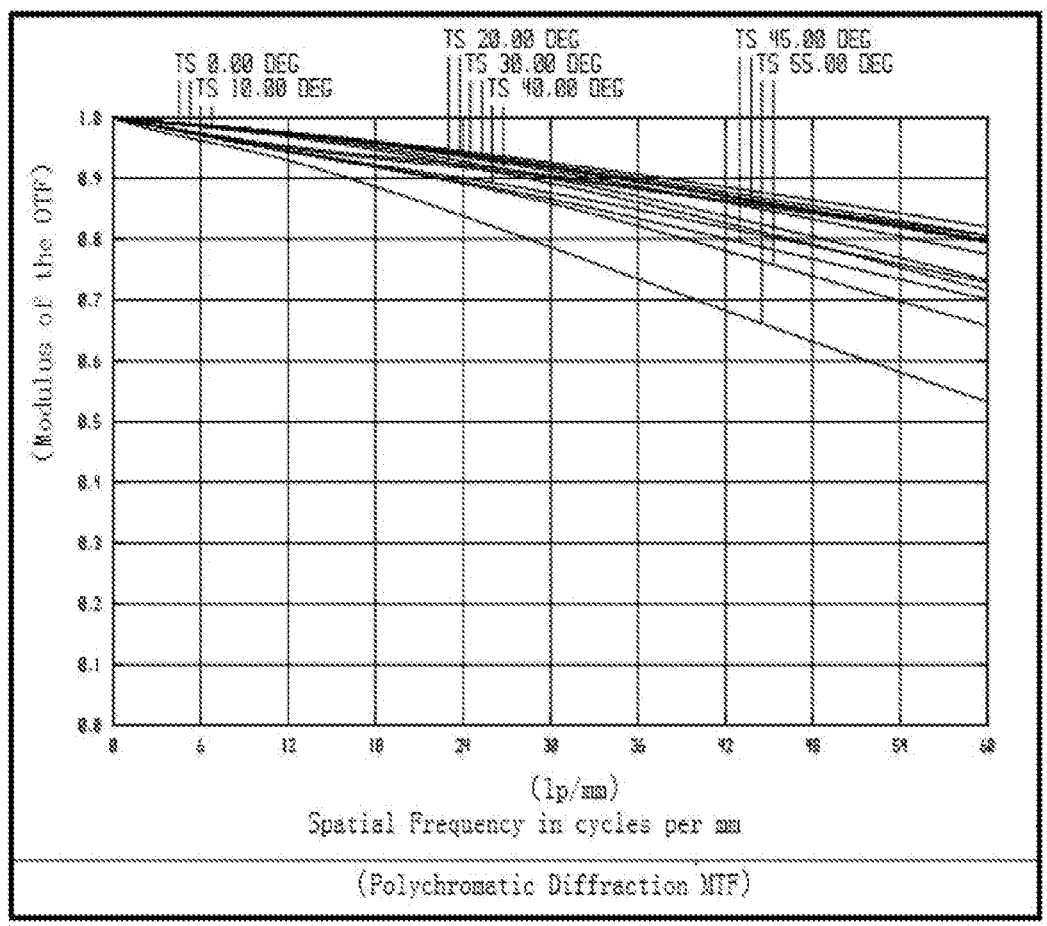
FIG. 30 shows a MTF resolution curve of the lens assembly for the optical imaging lens according to the above eighth preferred embodiment of the present invention.
Figure 31:
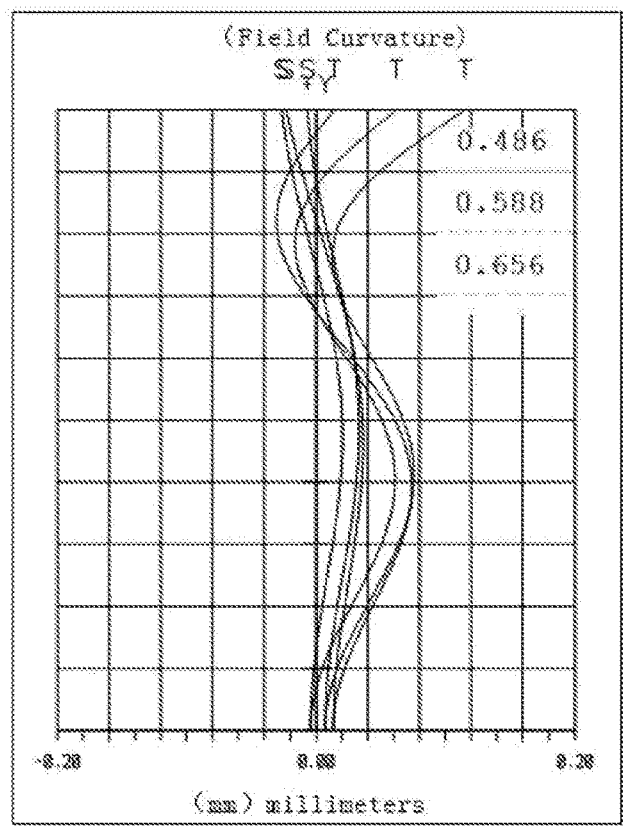
FIG. 31 shows an astigmatism curve of the lens assembly for the optical imaging lens according to the above eighth preferred embodiment of the present invention.
Figure 32:
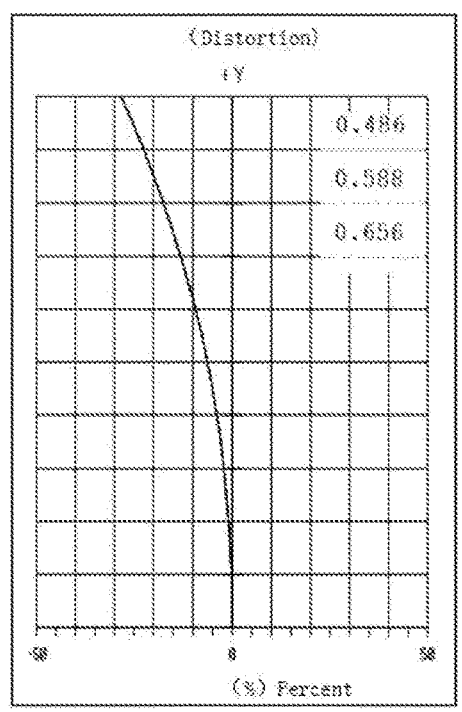
FIG. 32 shows a distortion curve of the lens assembly for the optical imaging lens according to the above eighth preferred embodiment of the present invention.

As shown in FIGS. 30 to 32 are curve graphs showing the optical properties of the specific example of the lens assembly according to the eighth preferred embodiment of the present invention, wherein FIG. 30 shows a MTF resolution curve of the specific example of the optical imaging lens employing the lens assembly according to the eighth preferred embodiment of the present invention; and FIG. 31 is a diagram showing an astigmatisma curve of the specific example of the lens assembly according to the eighth preferred embodiment of the present invention, which is represented by the wavelength of common three-color light in units of mm; and FIG. 32 is a diagram showing the distortion curve of the specific example of the lens assembly according to the eighth preferred embodiment of the present invention, which shows the value of the normalized distortion in different field angles. As shown in FIGS. 30 to 32, the optical imaging lens employing the specific example of the lens assembly according to the eighth preferred embodiment of the present invention has better optical performance.

Referring to FIGS. 33 to 36 of the accompanying drawings of the present invention, a lens assembly for an optical imaging lens according to a ninth preferred embodiment of the present invention is illustrated, wherein the lens assembly of the optical imaging lens includes at least a first lens L1H, a second lens L2H, a third lens L3H, a fourth lens L4H, a fifth lens L5H and a sixth lens L6H, wherein the first lens L1H has a negative power, and the sixth lens L6H has a positive power, wherein the second lens L2H and the third lens L3H define a first achromatic lens assembly A1, and the fourth lens L4H and the fifth lens L5H defines a second achromatic lens assembly A2, wherein the first lens L1H, the first achromatic lens assembly A1, the second achromatic lens assembly A2 and the sixth lens L6H are orderly arranged along the direction from the object side to the image side.

As shown in FIGS. 33 to 36, the lens assembly according to the ninth preferred embodiment of the present invention, for the optical imaging lens, which comprises at least a first lens L1H, a second lens L2H, a third lens L3H, a fourth lens L4H, a fifth lens L5H and at least one sixth lens L6H, wherein the first lens L1H has a negative power, the second lens L2H has a positive power, the third lens L3H has a negative power, the fourth lens L4H has a positive power and the fifth lens L5H has a negative power, wherein the sixth lens L6H is an aspherical lens, wherein the sixth lens L6H comprises a center portion and an edge portion extended outwardly from the center portion, and the center portion of the sixth lens L6H has a positive power. Preferably, the first lens L1H, the second lens L2H, the third lens L3H, the fourth lens L4H, the fifth lens L5H and the sixth lens L6H are sequentially arranged along the direction from the object side to the image side, wherein the second lens L2H and the third lens L3H form the first achromatic lens assembly A1, and the fourth lens L4H and the fifth lens L5H form the second achromatic lens assembly A2. Preferably, the first lens L1H, the second lens L2H, the third lens L3H, the fourth lens L4H and/or the fifth lens L5H are aspheric lenses to improve the optical properties of the lens assembly according to the ninth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1H, the second lens L2H, the third lens L3H, the fourth lens L4H, and/or the fifth lens L5H are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 33:
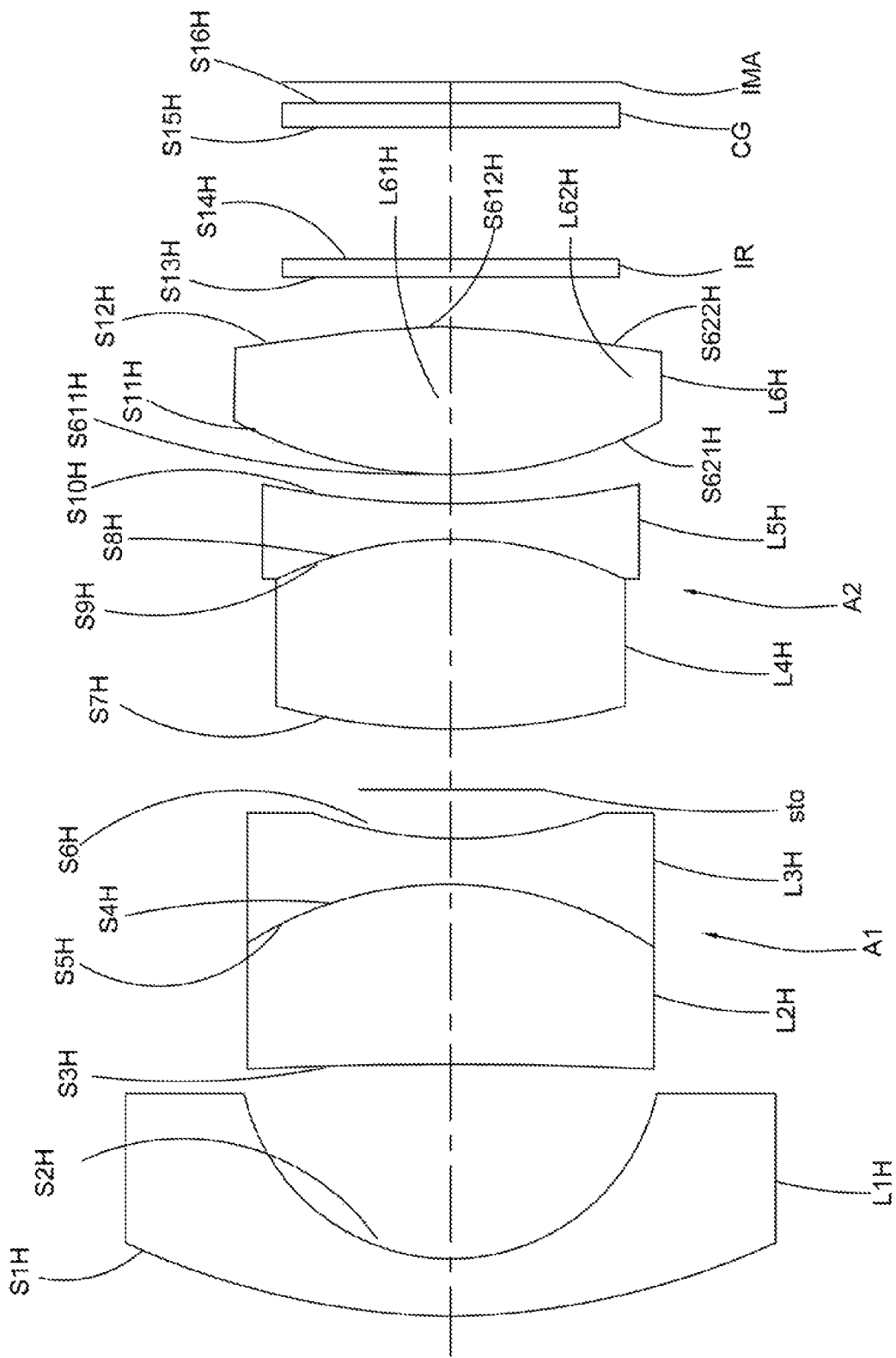
FIG. 33 is a structural schematic diagram of a lens assembly for an optical imaging lens according to a ninth preferred embodiment of the present invention.

As shown in FIG. 33, the first lens L1H, the second lens L2H, the third lens L3H, the fourth lens L4H, the fifth lens L5H and the sixth lens L6H of the lens assembly according to the ninth preferred embodiment of the present invention are coaxial with each other, which is used for the optical imaging lens.

As shown in FIG. 33, the lens assembly for the optical imaging lens according to the ninth preferred embodiment of the present invention further includes a diaphragm STO, wherein the diaphragm STO is provided between the third lens L3H and the fourth lens L4H, wherein the optical center of the diaphragm STO is coaxial with the optical centers of the first lens L1H, the second lens L2H, the third lens L3H, the fourth lens L4H, the fifth lens L5H and the sixth lens L6H. Alternatively, the diaphragm STO is provided between the first lens L1H and the second lens L2H. Alternatively, the diaphragm STO may also be provided between the fifth lens L5H and the sixth lens L6H. In some embodiments, the diaphragm STO is provided on the first lens L1H or the second lens L2H. In still other embodiments, the diaphragm STO is provided on the third lens L3H or the fourth lens L4H. In still other embodiments, the diaphragm STO is provided on the fifth lens L5H or the sixth lens L6H.

As shown in FIG. 33, the first lens L1H of the lens assembly for the optical imaging lens according to the ninth preferred embodiment of the present invention has a convex surface S1H and a concave surface S2H; the second lens L2H has a concave surface S3H and a convex surface S4H; the third lens L3H has two concave surfaces S5H, S6H; the fourth lens L4H has two convex surfaces S7H, S8H; the fifth lens L5G has a concave surface S9H and a concave surface S10H; the center portion L61H of the sixth lens L6H has two convex surfaces S611H, S612H, and the edge portion L62H of the sixth lens L6H has two convex surfaces S621H, S622H, wherein the convex surface S1H of the first lens L1H faces the object side, the concave surface S2H of the first lens L1H faces the image side; the concave surface S3H of the second lens L2H faces the object side, the convex surface S4H of the second lens L2H faces the image side; the two concave surfaces S5H, S6H of the third lens L3H face the object side and the image side respectively; the convex surface S7H of the fourth lens L4H faces the object side, the convex surface S8H of the fourth lens L4H faces the image side; the concave surface S9H of the fifth lens L5H faces the object side, the concave surface S10H of the fifth lens L5H faces the image side; the convex surfaces S611H, S612H of the center portion L61H of the sixth lens L6H face the object side and the image side respectively, the convex surfaces S621H, S622H of the edge portion L62H of the sixth lens L6H face the object side and the image side respectively. Therefore, the convex surface S611H of the central portion L61H of the sixth lens L6H and the convex surface S621H of the edge portion L62H of the sixth lens L6H form a convex surface S11H facing the object side, and the convex surface S612H of the center portion L61H of the sixth lens L6H and the convex surface S622H of the edge portion L62H of the sixth lens L6H form a convex surface S12H facing the image side. The edge portion of the sixth lens L6H has a positive power. Therefore, the first lens L1H, the second lens L2H, the third lens L3H, the fourth lens L4H, the fifth lens L5H and the sixth lens L6H of the lens assembly for the optical imaging lens according to the ninth preferred embodiment of the present invention are respectively double-sided lenses. Further, the third lens L3G is a biconcave lens and the sixth lens L6G is a biconvex lens.

Alternatively, the first lens L1H of the lens assembly for the optical imaging lens according to the ninth preferred embodiment of the present invention has a concave surface S1H facing the object side and a concave surface S2H facing the image side. Alternatively, the edge portion L62H of the sixth lens L6H has a negative power. Optionally, the edge portion L62H of the sixth lens L6H has a convex surface S621H facing the object side and a concave surface S622H facing the image side. Therefore, the convex surface S611H of the central portion L61H of the sixth lens L6H and the convex surface S621H of the edge portion L62H of the sixth lens L6H form a convex surface S11H facing the object side.

It is worth mentioning that when the convex surface S1H of the first lens L1H of the lens assembly faces the object side, it is advantageous to make more light enter into the lens assembly as much as possible. At the same time, the convex surface S1H of the first lens L1H faces the object side, which makes the first lens L1H of the lens assembly not easily be contaminated with dirt when the lens assembly is used outdoor, for example, rain is easier to fall on a rainy day. When the first lens L1H facing the object side is a concave surface S2H, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 33, the convex surface S4H of the second lens L2H of the lens assembly for the optical imaging lens according to the ninth preferred embodiment of the present invention, which faces the image side, and the concave surface S5H of the third lens L3H, which faces the object side, are provided to face with each other; the convex surface S8H of the fourth lens L4H, which faces the image side, and the concave surface S9H of the fifth lens L5H, which faces the object side, are provided to face with each other.

As shown in FIG. 33, the first and second achromatic lens assemblies A1, A2 of the lens assembly for the optical imaging lens according to the ninth preferred embodiment of the present invention are preferably cemented lenses. In other words, the second lens L2H and the third lens L3H may be glued together to form the first achromatic lens assembly A1; the fourth lens L4H and the fifth lens L5H may be glued together to form the second achromatic lens assembly A2. At this time, since the second lens L2H and the third lens L3H are glued together and the fourth lens L4H and the fifth lens L5H are glued together, so the convex surface S4H of the second lens L2H and the concave surface S5H of the third lens L3H are glued together; the convex surface S8H of the fourth lens L4H and the concave surface S9H of the fifth lens L5H are glued together. Preferably, both the convex surface S4H of the second lens L2H and the concave surface S5H of the third lens L3H are aspherical. More preferably, the convex surface S8H of the fourth lens L4H and the concave surface S9H of the fifth lens L5H are both aspherical to further reduce the chromatic aberration. Alternatively, the first and second achromatic lens assemblies A1, A2 may respectively be a double-separated achromatic lens assembly. It is appreciated that the second lens L2H and the third lens L3H are separately provided when the first and second achromatic lens assemblies A1, A2 are double-separated type achromatic lens assemblies; the fourth lens L4H and the fifth lens L5H are separately provided, the diaphragm STO may be provided between the second lens L2H and the third lens L3H or between the fourth lens L4H and the fifth lens L5H.

As shown in FIG. 33, the second lens L2H and the third lens L3H of the first achromatic lens assembly A1 of the lens assembly for the optical imaging lens according to the ninth preferred embodiment of the present invention have a negative power and a positive power respectively, wherein the second lens L2H is preferably made of material having a high refractive index and a low Abbe number, and the third lens L3H is preferably made of material having a low refractive index and a high Abbe number, wherein the second lens L2H having a positive power has a higher refractive index, and the third lens L3H having a negative power has a lower refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4H and the fifth lens L5H of the second achromatic lens assembly A2 of the lens assembly for the optical imaging lens according to the ninth preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1H and the first achromatic lens assembly A1 of the lens assembly for the optical imaging lens according to the ninth preferred embodiment of the present invention is F1, the focal length of the combination of the second achromatic lens assembly A2 and the sixth lens L6H is F2, and the focal length of the entire lens assembly is F, preferably, $1.0 \leq F2/F \leq 2.2$. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6H and the image plane.

As shown in FIG. 33, furthermore, the lens assembly for the optical imaging system according to the ninth preferred embodiment of the present invention defines an image plane IMA, and the optical imaging system may further include a color filter IR and a protective glass CG disposed in front of the image plane IMA.

As shown in FIG. 33, the imaging light may enter from the convex surface S1H of the first lens L1H of the lens assembly and pass sequentially through the first lens L1H, the second lens L2H, the third lens L3H, the diaphragm STO, the fourth lens L4H, the fifth lens L5H, the sixth lens L6H, the color filter IR, and the protective plate CG, and then is imaged on the image plane IMA.

As shown in FIG. 33, the sixth lens L6H of the lens assembly for the optical imaging lens according to the ninth preferred embodiment of the present invention is an aspheric lens. Preferably, the sixth lens L6H is a glass aspherical lens. Optionally, the sixth lens L6H is a plastic aspherical lens. When the sixth lens L6H is made of plastic material, the overall weight and the manufacturing cost of the lens assembly may be reduced. More preferably, the aspherical surface of the sixth lens L6H can satisfy the following formula:

$$Z(h) = \frac{ch^2}{1 + \sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the ninth preferred embodiment of the present invention is TTL (referred to the distance from the outermost point of the object side of the first lens L1H to the image plane of the lens assembly), and the focal length of the entire lens assembly is F, then TTL/F≤12, as shown in Table 17 and Table 18. Preferably, TTL/F≤7.5, to satisfy the miniaturization requirement of the lens assembly of the present invention.

TABLE 17 parameters of Lens surfaces of a specific example of a lens assembly according to the ninth preferred embodiment of the present invention:

| Serial number of surface S | Radius of curvature R | Distance between centers of two neighboring lenses d | Refractive index Nd | Abbe number Vd |
|---|---|---|---|---|
| S1H | 14.4554 | 0.9500 | 1.52 | 64.20 |
| S2H | 3.6606 | 2.9400 | | |
| S3H | −50.4899 | 2.6519 | 1.90 | 31.32 |
| S4H | −10.5006 | 0.0000 | | |
| S5H | −10.5006 | 0.5000 | 1.50 | 81.61 |
| S6H | 3.1623 | 2.4103 | | |
| STO | Infinity | 0.3745 | | |
| S7H | 5.1976 | 3.8000 | 1.71 | 53.80 |
| S8H | −3.7173 | 0.0000 | | |
| S9H | −3.7173 | 0.6000 | 1.78 | 25.72 |
| S10H | 32.6320 | 0.2000 | | |
| S11H | 7.4357 | 1.8092 | 1.59 | 61.16 |
| S12H | −6.1548 | 2.0311 | | |
| S13H | Infinity | 0.3000 | 1.52 | 64.20 |
| S14H | Infinity | 4.5792 | | |
| S15H | Infinity | 0.4000 | 1.52 | 64.17 |
| S16H | Infinity | 0.1250 | | |
| IMA | Infinity | | | |

TABLE 18

Aspherical coefficients of the two surfaces of the sixth lens as above embodiment K, A, B, C, D, E:

| Serial number of surface S | K | A | B | C | D | E |
|---|---|---|---|---|---|---|
| S11H | 6.926634 | −1.2023 × 10−3 | 3.0927 × 10−4 | −1.0718 × 10−4 | 3.1225 × 10−5 | −3.5279 × 10−6 |
| S12H | −3.699796 | 4.7947 × 10−3 | −3.9631 × 10−4 | 3.3392 × 10−4 | −4.2879 × 10−5 | 2.9955 × 10−6 |

The above Table 17 and Table 18 show a specific example of a lens assembly for the optical imaging lens according to the ninth preferred embodiment of the present invention, wherein the specific example may be used in an optical imaging system, wherein the radius of curvature of the convex surface S1H of the first lens L1H is 14.4554, which faces the object side, the radius of curvature of the concave surface S2H of the first lens L1H is 3.6606, which faces facing the image side, wherein the refractive index of the first lens L1H is 1.52, the abbe's constant of the first lens L1H is 64.20, wherein the distance between the center (or optical center) of the convex surface S1H of the first lens L1H and the center (or optical center) of the concave surface S2H of the first lens L1H is 0.9500; the radius of curvature of the concave surface S3H of the second lens L2H is −50.4899, which faces the object side, and the radius of curvature of the convex surface S4H of the second lens L2H of the lens assembly is −10.5006, which faces the image side, wherein the refractive index of the second lens L2H is 1.90, the abbe's constant of the second lens L2 is 31.32, wherein the distance between the center (or optical center) of the concave surface S2H of the first lens L1H and the center (or optical center) of the concave surface S3H of the second lens L2H is 2.9400, and the distance between the center (or optical center) of the concave surface S3H and the center (or optical center) of the convex surface S4H of the second lens L2H is 2.6519; the radius of curvature of the concave surface S6H of the third lens L3H of the lens assembly is 3.1623, which faces the image side, wherein the refractive index of the third lens L3H is 1.50, the abbe's constant of the third lens L3H is 81.61, wherein the convex surface S4 of the second lens L2H is glued together with the concave surface S5H of the third lens L3H, and the distance between the center (or optical center) of the concave surface S5H and the center (or optical center) of the concave surface S6H of the third lens L3H is 0.5000, the distance between the center (or optical center) of the concave surface S6H of the third lens L3H and the diaphragm STO is 2.4103, the distance between the diaphragm STO and the fourth lens L4H is 0.3745; the radius of curvature of the convex surface S7H of the fourth lens L4H of the lens assembly is 5.1976, which faces the object side, the radius of curvature of the convex surface S8H of the fourth lens L4H of the lens assembly is −3.7173, which faces the image side, wherein the refractive index of the fourth lens L4H is 1.71, the abbe's constant of the fourth lens L4H is 53.80, wherein the distance between the center (or optical center) of the convex surface S7H of the fourth lens L4H and the center (or optical center) of the convex surface S8H of the fourth lens L4H is 3.8000; the radius of curvature of the concave surface S10H of the fifth lens L5H of the lens assembly is 32.6320, which faces the image side, wherein the refractive index of the fifth lens L5H is 1.78, the abbe's constant of the fifth lens L5H is 25.72, and the convex surface S8H of the fourth lens L4H is glued together with the concave surface S9H of the fifth lens L5H, wherein the distance between the center of the concave surface S9H of the fifth lens L5H and the center (or optical center) of the concave surface S10H of the fifth lens L5H is 0.6000; and the curvature radius of the convex surface S11H of the sixth lens L6H of the lens assembly is 7.4357, which faces the object side, the radius of curvature of the convex surface S12H of the sixth lens L6H is −6.1548, which faces the image side, wherein the abbe's constant of the sixth lens L6H is 61.16, wherein the distance between the center (or optical center) of the concave surface S10H of the fifth lens L5H and the center (or optical center) of the convex surface S11H of the sixth lens L6H is 0.2000, the distance between the center (or optical center) of the convex surface S11H of the sixth lens L6H and the center (or optical center) of the convex surface S12H of the sixth lens L6H is 1.8092, the distance between the sixth lens L6H of the lens assembly and the color filter IR of the optical imaging system is 2.0311, the distance between the two surfaces S13H, S14H of the filter IR is 0.3000, the distance between the color filter IR of the optical imaging system and the protective glass CG is 4.5792, the distance between the two surfaces S15H, S16H of the protective plate CG is 0.40, and the distance between the protective glass CG and the image plane IMA is 0.125. In addition, both surfaces S11H, S12H of the sixth lens L6H are aspherical, and for S11, K is 6.926634, the constant A is $-1.2023 \times 10-3$; B is $3.0927 \times 10-4$; C is $-1.0718 \times 10-4$; D is $3.1225 \times 10-5$; E is $-3.5279 \times 10-6$, or S12, K is $-3.699796$, the constant A is $4.7947 \times 10-3$; B is $-3.9631 \times 10-4$; C is $3.3392 \times 10-4$; D is $-4.2879 \times 10-5$; E is $2.9955 \times 10-6$.

In addition, the optical length of the lens assembly for the optical imaging lens according to the ninth preferred embodiment of the present invention is TTL=23.67, and the focal length F of the entire lens assembly is F=3.23, then TTL/F=7.33. The total focal length of the second achromatic lens assembly A2 and the sixth lens L6H is F2=4.96, and F2/F=1.54.

Figure 34:
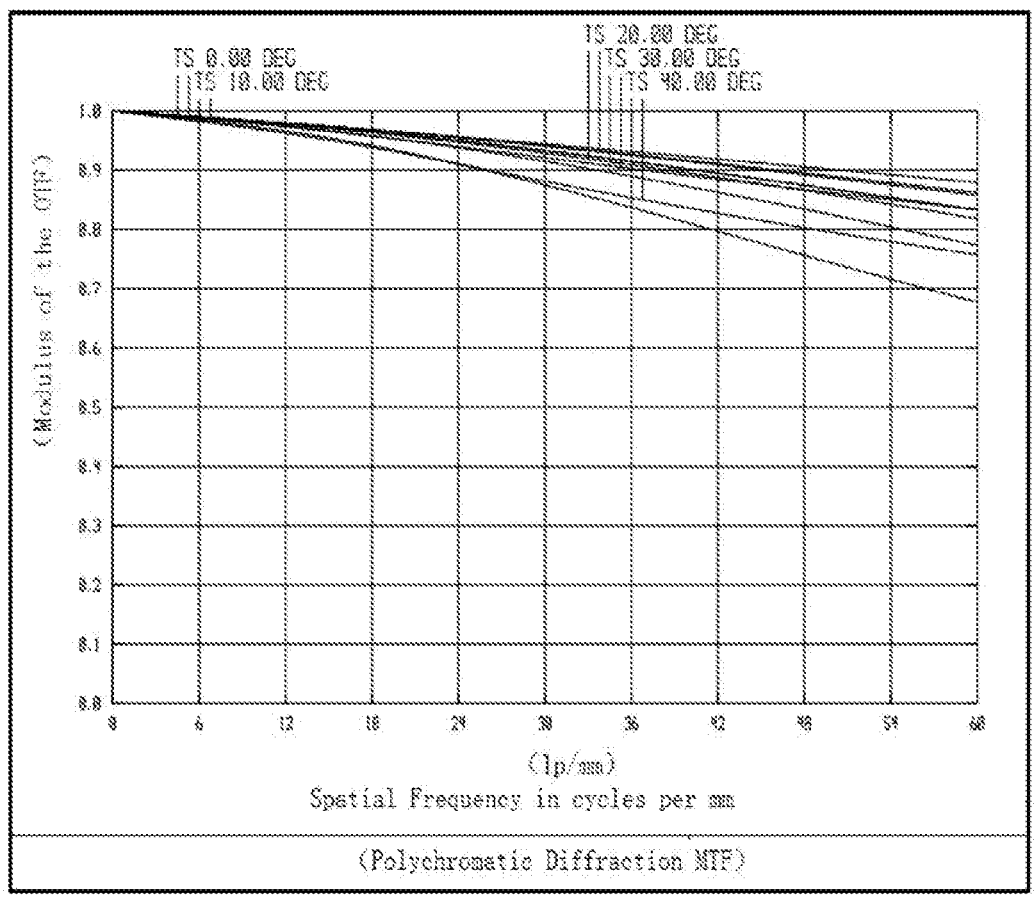
FIG. 34 shows a MTF resolution curve of the lens assembly for the optical imaging lens according to the above ninth preferred embodiment of the present invention.
Figure 35:
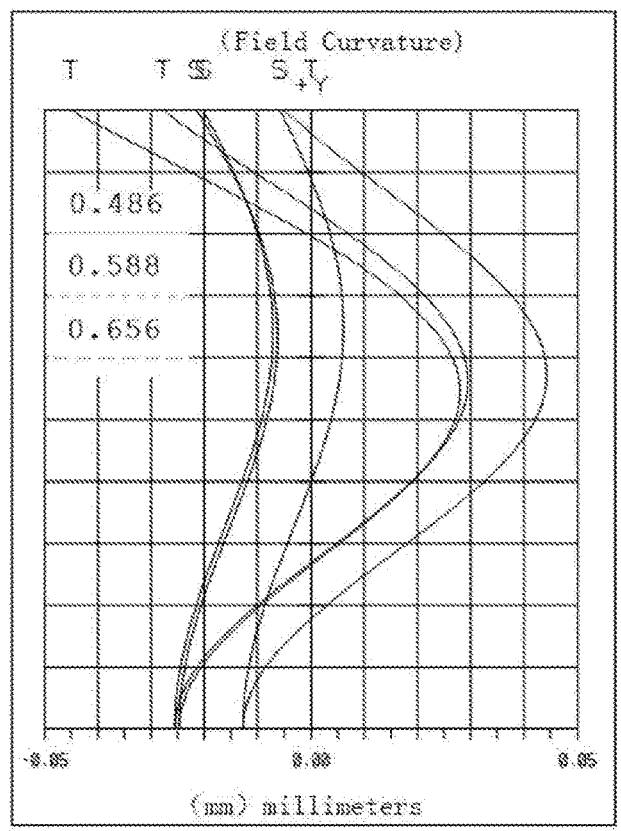
FIG. 35 shows an astigmatism curve of the lens assembly for the optical imaging lens according to the above ninth preferred embodiment of the present invention.
Figure 36:
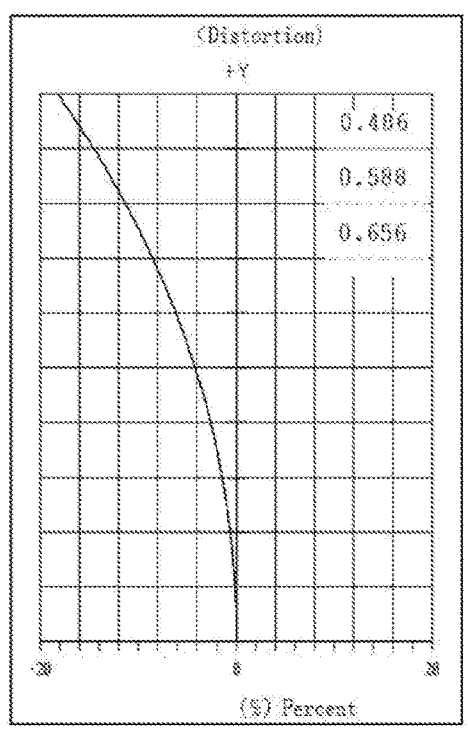
FIG. 36 shows a distortion curve of the lens assembly for the optical imaging lens according to the above ninth preferred embodiment of the present invention.

As shown in FIGS. 34 to 36 are curve graphs showing the optical properties of the specific example of the lens assembly according to the ninth preferred embodiment of the present invention, wherein FIG. 34 shows a MTF resolution curve of the specific example of the optical imaging lens employing the lens assembly according to the ninth preferred embodiment of the present invention; and FIG. 35 is a diagram showing an astigmatisma curve of the specific example of the lens assembly according to the ninth preferred embodiment of the present invention, which is represented by the wavelength of common three-color light in units of mm; and FIG. 36 is a diagram showing the distortion curve of the specific example of the lens assembly according to the ninth preferred embodiment of the present invention, which shows the value of the normalized distortion in different field angles. As shown in FIGS. 34 to 36, the optical imaging lens employing the specific example of the lens assembly according to the ninth preferred embodiment of the present invention has better optical performance.

Referring to FIGS. 37 to 40 of the accompanying drawings of the present invention, a lens assembly for an optical imaging lens according to a tenth preferred embodiment of the present invention is illustrated, wherein the lens assembly of the optical imaging lens includes at least a first lens L1I, a second lens L2I, a third lens L3I, a fourth lens L4I, a fifth lens L5I and a sixth lens L6I, wherein the first lens L1I has a negative power, and the sixth lens L6I has a positive power, wherein the second lens L2I and the third lens L3I define a first achromatic lens assembly A1, and the fourth lens L4I and the fifth lens L5I defines a second achromatic lens assembly A2, wherein the first lens L1I, the first achromatic lens assembly A1, the second achromatic lens assembly A2 and the sixth lens L6I are orderly arranged along the direction from the object side to the image side.

As shown in FIGS. 37 to 40, the lens assembly according to the tenth preferred embodiment of the present invention, for the optical imaging lens, which comprises at least a first lens L1I, a second lens L2I, a third lens L3I, a fourth lens L4I, a fifth lens L5I and at least one sixth lens L6I, wherein the first lens L1I has a negative power, the second lens L2I has a negative power, the third lens L3I has a positive power; the fourth lens L4I has a positive power and the fifth lens L5I has a negative power, wherein the sixth lens L6I is an aspherical lens, wherein the sixth lens L6I comprises a center portion and an edge portion extended outwardly from the center portion, and the center portion of the sixth lens L6I has a positive power. Preferably, the first lens L1I, the second lens L2I, the third lens L3I, the fourth lens L4I, the fifth lens L5I and the sixth lens L6I are sequentially arranged along the direction from the object side to the image side, wherein the second lens L2I and the third lens L3I form the first achromatic lens assembly A1, and the fourth lens L4I and the fifth lens L5I form the second achromatic lens assembly A2. Preferably, the first lens L1I, the second lens L2I, the third lens L3I, the fourth lens L4I and/or the fifth lens L5I are aspheric lenses to improve the optical properties of the lens assembly according to the tenth preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1I, the second lens L2I, the third lens L3I, the fourth lens L4I, and/or the fifth lens L5I are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

Figure 37:
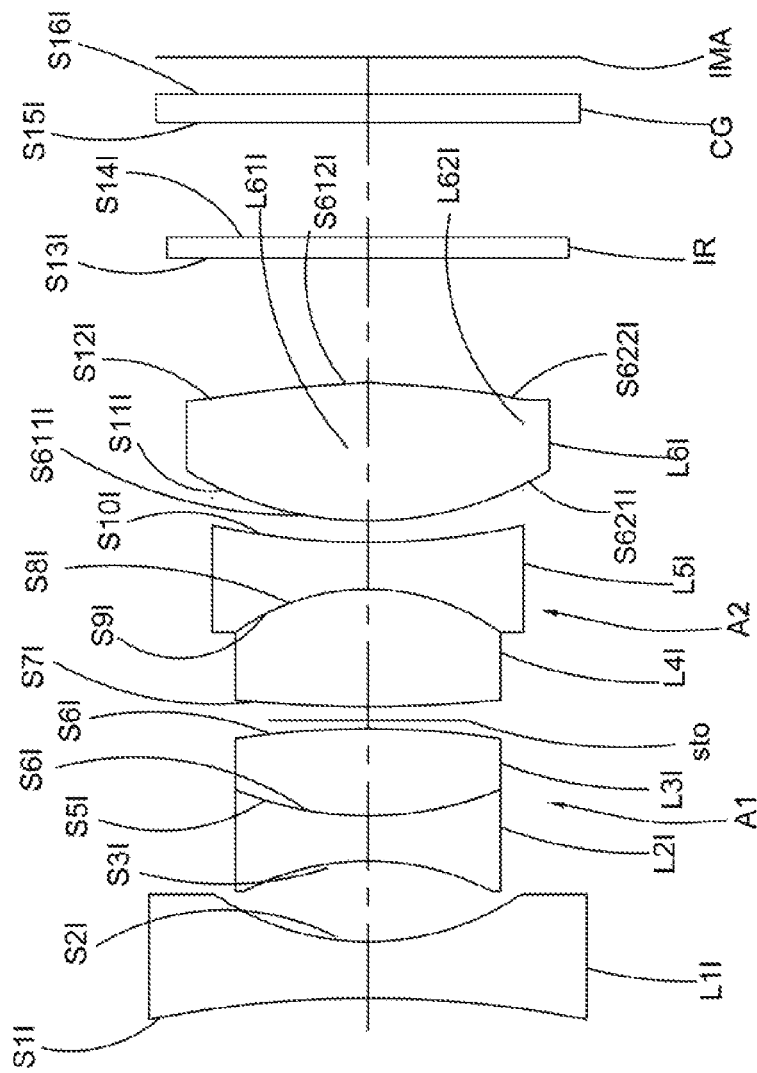
FIG. 37 is a structural schematic diagram of a lens assembly for an optical imaging lens according to a tenth preferred embodiment of the present invention.

As shown in FIG. 37, the first lens L1I, the second lens L2I, the third lens L3I, the fourth lens L4I, the fifth lens L5I and the sixth lens L6I of the lens assembly according to the tenth preferred embodiment of the present invention are coaxial with each other, which is used for the optical imaging lens.

As shown in FIG. 37, the lens assembly for the optical imaging lens according to the tenth preferred embodiment of the present invention further includes a diaphragm STO, wherein the diaphragm STO is provided between the third lens L3I and the fourth lens L4I, wherein the optical center of the diaphragm STO is coaxial with the optical centers of the first lens L1I, the second lens L2I, the third lens L3I, the fourth lens L4I, the fifth lens L5I and the sixth lens L6I. Alternatively, the diaphragm STO is provided between the first lens L1I and the second lens L2I. Alternatively, the diaphragm STO may also be provided between the fifth lens L5I and the sixth lens L6I. In some embodiments, the diaphragm STO is provided on the first lens L1I or the second lens L2I. In still other embodiments, the diaphragm STO is provided on the third lens L3I or the fourth lens L4I. In still other embodiments, the diaphragm STO is provided on the fifth lens L5I or the sixth lens L6I.

As shown in FIG. 37, the first lens L1I of the lens assembly for the optical imaging lens according to the tenth preferred embodiment of the present invention has a concave surface S1I and a concave surface S2I; the second lens L2I has two concave surfaces S3I, S4I; the third lens L3I has two convex surfaces S5I, S6I; the fourth lens L4I has two convex surfaces S7I, S8I; the fifth lens L5I has a concave surface S9I and a concave surface S10I; the center portion L61I of the sixth lens L6I has two convex surfaces S611I, S612I, and the edge portion L62I of the sixth lens L6I has two convex surfaces S621I, S622I, wherein the concave surface S1I of the first lens L1I faces the object side, the concave surface S2I of the first lens L1I faces the image side; the two concave surfaces S3I, S4I of the second lens L2I face the object side and the image side respectively; the two convex surfaces S5I, S6I of the third lens L3I face the object side and the image side respectively; the convex surface S7I of the fourth lens L4I faces the object side, the convex surface S8I of the fourth lens L4I faces the image side; the concave surface S9I of the fifth lens L5I faces the object side, the concave surface S10I of the fifth lens L5I faces the image side; the convex surfaces S611I, S612I of the center portion L61I of the sixth lens L6I face the object side and the image side respectively, the convex surfaces S621I, S622I of the edge portion L62I of the sixth lens L6I face the object side and the image side respectively. Preferably, the edge portion of the sixth lens L6I has a positive power and the edge portion L62I of the sixth lens L6I has two convex surfaces S621I, S622I, wherein the convex surface S611I of the central portion L61I of the sixth lens L6I and the convex surface S621I of the edge portion L62I of the sixth lens L6I form a convex surface S11I facing the object side, and the convex surface S612I of the center portion L61I of the sixth lens L6I and the convex surface S622I of the edge portion L62I of the sixth lens L6I form a convex surface S12I facing the image side. Therefore, the sixth lens L6I is a biconvex lens. Therefore, the first lens L1I, the second lens L2I, the third lens L3I, the fourth lens L4I, the fifth lens L5I and the sixth lens L6I of the lens assembly for the optical imaging lens according to the tenth preferred embodiment of the present invention are respectively double-sided lenses. Further, the second lens L2I is a biconcave lens, and the third lens L3I is a biconvex lens.

Alternatively, the first lens L1I of the lens assembly for the optical imaging lens according to the tenth preferred embodiment of the present invention has a convex surface S1I facing the object side and a concave surface S2I facing the image side. Alternatively, the edge portion L62I of the sixth lens L6I has a negative power. Optionally, the edge portion L62I of the sixth lens L6I has a convex surface S621I facing the object side and a concave surface S622I facing the image side. Therefore, the convex surface S611I of the central portion L61I of the sixth lens L6I and the convex surface S621I of the edge portion L62I of the sixth lens L6I form a convex surface S11I facing the object side.

It is worth mentioning that when the convex surface S1I of the first lens L1I of the lens assembly faces the object side, it is advantageous to make more light enter into the lens assembly as much as possible. At the same time, the convex surface S1I of the first lens L1I faces the object side, which makes the first lens L1I of the lens assembly not easily be contaminated with dirt when the lens assembly is used outdoor, for example, rain is easier to fall on a rainy day. When the first lens L1I facing the object side is a concave surface S2I, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 37, the concave surface S4I of the second lens L2I of the lens assembly for the optical imaging lens according to the tenth preferred embodiment of the present invention, which faces the image side, and the convex surface S5I of the third lens L3I, which faces the object side, are provided to face with each other; the convex surface S8I of the fourth lens L4I, which faces the image side, and the concave surface S9I of the fifth lens L5I, which faces the object side, are provided to face with each other.

As shown in FIG. 37, the first and second achromatic lens assemblies A1, A2 of the lens assembly for the optical imaging lens according to the tenth preferred embodiment of the present invention are preferably cemented lenses. In other words, the second lens L2I and the third lens L3I may be glued together to form the first achromatic lens assembly A1; the fourth lens L4I and the fifth lens L5I may be glued together to form the second achromatic lens assembly A2. At this time, since the second lens L2I and the third lens L3I are glued together and the fourth lens L4I and the fifth lens L5I are glued together, so the concave surface S4I of the second lens L2I and the convex surface S5I of the third lens L3I are glued together; the convex surface S8I of the fourth lens L4I and the concave surface S9I of the fifth lens L5I are glued together. Preferably, both the concave surface S4I of the second lens L2I and the convex surface S5I of the third lens L3I are aspherical. More preferably, the convex surface S8I of the fourth lens L4I and the concave surface S9I of the fifth lens L5I are both aspherical to further reduce the chromatic aberration. Alternatively, the first and second achromatic lens assemblies A1, A2 may respectively be a double-separated achromatic lens assembly. It is appreciated that the second lens L2I and the third lens L3I are separately provided when the first and second achromatic lens assemblies A1, A2 are double-separated type achromatic lens assemblies; the fourth lens L4I and the fifth lens L5I are separately provided, the diaphragm STO may be provided between the second lens L2I and the third lens L3I or between the fourth lens L4I and the fifth lens L5I.

As shown in FIG. 37, the second lens L2I and the third lens L3I of the first achromatic lens assembly A1 of the lens assembly for the optical imaging lens according to the tenth preferred embodiment of the present invention have a negative power and a positive power respectively, wherein the second lens L2I is preferably made of material having a low refractive index and a high Abbe number, and the third lens L3I is preferably made of material having a high refractive index and a low Abbe number, wherein the second lens L2I having a negative power has a lower refractive index, and the third lens L3I having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4I and the fifth lens L5I of the second achromatic lens assembly A2 of the lens assembly for the optical imaging lens according to the tenth preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1I and the first achromatic lens assembly A1 of the lens assembly for the optical imaging lens according to the tenth preferred embodiment of the present invention is F1, the focal length of the combination of the second achromatic lens assembly A2 and the sixth lens L6I is F2, and the focal length of the entire lens assembly is F, preferably, 1.0≤F2/F≤2.2. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6I and the image plane.

As shown in FIG. 37, furthermore, the lens assembly for the optical imaging system according to the tenth preferred embodiment of the present invention defines an image plane IMA, and the optical imaging system may further include a color filter IR and a protective glass CG disposed in front of the image plane IMA.

As shown in FIG. 37, the imaging light may enter from the concave surface S1I of the first lens L1I of the lens assembly and pass sequentially through the first lens L1I, the second lens L2I, the third lens L3I, the diaphragm STO, the fourth lens L4I, the fifth lens L5I, the sixth lens L6I, the color filter IR, and the protective plate CG, and then is imaged on the image plane IMA.

As shown in FIG. 37, the sixth lens L6I of the lens assembly for the optical imaging lens according to the tenth preferred embodiment of the present invention is an aspheric lens. Preferably, the sixth lens L6I is a glass aspherical lens. Optionally, the sixth lens L6I is a plastic aspherical lens. When the sixth lens L6I is made of plastic material, the overall weight and the manufacturing cost of the lens assembly may be reduced. More preferably, the aspherical surface of the sixth lens L6I can satisfy the following formula:

$$Z(h) = \frac{ch^2}{1 + \sqrt{1 - (1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the tenth preferred embodiment of the present invention is TTL (referred to the distance from the outermost point of the object side of the first lens L1I to the image plane of the lens assembly), and the focal length of the entire lens assembly is F, then TTL/F≤12, as shown in Table 19 and Table 20. Preferably, TTL/F≤7.5, to satisfy the miniaturization requirement of the lens assembly of the present invention.

TABLE 19 parameters of Lens surfaces of a specific example of a lens assembly according to the tenth preferred embodiment of the present invention:

| Serial number of surface S | Radius of curvature R | Distance between centers of two neighboring lenses d | Refractive index Nd | Abbe number Vd |
|---|---|---|---|---|
| S1I | −35.5481 | 0.7000 | 1.52 | 64.21 |
| S2I | 2.5532 | 1.5246 | | |
| S3I | −3.8626 | 0.5000 | 1.52 | 64.21 |
| S4I | 3.5196 | 0.0000 | | |
| S5I | 3.5196 | 1.2000 | 1.90 | 31.32 |
| S6I | −10.6798 | 0.0300 | | |
| STO | Infinity | 0.1000 | | |
| S7I | 14.6106 | 1.5781 | 1.50 | 81.59 |
| S8I | −2.3266 | 0.0000 | | |
| S9I | −2.3266 | 0.5500 | 1.78 | 25.72 |
| S10I | 13.3277 | 0.1000 | | |
| S11I | 6.4062 | 1.9787 | 1.74 | 49.24 |
| S12I | −3.6639 | 1.6032 | | |
| S13I | Infinity | 0.3000 | 1.52 | 64.21 |
| S14I | Infinity | 5.8133 | | |
| S15I | Infinity | 0.4000 | 1.52 | 64.17 |
| S16I | Infinity | 0.1250 | | |
| IMA | Infinity | | | |

TABLE 20

Aspherical coefficients of the two surfaces of the sixth lens as above embodiment K, A, B, C, D, E:

| Serial number of surface S | K | A | B | C | D | E |
|---|---|---|---|---|---|---|
| S11I | −17.1998 | 2.8403 × 10−3 | −1.9175 × 10−4 | 1.2151 × 10−5 | 2.0633 × 10−5 | −1.6407 × 10−6 |
| S12I | −0.671207 | 1.9598 × 10−3 | −2.8128 × 10−4 | 2.4792 × 10−5 | −5.3467 × 10−5 | 5.7998 × 10−6 |

The above Table 19 and Table 20 show a specific example of a lens assembly for the optical imaging lens according to the tenth preferred embodiment of the present invention, wherein the specific example may be used in an optical imaging system, wherein the radius of curvature of the concave surface S1I of the first lens L1I is −35.5481, which faces the object side, the radius of curvature of the concave surface S2I of the first lens L1I is 2.5532, which faces facing the image side, wherein the refractive index of the first lens L1I is 1.52, the abbe's constant of the first lens L1I is 64.21, wherein the distance between the center (or optical center) of the convex surface S1I of the first lens L1I and the center (or optical center) of the concave surface S2I of the first lens L1I is 0.70; the radius of curvature of the concave surface S3I of the second lens L2I is −3.8626, which faces the object side, and the radius of curvature of the concave surface S4I of the second lens L2I of the lens assembly is 3.5196, which faces the image side, wherein the refractive index of the second lens L2I is 1.52, the abbe's constant of the second lens L2I is 64.21, wherein the distance between the center (or optical center) of the concave surface S2I of the first lens L1I and the center (or optical center) of the concave surface S3I of the second lens L2I is 1.5246, and the distance between the center (or optical center) of the concave surface S3I and the center (or optical center) of the concave surface S4I of the second lens L2I is 0.5000; the radius of curvature of the convex surface S6I of the third lens L3I of the lens assembly is −10.6798, which faces the image side, wherein the refractive index of the third lens L3I is 1.9, the abbe's constant of the third lens L3I is 31.32, wherein the concave surface S4I of the second lens L2I is glued together with the convex surface S5I of the third lens L3I, and the distance between the center (or optical center) of the convex surface S5I and the center (or optical center) of the convex surface S6I of the third lens L3I is 1.2000, the distance between the center (or optical center) of the convex surface S6I of the third lens L3I and the diaphragm STO is 0.0300, the distance between the diaphragm STO and the fourth lens L4I is 0.1000; the radius of curvature of the convex surface S7I of the fourth lens L4I of the lens assembly is 14.6106, which faces the object side, the radius of curvature of the convex surface S8I of the fourth lens L4I of the lens assembly is −2.3266, which faces the image side, wherein the refractive index of the fourth lens L4I is 1.50, the abbe's constant of the fourth lens L4I is 81.59, wherein the distance between the center (or optical center) of the convex surface S7I of the fourth lens L4I and the center (or optical center) of the convex surface S8I of the fourth lens L4I is 1.5781; the radius of curvature of the concave surface S10I of the fifth lens L5I of the lens assembly is 13.3277, which faces the image side, wherein the refractive index of the fifth lens L5I is 1.78, the abbe's constant of the fifth lens L5I is 25.72, and the convex surface S8I of the fourth lens L4I is glued together with the concave surface S9I of the fifth lens L5I, wherein the distance between the center of the concave surface S9I of the fifth lens L5I and the center (or optical center) of the concave surface S10I of the fifth lens L5I is 0.5500; and the curvature radius of the convex surface S11I of the sixth lens L6I of the lens assembly is 6.4062, which faces the object side, the radius of curvature of the convex surface S12I of the sixth lens L6I is −3.6639, which faces the image side, wherein the abbe's constant of the sixth lens L6I is 49.24, wherein the distance between the center (or optical center) of the concave surface S10I of the fifth lens L5I and the center (or optical center) of the convex surface S11I of the sixth lens L6I is 0.1000, the distance between the center (or optical center) of the convex surface S11I of the sixth lens L6I and the center (or optical center) of the convex surface S12I of the sixth lens L6I is 1.9787, the distance between the sixth lens L6I of the lens assembly L6I and the color filter IR of the optical imaging system is 1.6032, the distance between the two surfaces S13I, S14I of the filter IR is 0.3000, the distance between the color filter IR of the optical imaging system and the protective glass CG is 5.8133, the distance between the two surfaces S15I, S16I of the protective plate CG is 0.40, and the distance between the protective glass CG and the image plane IMA is 0.125. In addition, both surfaces S11I, S12I of the sixth lens L6I are aspherical, and for S11I, K is −17.1998, the constant A is $2.8403 \times 10^{-3}$; B is $-1.9175 \times 10^{-4}$; C is $1.2151 \times 10^{-5}$; D is $2.0633\lambda 10^{-5}$; E is $-1.6407 \times 10^{-6}$, or S12I, K is −0.671207, the constant A is $1.9598 \times 10^{-3}$; B is $-2.8128 \times 10^{-4}$; C is $2.4792 \times 10^{-5}$; D is $-5.3467 \times 10^{-5}$; E is $5.7998 \times 10^{-6}$.

In addition, the optical length of the lens assembly for the optical imaging lens according to the tenth preferred embodiment of the present invention is TTL=16.50, and the focal length F of the entire lens assembly is F=3.99, then TTL/F=4.14. The total focal length of the second achromatic lens assembly A2 and the sixth lens L6I is F2=5.48, and F2/F=1.37.

Figure 38:
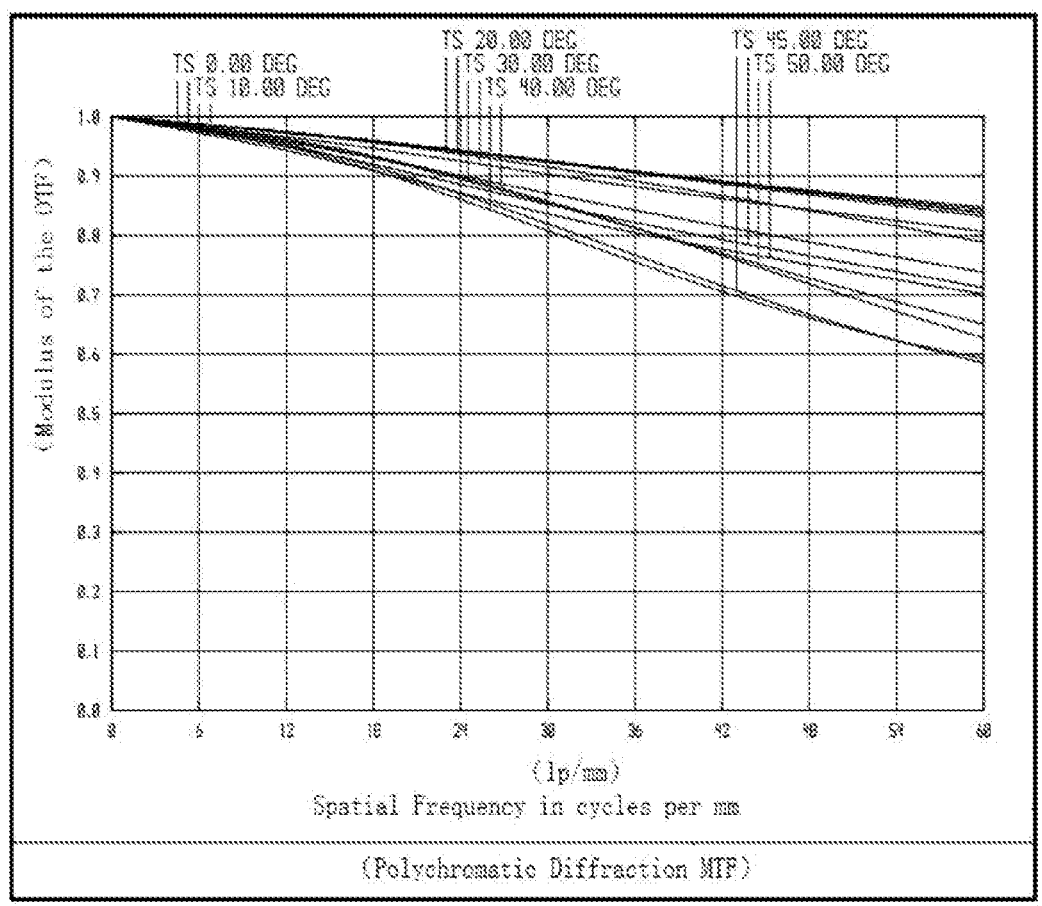
FIG. 38 shows a MTF resolution curve of the lens assembly for the optical imaging lens according to the above tenth preferred embodiment of the present invention.
Figure 39:
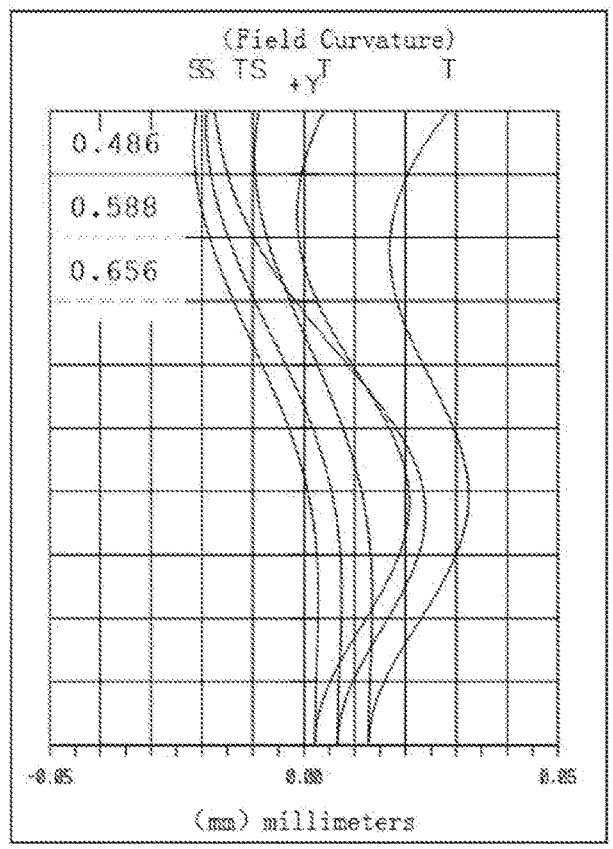
FIG. 39 shows an astigmatism curve of the lens assembly for the optical imaging lens according to the above tenth preferred embodiment of the present invention.
Figure 40:
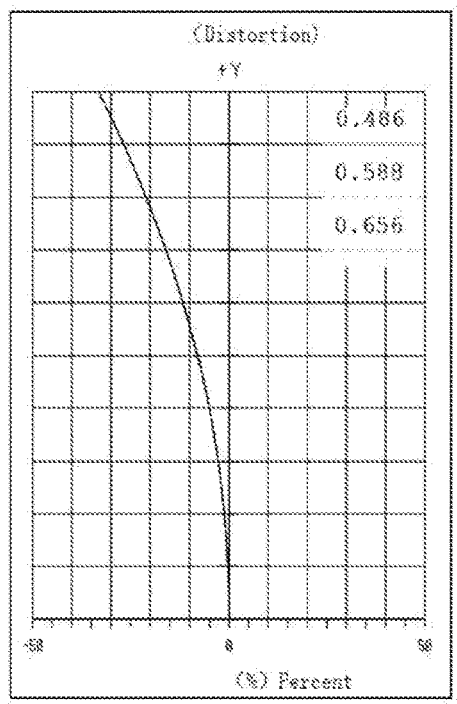
FIG. 40 shows a distortion curve of the lens assembly for the optical imaging lens according to the above tenth preferred embodiment of the present invention.

As shown in FIGS. 38 to 40 are curve graphs showing the optical properties of the specific example of the lens assembly according to the tenth preferred embodiment of the present invention, wherein FIG. 38 shows a MTF resolution curve of the specific example of the optical imaging lens employing the lens assembly according to the tenth preferred embodiment of the present invention; and FIG. 39 is a diagram showing an astigmatisma curve of the specific example of the lens assembly according to the tenth preferred embodiment of the present invention, which is represented by the wavelength of common three-color light in units of mm; and FIG. 40 is a diagram showing the distortion curve of the specific example of the lens assembly according to the tenth preferred embodiment of the present invention, which shows the value of the normalized distortion in different field angles. As shown in FIGS. 38 to 40, the optical imaging lens employing the specific example of the lens assembly according to the tenth preferred embodiment of the present invention has better optical performance.

Referring to FIGS. 41 to 44 of the accompanying drawings of the present invention, a lens assembly for an optical imaging lens according to a eleventh preferred embodiment of the present invention is illustrated, wherein the lens assembly of the optical imaging lens includes at least a first lens L1J, a second lens L2J, a third lens L3J, a fourth lens L4J, a fifth lens L5J and a sixth lens L6J, wherein the first lens L1J has a negative power, and the sixth lens L6J has a positive power, wherein the second lens L2J and the third lens L3J define a first achromatic lens assembly A1, and the fourth lens L4J and the fifth lens L5J defines a second achromatic lens assembly A2, wherein the first lens L1J, the first achromatic lens assembly A1, the second achromatic lens assembly A2 and the sixth lens L6J are orderly arranged along the direction from the object side to the image side.

Figure 41:
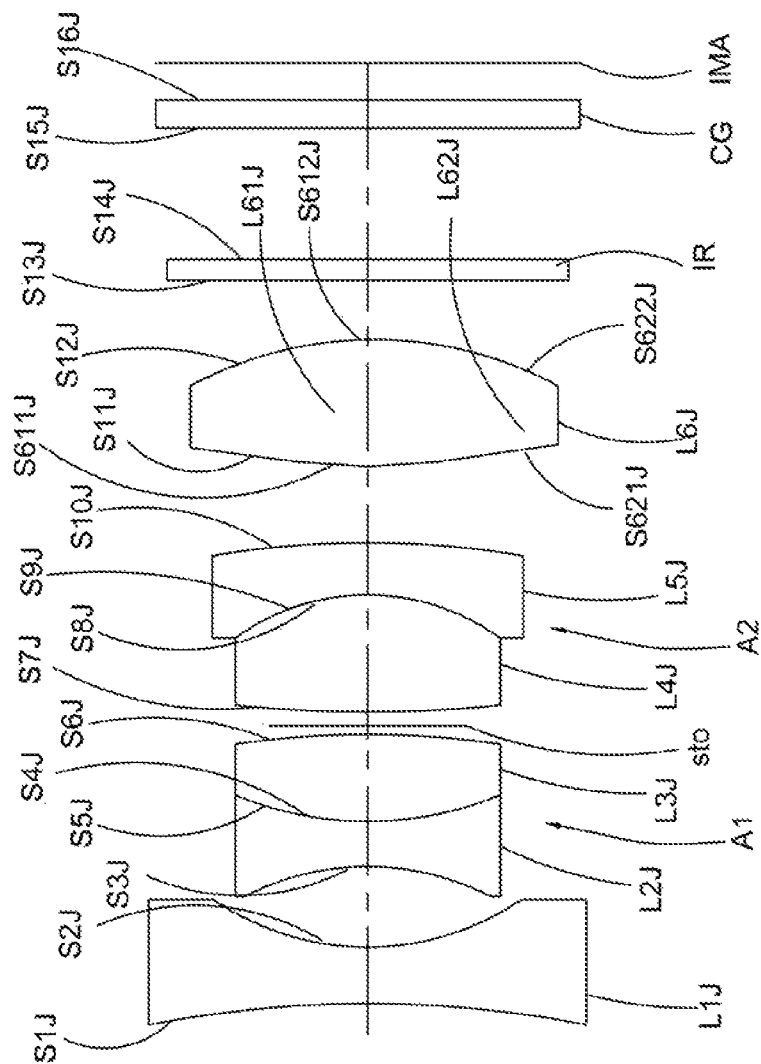
FIG. 41 is a structural schematic diagram of a lens assembly for an optical imaging lens according to an eleventh preferred embodiment of the present invention.
Figure 42:
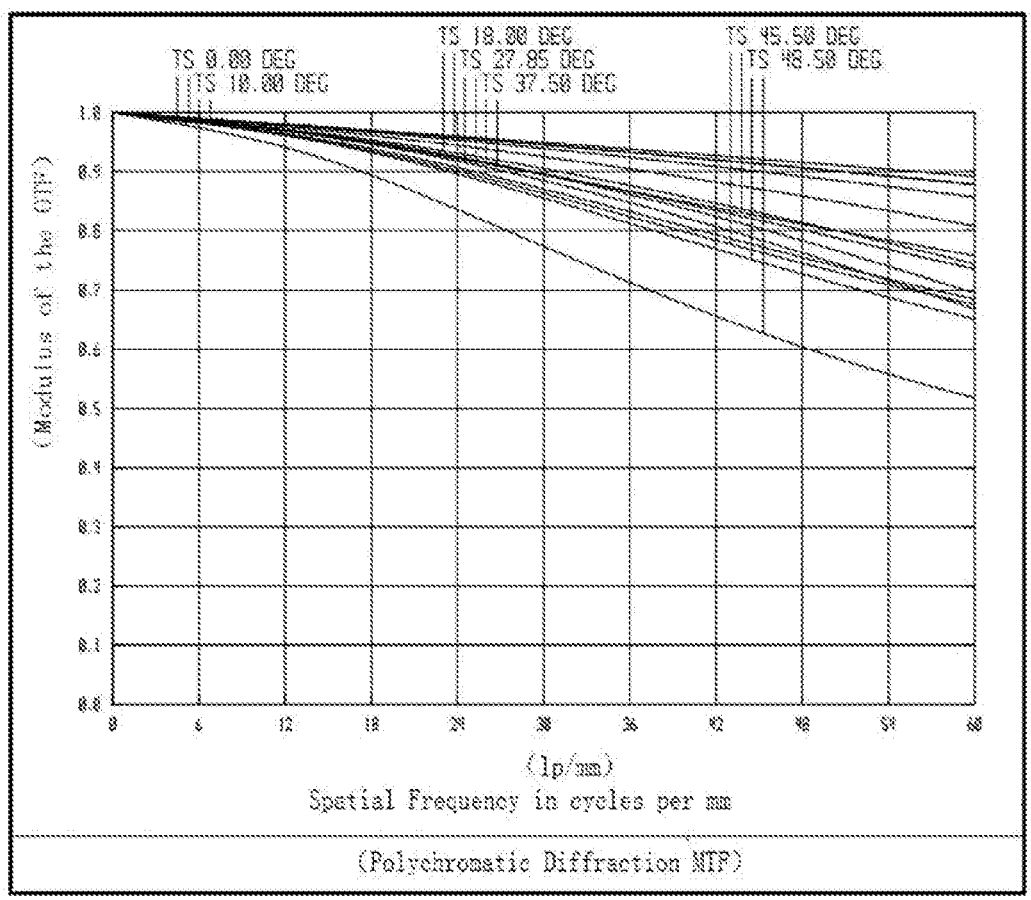
FIG. 42 shows a MTF resolution curve of the lens assembly for the optical imaging lens according to the above eleventh preferred embodiment of the present invention.

As shown in FIGS. 41 to 42, the lens assembly according to the eleventh preferred embodiment of the present invention, for the optical imaging lens, which comprises at least a first lens L1J, a second lens L2J, a third lens L3J, a fourth lens L4J, a fifth lens L5J and at least one sixth lens L6J, wherein the first lens L1J has a negative power, the second lens L2J has a negative power, the third lens L3J has a positive power; the fourth lens L4J has a positive power and the fifth lens L5J has a negative power, wherein the sixth lens L6J is an aspherical lens, wherein the sixth lens L6J comprises a center portion and an edge portion extended outwardly from the center portion, and the center portion of the sixth lens L6J has a positive power. Preferably, the first lens L1J, the second lens L2J, the third lens L3J, the fourth lens L4J, the fifth lens L5J and the sixth lens L6J are sequentially arranged along the direction from the object side to the image side, wherein the second lens L2J and the third lens L3J form the first achromatic lens assembly A1, and the fourth lens L4J and the fifth lens L5J form the second achromatic lens assembly A2. Preferably, the first lens L1J, the second lens L2J, the third lens L3J, the fourth lens L4J and/or the fifth lens L5J are aspheric lenses to improve the optical properties of the lens assembly according to the eleventh preferred embodiment of the present invention. More preferably, each of the lenses of the lens assembly may be an aspherical lens made of plastic material (e.g., under a service condition having a low requirement of ambient temperature condition) to reduce the manufacturing cost and overall weight of the entire lens assembly and the lens assembly.

Alternatively, the first lens L1J, the second lens L2J, the third lens L3J, the fourth lens L4J, and/or the fifth lens L5J are spherical lenses so that the lenses of the lens assembly can employ spherical lenses having low manufacturing cost, so as to reduce the manufacturing cost of the optical imaging lens employing the lens assembly under the premise of ensuring high image quality and temperature stability. In other words, the lens assembly can avoid employing aspherical glass lenses having high manufacturing cost to improve the image quality of the lens assembly.

As shown in FIG. 41, the first lens L1J, the second lens L2J, the third lens L3J, the fourth lens L4J, the fifth lens L5J and the sixth lens L6J of the lens assembly according to the eleventh preferred embodiment of the present invention are coaxial with each other, which is used for the optical imaging lens.

As shown in FIG. 41, the lens assembly for the optical imaging lens according to the eleventh preferred embodiment of the present invention further includes a diaphragm STO, wherein the diaphragm STO is provided between the third lens L3J and the fourth lens L4J, wherein the optical center of the diaphragm STO is coaxial with the optical centers of the first lens L1J, the second lens L2J, the third lens L3J, the fourth lens L4J, the fifth lens L5J and the sixth lens L6J. Alternatively, the diaphragm STO is provided between the first lens L1J and the second lens L2J. Alternatively, the diaphragm STO may also be provided between the fifth lens L5J and the sixth lens L6J. In some embodiments, the diaphragm STO is provided on the first lens L1J or the second lens L2J. In still other embodiments, the diaphragm STO is provided on the third lens L3J or the fourth lens L4J. In still other embodiments, the diaphragm STO is provided on the fifth lens L5J or the sixth lens L6J.

As shown in FIG. 41, the first lens L1J of the lens assembly for the optical imaging lens according to the eleventh preferred embodiment of the present invention has a concave surface S1J and a concave surface S2J; the second lens L2J has a concave surface S3J and a concave surface S4J; the third lens L3J has two convex surfaces S5J, S6J; the fourth lens L4J has two convex surfaces S7J, S8J; the fifth lens L5J has a concave surface S9J and a convex surface S10J; the center portion L61J of the sixth lens L6J has two convex surfaces S611J, S612J, and the edge portion L62J of the sixth lens L6J has two convex surfaces S621J, S622J, wherein the concave surface S1J of the first lens L1J faces the object side, the concave surface S2J of the first lens L1J faces the image side; the concave surface S3J of the second lens L2J faces the object side, the concave surface S4J of the second lens L2J faces the image side; the two convex surfaces S5J, S6J of the third lens L3J face the object side and the image side respectively; the convex surface S7J of the fourth lens L4J faces the object side, the convex surface S8J of the fourth lens L4J faces the image side; the concave surface S9J of the fifth lens L5J faces the object side, the convex surface S10J of the fifth lens L5J faces the image side; the convex surfaces S611J, S612J of the center portion L61J of the sixth lens L6J face the object side and the image side respectively, the convex surfaces S621J, S622J of the edge portion L62J of the sixth lens L6J face the object side and the image side respectively. Preferably, the edge portion of the sixth lens L6J has a positive power, and the edge portion L62J of the sixth lens L6J has two convex surfaces S621J, S622J, wherein the convex surface S611J of the central portion L61J of the sixth lens L6J and the convex surface S621J of the edge portion L62J of the sixth lens L6J form a convex surface S11J facing the object side, and the convex surface S612J of the center portion L61J of the sixth lens L6J and the convex surface S622J of the edge portion L62J of the sixth lens L6J form a convex surface S12J facing the image side. Therefore, the sixth lens L6J is a biconvex lens. Therefore, the first lens L1J, the second lens L2J, the third lens L3J, the fourth lens L4J, the fifth lens L5J and the sixth lens L6J of the lens assembly for the optical imaging lens according to the eleventh preferred embodiment of the present invention are respectively double-sided lenses. Further, the second lens L2J is a biconcave lens, and the third lens L3J is a biconvex lens.

Alternatively, the first lens L1J of the lens assembly for the optical imaging lens according to the eleventh preferred embodiment of the present invention has a convex surface S1J facing the object side and a concave surface S2J facing the image side. Alternatively, the edge portion L62J of the sixth lens L6J has a negative power. Optionally, the edge portion L62J of the sixth lens L6J has a concave surface S621J facing the object side and a convex surface S622J facing the image side. Therefore, the convex surface S612J of the central portion L61J of the sixth lens L6J and the convex surface S622J of the edge portion L62J of the sixth lens L6J form a convex surface S12J facing the image side.

It is worth mentioning that when the convex surface S1J of the first lens L1J of the lens assembly faces the object side, it is advantageous to make more light enter into the lens assembly as much as possible. At the same time, the convex surface S1J of the first lens L1J faces the object side, which makes the first lens L1J of the lens assembly not easily be contaminated with dirt when the lens assembly is used outdoor, for example, rain is easier to fall on a rainy day. When the first lens L1J facing the object side is a concave surface S2J, it is advantageous to reduce the diameter of the front end of the optical imaging lens employing the lens assembly of the present invention, so as to reduce the size of the optical imaging lens—or increase the distortion of the optical imaging lens to be suitable for a driving recorder and so on, which need to focus on a small range of observation to observe the situation.

As shown in FIG. 41, the concave surface S4J of the second lens L2J of the lens assembly for the optical imaging lens according to the eleventh preferred embodiment of the present invention, which faces the image side, and the convex surface S5J of the third lens L3J, which faces the object side, are provided to face with each other; the convex surface S8H of the fourth lens L4J, which faces the image side, and the concave surface S9J of the fifth lens L5J, which faces the object side, are provided to face with each other.

As shown in FIG. 41, the first and second achromatic lens assemblies A1, A2 of the lens assembly for the optical imaging lens according to the eleventh preferred embodiment of the present invention are preferably cemented lenses. In other words, the second lens L2J and the third lens L3J may be glued together to form the first achromatic lens assembly A1; the fourth lens L4J and the fifth lens L5J may be glued together to form the second achromatic lens assembly A2. At this time, since the second lens L2J and the third lens L3J are glued together and the fourth lens L4J and the fifth lens L5J are glued together, so the concave surface S4J of the second lens L2J and the convex surface S5J of the third lens L3J are glued together; the convex surface S8J of the fourth lens L4J and the concave surface S9J of the fifth lens L5J are glued together. Preferably, both the concave surface S4J of the second lens L2J and the convex surface S5J of the third lens L3J are aspherical. More preferably, the convex surface S8J of the fourth lens L4J and the concave surface S9J of the fifth lens L5J are both aspherical to further reduce the chromatic aberration. Alternatively, the first and second achromatic lens assemblies A1, A2 may respectively be a double-separated achromatic lens assembly. It is appreciated that the second lens L2J and the third lens L3J are separately provided when the first and second achromatic lens assemblies A1, A2 are double-separated type achromatic lens assemblies; the fourth lens L4J and the fifth lens L5J are separately provided, the diaphragm STO may be provided between the second lens L2J and the third lens L3J or between the fourth lens L4J and the fifth lens L5J.

As shown in FIG. 41, the second lens L2J and the third lens L3J of the first achromatic lens assembly A1 of the lens assembly for the optical imaging lens according to the eleventh preferred embodiment of the present invention have a negative power and a positive power respectively, wherein the second lens L2J is preferably made of material having a low refractive index and a high Abbe number, and the third lens L3J is preferably made of material having a high refractive index and a low Abbe number, wherein the second lens L2J having a negative power has a lower refractive index, and the third lens L3J having a positive power has a higher refractive index, and this combination of high and low refractive indexes facilitates a rapid transition of the front light, to enlarge the aperture diameter and satisfy a night vision requirement, and when the first achromatic lens assembly A1 is a cemented lens assembly, which makes the entire lens assembly more compact and can effectively reduce the system chromatic aberration of the entire lens assembly.

Further, the fourth lens L4J and the fifth lens L5J of the second achromatic lens assembly A2 of the lens assembly for the optical imaging lens according to the eleventh preferred embodiment of the present invention also respectively have a positive power and a negative power. Preferably, the second achromatic lens assembly A2 is a cemented lens assembly, and the diaphragm STO is disposed between the first achromatic lens assembly A1 and the second achromatic lens assembly A2. The two cemented lens assemblies of the lens assembly collectively correct the overall chromatic aberration of the lens assembly, and the two first and second achromatic lens assemblies A1 and A2 are respectively provided on two sides of the diaphragm STO to effectively correct aberration, improve the resolution and effectively shorten the overall length of the lens assembly.

Further, the focal length of the combination of the first lens L1J and the first achromatic lens assembly A1 of the lens assembly for the optical imaging lens according to the eleventh preferred embodiment of the present invention is F1, the focal length of the combination of the second achromatic lens assembly A2 and the sixth lens L6J is F2, and the focal length of the entire lens assembly is F, preferably, $1.0 \leq F2/F \leq 2.2$. Therefore, by allocating reasonably the optical power, when the value of F2/F is larger, the aberration can be reduced to obtain better image quality; when the value of F2/F is smaller, the light reaching the image plane can be quickly converged, so as to reduce the distance between the sixth lens L6J and the image plane.

As shown in FIG. 41, furthermore, the lens assembly for the optical imaging system according to the eleventh preferred embodiment of the present invention defines an image plane IMA, and the optical imaging system may further include a color filter IR and a protective glass CG disposed in front of the image plane IMA.

As shown in FIG. 41, the imaging light may enter from the concave surface S1J of the first lens L1J of the lens assembly and pass sequentially through the first lens L1J, the second lens L2J, the third lens L3J, the diaphragm STO, the fourth lens L4J, the fifth lens L5J, the sixth lens L6J, the color filter IR, and the protective plate CG, and then is imaged on the image plane IMA As shown in FIG. 41, the sixth lens L6J of the lens assembly for the optical imaging lens according to the eleventh preferred embodiment of the present invention is an aspheric lens. Preferably, the sixth lens L6J is a glass aspherical lens. Optionally, the sixth lens L6J is a plastic aspherical lens. When the sixth lens L6J is made of plastic material, the overall weight and the manufacturing cost of the lens assembly may be reduced. More preferably, the aspherical surface of the sixth lens L6J can satisfy the following formula:

$$Z(h) = \frac{ch^2}{1 + \sqrt{1-(1+k)c^2h^2}} + Ah^4 + Bh^6 + Ch^8 + Dh^{10} + Eh^{12}$$

wherein Z (h) is a rise value from the position where the aspheric surface has a height h along the direction of the optical axis to the peak of the aspheric surface; c=1/r, and r represents the radius of curvature of the aspheric surface; k is a conical coefficient, conic; A, B, C, D and E are high-order aspherical coefficients respectively.

Further, the optical length of the lens assembly for the optical imaging lens according to the eleventh preferred embodiment of the present invention is TTL (referred to the distance from the outermost point of the object side of the first lens L1J to the image plane of the lens assembly), and the focal length of the entire lens assembly is F, then TTL/F≤12, as shown in Table 21 and Table 22. Preferably, TTL/F≤7.5, to satisfy the miniaturization requirement of the lens assembly of the present invention.

TABLE 22 parameters of Lens surfaces of a specific example of a lens assembly according to the eleventh preferred embodiment of the present invention:

| Serial number of surface S | Radius of curvature R | Distance between centers of two neighboring lenses d | Refractive index Nd | Abbe number Vd |
|---|---|---|---|---|
| S1J | −14.0888 | 1.1181 | 1.72 | 50.57 |
| S2J | 4.7055 | 2.0650 | | |
| S3J | −20.9661 | 0.6504 | 1.52 | 64.20 |
| S4J | 5.4170 | 0.0000 | | |
| S5J | 5.4170 | 3.0472 | 1.90 | 37.10 |
| S6J | −42.3409 | 0.0497 | | |
| STO | Infinity | 0.1868 | | |
| S7J | 7.4762 | 3.0871 | 1.73 | 54.68 |
| S8J | −7.0718 | 0.0000 | | |
| S9J | −7.0718 | 0.6174 | 1.85 | 23.78 |
| S10J | −25.8309 | 2.3989 | | |
| S11J | 7.4132 | 2.5430 | 1.50 | 81.60 |
| S12J | −125.0532 | 0.5912 | | |
| S13J | Infinity | 0.5500 | 1.52 | 64.20 |
| S14J | Infinity | 3.4438 | | |
| S15J | Infinity | 0.4000 | | |
| S16J | Infinity | 0.1250 | | |
| IMA | Infinity | | | |

TABLE 22

Aspherical coefficients of the two surfaces of the sixth lens as above embodiment K, A, B, C, D, E:

| Serial number of surface S | K | A | B | C | D | E |
|---|---|---|---|---|---|---|
| S11J | −2.992612 | −1.3124 × 10⁻³ | −2.7450 × 10⁻⁴ | 3.4970 × 10⁻⁵ | −3.6600 × 10⁻⁶ | 2.8708 × 10⁻⁸ |
| S12J | 100.0000 | −1.5272 × 10⁻³ | −2.0654 × 10⁻⁴ | 9.0430 × 10⁻⁶ | −6.5536 × 10⁻⁷ | 1.8816 × 10⁻⁸ |

The above Table 22 and Table 23 show a specific example of a lens assembly for the optical imaging lens according to the eleventh preferred embodiment of the present invention, wherein the specific example may be used in an optical imaging system, wherein the radius of curvature of the concave surface S1J of the first lens L1J is −14.0888, which faces the object side, the radius of curvature of the concave surface S2J of the first lens L1J is 4.7055, which faces facing the image side, wherein the refractive index of the first lens L1J is 1.72, the abbe's constant of the first lens L1J is 50.57, wherein the distance between the center (or optical center) of the convex surface S1J of the first lens L1J and the center (or optical center) of the concave surface S2 of the first lens L1J is 1.1181; the radius of curvature of the concave surface S3 of the second lens L2J is −20.9661, which faces the object side, and the radius of curvature of the concave surface S4 of the second lens L2J of the lens assembly is 5.4170, which faces the image side, wherein the refractive index of the second lens L2J is 1.52, the abbe's constant of the second lens L2J is 64.20, wherein the distance between the center (or optical center) of the concave surface S2J of the first lens L1J and the center (or optical center) of the concave surface S3J of the second lens L2J is 2.0650, and the distance between the center (or optical center) of the concave surface S3I and the center (or optical center) of the concave surface S4J of the second lens L2J is 0.6504; the radius of curvature of the convex surface S6J of the third lens L3J of the lens assembly is −42.3409, which faces the image side, wherein the refractive index of the third lens L3 is 1.9, the abbe's constant of the third lens L3J is 37.10, wherein the concave surface S4J of the second lens L2J is glued together with the convex surface S5J of the third lens L3J, and the distance between the center (or optical center) of the convex surface S5J and the center (or optical center) of the convex surface S6J of the third lens L3J is 3.0472, the distance between the center (or optical center) of the convex surface S6J of the third lens L3J and the diaphragm STO is 0.0497, the distance between the diaphragm STO and the fourth lens L4J is 0.1868; the radius of curvature of the convex surface S7J of the fourth lens L4J of the lens assembly is 7.4762, which faces the object side, the radius of curvature of the convex surface S8J of the fourth lens L4J of the lens assembly is −7.0718 which faces the image side, wherein the refractive index of the fourth lens L4J is 1.73, the abbe's constant of the fourth lens L4 is 54.68, wherein the distance between the center (or optical center) of the convex surface S7J of the fourth lens L4J and the center (or optical center) of the convex surface S8J of the fourth lens L4J is 3.0871; the radius of curvature of the convex surface S10J of the fifth lens L5J of the lens assembly is −25.8309, which faces the image side, wherein the refractive index of the fifth lens L5J is 1.85, the abbe's constant of the fifth lens L5J is 23.78, and the convex surface S8J of the fourth lens L4J is glued together with the concave surface S9J of the fifth lens L5J, wherein the distance between the center of the concave surface S9J of the fifth lens L5J and the center (or optical center) of the convex surface S10J of the fifth lens L5J is 0.6174; and the curvature radius of the convex surface S11J of the sixth lens L6J of the lens assembly is 7.4132, which faces the object side, the radius of curvature of the convex surface S12J of the sixth lens L6J is −125.0532, which faces the image side, wherein the abbe's constant of the sixth lens L6J is 81.60, wherein the distance between the center (or optical center) of the convex surface S10J of the fifth lens L5J and the center (or optical center) of the convex surface S11J of the sixth lens L6J is 2.3989, the distance between the center (or optical center) of the convex surface S11J of the sixth lens L6J and the center (or optical center) of the convex surface S12J of the sixth lens L6J is 2.5430, the distance between the sixth lens L6J of the lens assembly L6J and the color filter IR of the optical imaging system is 0.5912, the distance between the two surfaces S13J, S14J of the filter IR is 0.5500, the distance between the color filter IR of the optical imaging system and the protective glass CG is 3.4438, the distance between the two surfaces S15J, S16J of the protective plate CG is 0.40, and the distance between the protective glass CG and the image plane IMA is 0.125. In addition, both surfaces S11J, S12J of the sixth lens L6J are aspherical, and for S11J, K is −2.992612, the constant A is −1.3124×10−3; B is −2.7450×10−4; C is 3.4970×10−5; D is −3.6600×10−6; E is 2.8708×10−8, or S12J, K is 100.0000, the constant A is −1.5272×10−3; B is −2.0654×10−4; C is 9.0430×10−6; D is −6.5536×10−7; E is 1.8816×10−8. In addition, the optical length of the lens assembly for the optical imaging lens according to the first preferred embodiment of the present invention is TTL=16.01, and the focal length F of the entire lens assembly is F=3.62, then TTL/F=4.42. The total focal length of the second achromatic lens assembly A2 and the sixth lens L6 is F2=5.91, and F2/F=1.63.

In addition, the optical length of the lens assembly for the optical imaging lens according to the eleventh preferred embodiment of the present invention is TTL=20.87, and the focal length F of the entire lens assembly is F=4.88, then TTL/F=4.28. The total focal length of the second achromatic lens assembly A2 and the sixth lens L6J is F2=6.80, and F2/F=1.39.

Figure 43:
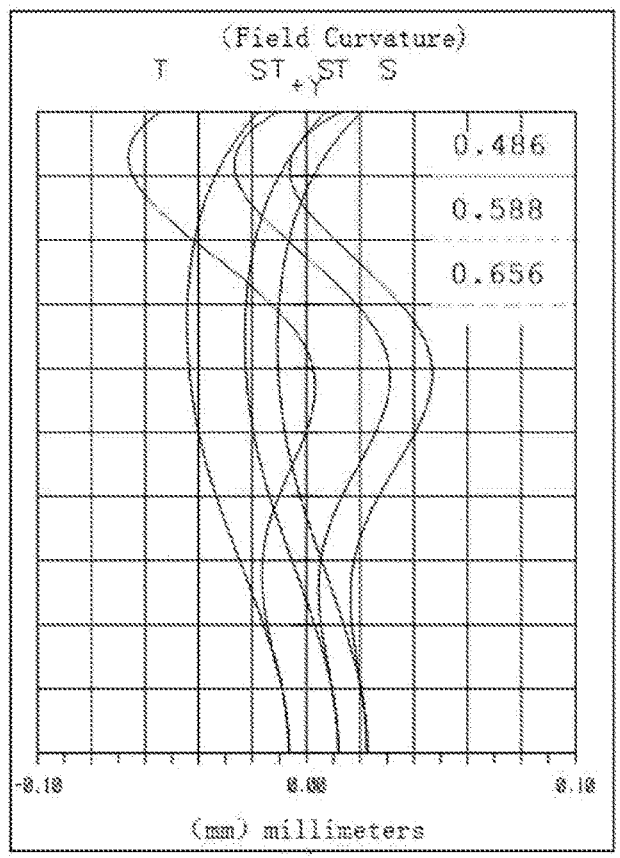
FIG. 43 shows an astigmatism curve of the lens assembly for the optical imaging lens according to the above eleventh preferred embodiment of the present invention.
Figure 44:
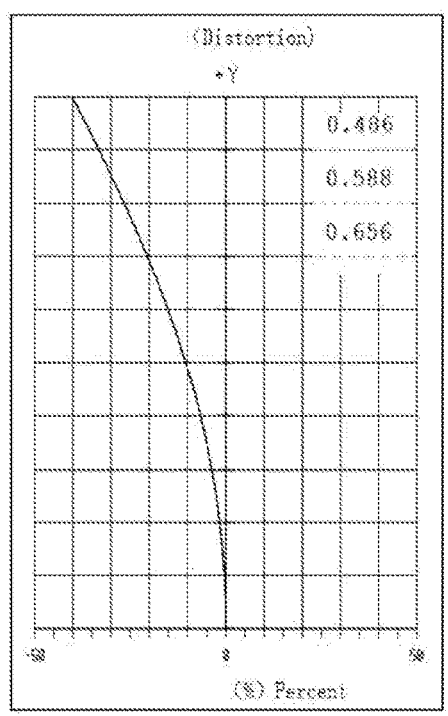
FIG. 44 shows a distortion curve of the lens assembly for the optical imaging lens according to the above eleventh preferred embodiment of the present invention.

As shown in FIGS. 42 to 44 are curve graphs showing the optical properties of the specific example of the lens assembly according to the eleventh preferred embodiment of the present invention, wherein FIG. 42 shows a MTF resolution curve of the specific example of the optical imaging lens employing the lens assembly according to the eleventh preferred embodiment of the present invention; and FIG. 43 is a diagram showing an astigmatisma curve of the specific example of the lens assembly according to the eleventh preferred embodiment of the present invention, which is represented by the wavelength of common three-color light in units of mm; and FIG. 44 is a diagram showing the distortion curve of the specific example of the lens assembly according to the eleventh preferred embodiment of the present invention, which shows the value of the normalized distortion in different field angles. As shown in FIGS. 42 to 44, the optical imaging lens employing the specific example of the lens assembly according to the eleventh preferred embodiment of the present invention has better optical performance.

It is worth mentioning that, preferably, the units of the curvature radius R, the focal length F, the focal length F1, the focal length F2, the optical length TTL, and the center-to-center distance D between the respective surfaces of the lens assembly, according to the above preferred embodiments of the present invention, are the same. For example, if the curvature radius of the surface S1 of the first lens of the lens assembly according to the first preferred embodiment of the present invention is 14.5306 mm and the curvature radius of the surface S2 is 3.7853 mm, then the distance between the surface S1 and the surface S2 of the first lens is 0.8000 mm. In addition, it will be understood by those skilled in the art that the specific parameters shown in Table 1, Table 2, Table 3, Table 4, Table 5, Table 6, Table 7, Table 8, Table 9, Table 10, Table 11, Table 12, 13, Table 14, Table 15, Table 16, Table 17, Table 18, Table 19, Table 20, Table 21, and Table 22 herein is exemplary only and not intended to be limiting.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lens assembly for an optical imaging lens, comprising in an order from an object side to an image side:
    a first lens having a negative power, wherein a surface of the first lens facing the object side is a curved surface, the first lens has two concave surfaces, and the two concave surfaces of the first lens respectively face the object side and the image side;
    a second lens having two concave surfaces;
    a third lens having two convex surfaces;
    a fourth lens having two convex surfaces;
    a fifth lens having a concave surface and an opposed convex surface; and
    a sixth lens, wherein the sixth lens has a positive power, wherein the second and third lenses have opposite powers,
    wherein the fourth and fifth lenses have opposite powers,
    wherein one of the concave surfaces of the second lens faces toward the first lens while another concave surface of the second lens is glued to one of the convex surfaces of the third lens, such that the second lens and the third lens are glued together to form a first cemented achromatic lens assembly, and
    wherein one of the convex surfaces of the fourth lens faces toward the third lens while another convex surface of the fourth lens is glued to the concave surface of the fifth lens, such that the fourth lens and the fifth lens are glued together to form a second cemented achromatic lens assembly,
    wherein a number of lens elements with nonzero refractive power in the lens assembly is equal to six, and
    wherein the first lens, the first cemented achromatic lens assembly, the second cemented achromatic lens assembly and the sixth lens are spaced apart with each other,
    wherein an optical length of the lens assembly is TTL, and a focal length of the lens assembly is F, wherein $4.14 \leq TTL/F \leq 12$.

2. The lens assembly, as recited in claim 1, wherein the second lens has a negative power, the third lens has a positive power, the fourth lens of the second cemented achromatic lens assembly has a positive power, and the fifth lens has a negative power.

3. The lens assembly, as recited in claim 2, wherein the sixth lens has two convex surfaces, wherein the convex surfaces of the sixth lens respectively face the object side and the image side.

4. The lens assembly, as recited in claim 2, wherein the sixth lens has at least one aspheric surface.

5. The lens assembly, as recited in claim 1, wherein the focal length of the lens assembly is F, a focal length of a combination defined by the second cemented achromatic lens assembly and the sixth lens is F2, wherein $1.0 < F2/F < 2.2$.

6. The lens assembly, as recited in claim 1, wherein the sixth lens has two convex surfaces, wherein the convex surfaces of the sixth lens respectively face the object side and the image side.

7. The lens assembly, as recited in claim 1, wherein the sixth lens has at least one aspheric surface.

* * * * *